(12) United States Patent
Gordon et al.

(10) Patent No.: US 10,051,103 B1
(45) Date of Patent: Aug. 14, 2018

(54) SCREEN INTERFACE FOR A MOBILE DEVICE APPARATUS

(71) Applicant: Majen Tech, LLC, Longview, TX (US)

(72) Inventors: George Andrew Gordon, Frisco, TX (US); Joseph A Cerrato, Longview, TX (US); Ronald A Johnston, Longview, TX (US); Kevin J Zilka, Los Gatos, CA (US)

(73) Assignee: Majen Tech, LLC, Longview, TX (US)

( * ) Notice: Subject to any disclaimer, the term of this patent is extended or adjusted under 35 U.S.C. 154(b) by 0 days.

(21) Appl. No.: 15/924,272

(22) Filed: Mar. 18, 2018

Related U.S. Application Data

(63) Continuation of application No. 15/789,867, filed on Oct. 20, 2017, which is a continuation-in-part of application No. 14/050,332, filed on Oct. 9, 2013.
(Continued)

(51) Int. Cl.
*G06K 9/00* (2006.01)
*H04M 1/725* (2006.01)
(Continued)

(52) U.S. Cl.
CPC ...... *H04M 1/7253* (2013.01); *G06F 3/04883* (2013.01); *G06F 21/32* (2013.01); *G06F 21/36* (2013.01); *G06Q 20/3227* (2013.01)

(58) Field of Classification Search
CPC .. H04M 1/7253; G06F 3/04883; G06F 21/32; G06F 21/36; G06C 20/3227
See application file for complete search history.

(56) References Cited

U.S. PATENT DOCUMENTS

| 9,519,901 | B1* | 12/2016 | Dorogusker | G06Q 20/401 |
| 9,830,589 | B2* | 11/2017 | Xing | G06Q 20/3278 |
| 2009/0182630 | A1* | 7/2009 | Otto | G06Q 20/20 |
| | | | | 705/14.1 |

* cited by examiner

Primary Examiner — Shefali Goradia
(74) Attorney, Agent, or Firm — Patrick E. Caldwell, Esq.; The Caldwell Firm, LLC

(57) ABSTRACT

A system, method, and computer program product are provided to: receive, utilizing the touchscreen, an indication of a second touch input for trace path-based selection of a first photo of a second set of multiple of the plurality of photos in the grid; in response to the receipt of the indication of the second touch input for trace path-based selection of the first photo of the second set of multiple of the plurality of photos in the grid, cause selection of the first photo of the second set of multiple of the plurality of photos in the grid, change at least one visual aspect of the first photo of the second set of multiple of the plurality of photos in the grid, add a check mark icon to the first photo of the second set of multiple of the plurality of photos in the grid; receive, utilizing the touchscreen, an indication of a continuation of the second touch input for trace path-based selection of a second photo of the second set of multiple of the plurality of photos in the grid; and in response to the receipt of the indication of the continuation of the second touch input for trace path-based selection of the second photo of the second set of multiple of the plurality of photos in the grid, cause selection of the second photo of the second set of multiple of the plurality of photos in the grid, change at least one visual aspect of the second photo of the second set of multiple of the plurality of photos in the grid, and add a check mark icon to the second photo of the second set of multiple of the plurality of photos in the grid.

20 Claims, 26 Drawing Sheets

Related U.S. Application Data

(60) Provisional application No. 61/751,212, filed on Jan. 10, 2013.

(51) Int. Cl.
*G06F 21/36* (2013.01)
*G06F 21/32* (2013.01)
*G06F 3/0488* (2013.01)
*G06Q 20/32* (2012.01)

PASSENGER DISPLAY

SCREEN INTERFACE FOR A MOBILE DEVICE APPARATUS

RELATED APPLICATIONS

The present application is a continuation of U.S. patent application Ser. No. 15/789,867 filed on Oct. 20, 2017 which, in turn, is a continuation-in-part of U.S. patent application Ser. No. 14/050,332 filed on Oct. 9, 2013 which, in turn, claims priority to U.S. Patent Application No. 61/751,212 filed Jan. 10, 2013, which are all incorporated herein by reference in their entirety for all purposes.

FIELD OF THE INVENTION AND BACKGROUND

The present invention relates to mobile devices, and more particularly to mobile device screen interfaces.

SUMMARY

A system, method, and computer program product are provided to: display, utilizing the touchscreen, a plurality of application icons including a photo application icon, utilizing the touchscreen; receive, utilizing the touchscreen, an indication of a touch input on the photo application icon; in response to the receipt of the indication of the touch input on the photo application icon, access a photo application utilizing the one or more processors; after the photo application is accessed, display, utilizing the touchscreen, a grid of a plurality of photos and an operation icon, via the photo application; receive, utilizing the touchscreen, an indication of one or more first touch inputs for individually selecting a first set of one or more of the plurality of photos in the grid; in response to the receipt of the indication of the one or more first touch inputs for individually selecting the first set of one or more of the plurality of photos in the grid, cause individually selection of the first set of one or more of the plurality of photos in the grid, utilizing the one or more processors; in response to the receipt of the indication of the one or more first touch inputs for individually selecting the first set of one or more of the plurality of photos in the grid, change at least one visual aspect of the first set of one or more of the plurality of photos in the grid, for visually indicating the selection of the first set of one or more of the plurality of photos in the grid; in response to the receipt of the indication of the one or more first touch inputs for individually selecting the first set of one or more of the plurality of photos in the grid, add a check mark icon to each of the first set of one or more of the plurality of photos in the grid, for visually indicating the selection of the first set of one or more of the plurality of photos in the grid; receive, utilizing the touchscreen, an indication of a second touch input for trace path-based selection of a first photo of a second set of multiple of the plurality of photos in the grid; in response to the receipt of the indication of the second touch input for trace path-based selection of the first photo of the second set of multiple of the plurality of photos in the grid, cause selection of the first photo of the second set of multiple of the plurality of photos in the grid, utilizing the one or more processors; in response to the receipt of the indication of the second touch input for trace path-based selection of the first photo of the second set of multiple of the plurality of photos in the grid, change at least one visual aspect of the first photo of the second set of multiple of the plurality of photos in the grid, for visually indicating the selection of the first photo of the second set of multiple of the plurality of photos in the grid; in response to the receipt of the indication of the second touch input for trace path-based selection of the first photo of the second set of multiple of the plurality of photos in the grid, add a check mark icon to the first photo of the second set of multiple of the plurality of photos in the grid, for visually indicating the selection of the first photo of the second set of multiple of the plurality of photos in the grid; receive, utilizing the touchscreen, an indication of a continuation of the second touch input for trace path-based selection of a second photo of the second set of multiple of the plurality of photos in the grid; in response to the receipt of the indication of the continuation of the second touch input for trace path-based selection of the second photo of the second set of multiple of the plurality of photos in the grid, cause selection of the second photo of the second set of multiple of the plurality of photos in the grid, utilizing the one or more processors; in response to the receipt of the indication of the continuation of the second touch input for trace path-based selection of the second photo of the second set of multiple of the plurality of photos in the grid, change at least one visual aspect of the second photo of the second set of multiple of the plurality of photos in the grid, for visually indicating the selection of the second photo of the second set of multiple of the plurality of photos in the grid; in response to the receipt of the indication of the continuation of the second touch input for trace path-based selection of the second photo of the second set of multiple of the plurality of photos in the grid, add a check mark icon to the second photo of the second set of multiple of the plurality of photos in the grid, for visually indicating the selection of the second photo of the second set of multiple of the plurality of photos in the grid; after the selection of at least one of the first set of one or more of the plurality of photos, or the second set of multiple of the plurality of photos; receive, utilizing the touchscreen, an indication of a third touch input on the operation icon; and after the indication of the third touch input on the operation icon, operate on at least one of the first set of one or more of the plurality of photos, or the second set of multiple of the plurality of photos.

DETAILED DESCRIPTION

Figure 1:
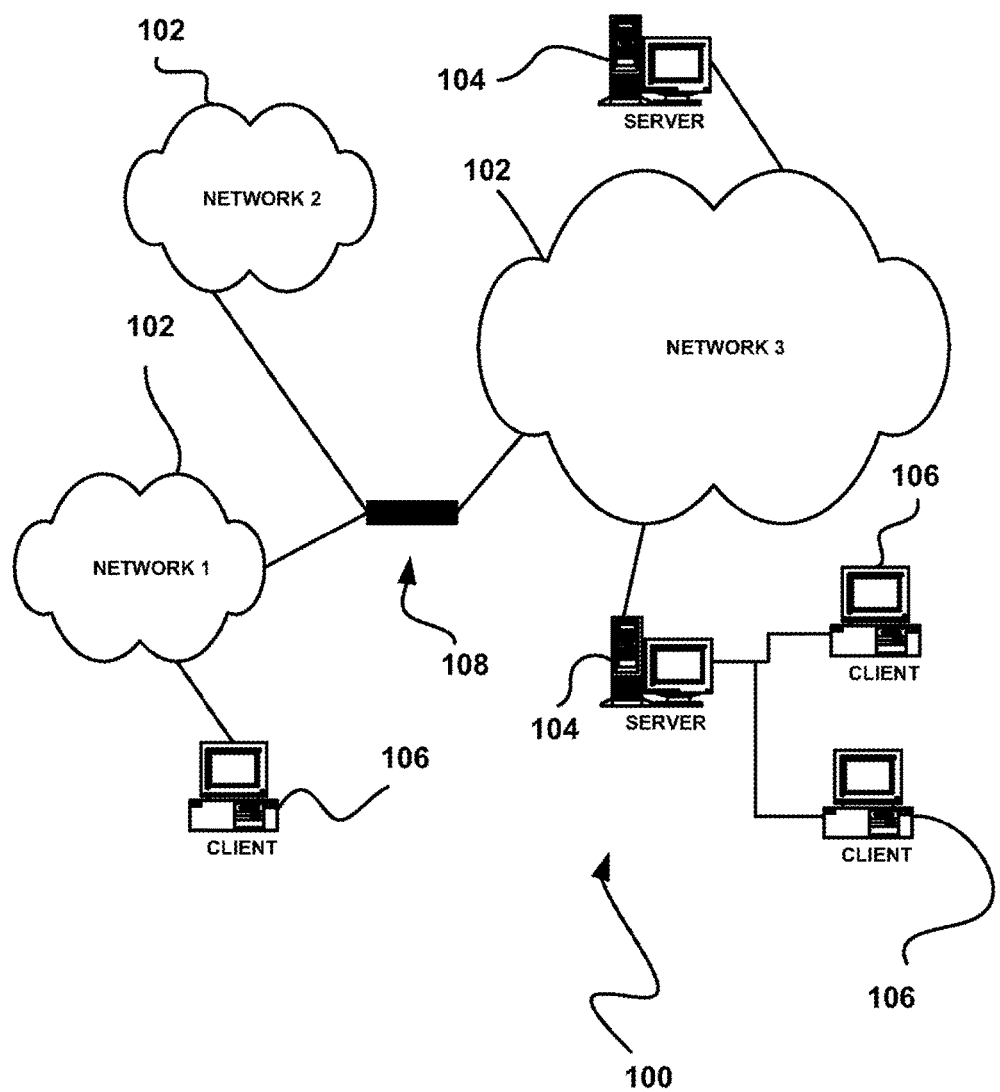
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
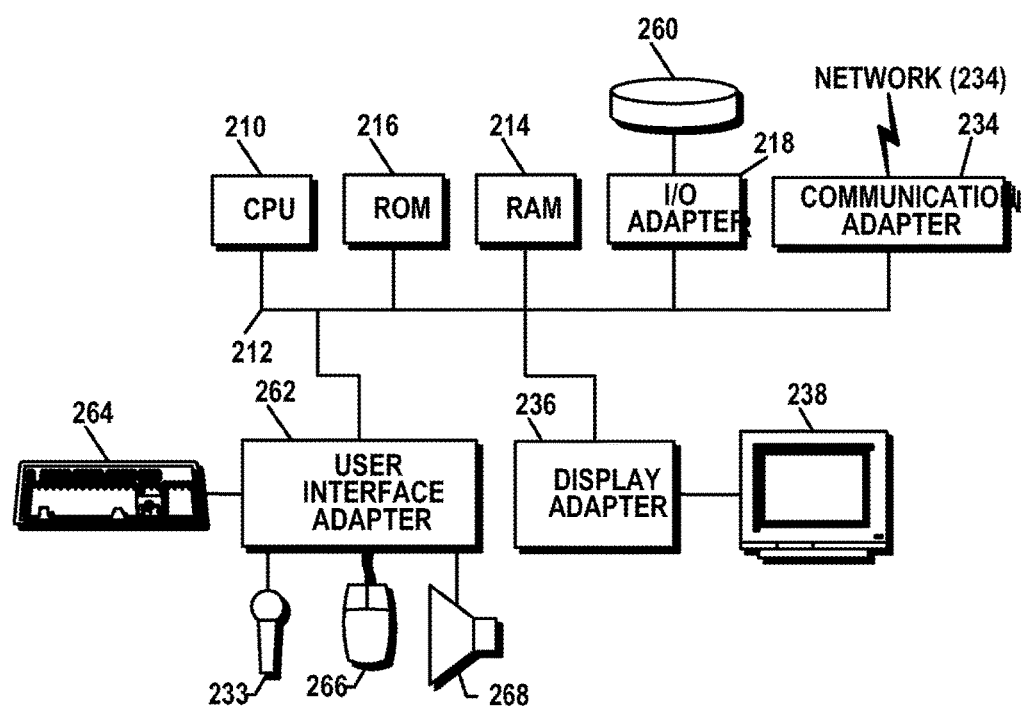
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
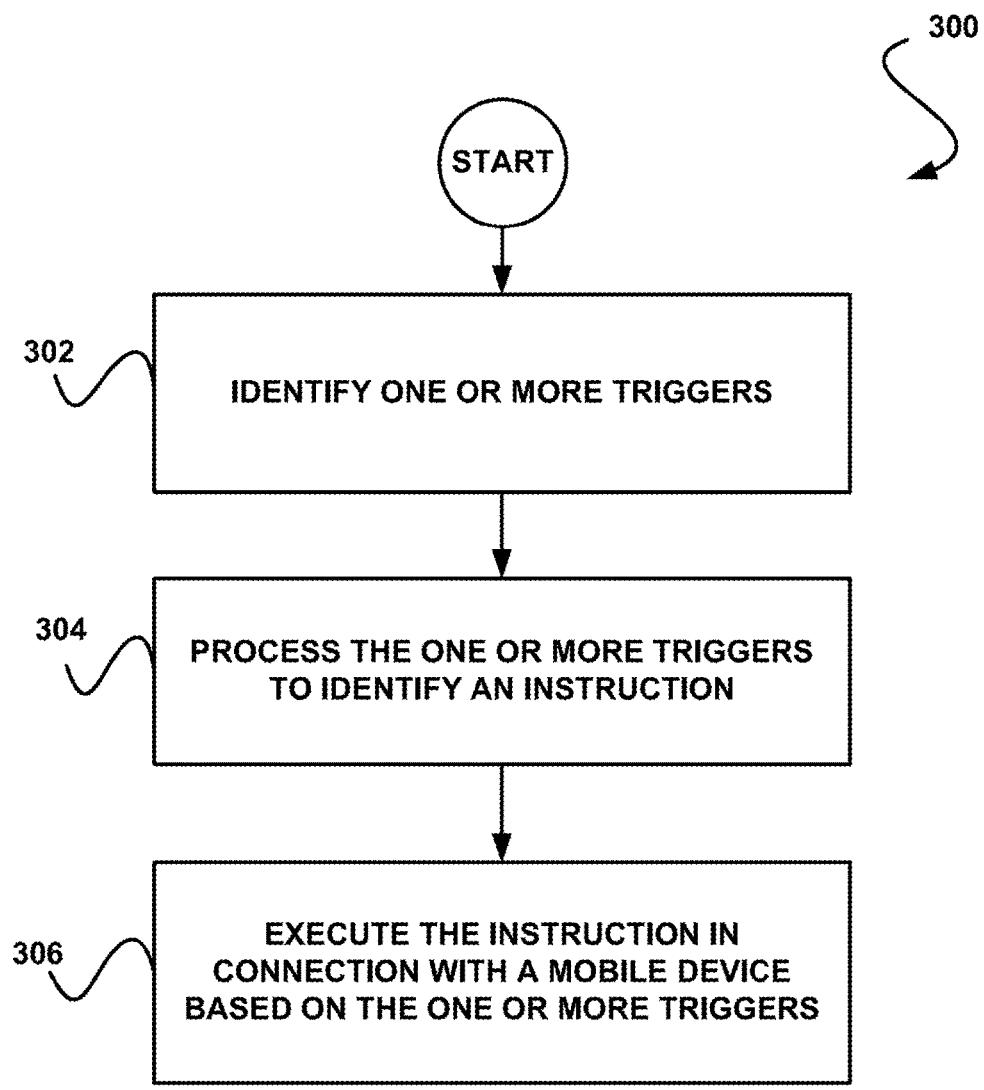
FIG. 3 shows a method for executing an instruction in connection with a mobile device, in accordance with one embodiment.

FIG. 3 shows a method 300 for executing an instruction in connection with a mobile device, in accordance with one embodiment. As an option, the method 300 may be implemented in the context of the architecture and environment of the previous Figures and/or any subsequent Figure(s). Of course, however, the method 300 may be carried out in any desired environment.

As shown, one or more triggers are identified. See operation 302. Additionally, the one or more triggers are processed to identify an instruction. See operation 304. Further, the instruction is executed in connection with a mobile device based on the one or more triggers. See operation 306.

In the context of the present description, a trigger may include anything which may be associated with the mobile device and which may cause the mobile device to respond and/or take action in some manner. For example, in various embodiments, a trigger may include time, date, location, a phone conversation, notes, other devices near the user's mobile device (e.g. a device associated with a trusted entity, etc.), weather, a map (e.g. as an application on the mobile device, etc.), a rss feed, calendar, carrier information (e.g. signal strength, etc.), social media (e.g. comments, postings, uploads, etc.), stocks, an action (e.g. by a user, by an application, by a trusted entity, etc.), a plurality of actions (e.g. by the user, by an application, by a trusted entity, etc.), messaging platform (e.g. email, voicemail, SMS, etc.), camera, browsing history (e.g. of the user, of another entity, etc.), purchase history (e.g. of the user, of another entity, etc.), network (e.g. WiFi, NFC, Bluetooth, connectivity, etc.), speed (e.g. speed of the user, speed of a vehicle, etc.), a request (e.g. from another device, from a cloud based app, from another entity, etc.), an application (e.g. installed on the device, associated with an installed application, associated with an app management system, etc.), and/or any other feature which may cause the mobile device to respond and/or take action in some manner. In another embodiment, a trigger may include a macro, a script, and/or any other preconfigured set of one or more inputs.

An instruction may include one or more triggers and one or more response actions. A response action may include any action taken by the mobile device in response to one or more triggers. For example, in various embodiments, a response action may include posting and/or sending a message (e.g. via social network, via email, via SMS, etc.), displaying and/or suppressing a notification (e.g. text notification, audible notification, etc.), uploading and/or downloading a data file (e.g. photo, document, etc.), activating and/or deactivating a service (e.g. Bluetooth, WiFi, GPS, NFC, device volume, device screen brightness, etc.), creating a data file (e.g. email, document, photo, SMS, posting, etc.), modifying and/or deleting a data file (e.g. email, document, photo, SMS, posting, etc.), importing and/or exporting a data entry (e.g. contact, etc.), executing and/or quitting a mobile device app (e.g. Facebook app, Yelp app, Flickr app, etc.), send and/or receive a message (e.g. SMS, email, chat, etc.), accept and/or reject a connection (e.g. Facebook friend, Linked-in contact, CRM database management service, etc.), initiate and/or reject payment (e.g. ticket purchase, online service purchase, purchase verification email, etc.), completing a phone call, navigating to a destination, updating a user list (e.g. todo list, etc.), updating a count (e.g. kitchen item inventory, etc.), purchasing and/or ordering an item (e.g. grocery item, car oil etc.), scheduling an appointment (e.g. with a client, with a doctor, etc.), and/or taking any action in response to a trigger. In another embodiment, a response action may include a macro, a script, and/or any other preconfigured set of one or more actions.

Additionally, the response action may include an advertisement, a suggestion, incentive, useful information, a utilitarian function, and/or any type of an output. Useful information and/or utilitarian function may include, but are not limited to passes (e.g. boarding or travel passes, etc.), tickets (e.g. movie or event tickets, etc.), commerce-related programs/cards (e.g. loyalty program/cards, etc.), etc. In the context of the present description, an advertisement may include anything (e.g. media, deal, coupon, suggestion, helpful information/utility, etc.) that has at least a potential of incentivizing or persuading or increasing the chances that one or more persons will purchase a product or service.

Further, in one embodiment, the response action may occur based on availability of the user (e.g. active use of the device, no appointments listed, etc.). For example, in one embodiment, the response action may conditionally occur based on a facial recognition in connection with a user of the mobile device. In one embodiment, if it is determined that the user is viewing the mobile device, utilizing facial recognition, the action may occur utilizing the mobile device. In another embodiment, the action may occur based on movements by the user and/or device (e.g. as determined by accelerometers, gyroscopes, device sensors, etc.). For example, in one embodiment, the movement of the device may indicate the user is walking and has sat down (e.g. in a vehicle, etc.), whereupon the device Bluetooth system may be activated and Pandora may automatically begin to stream from the phone to a vehicle audio system. Of course, any response action may occur in response to any trigger.

Additionally, the application on the mobile device may include any type of online or locally stored application. In various embodiments, the application may include a social network application, a dating service application, an on-line retailer application, a browser application, a gaming application, a media application, an application associated with a product, an application associated with a location, an application associated with a store (e.g. an online store, a brick and mortar store, etc.), an application associated with a service, an application associated with discounts and/or coupon services, an application associated with a company, any application that performs, causes, or facilitates the aforementioned action(s), and/or any other type of application including, but not limited to those disclosed herein.

In the context of the present description, the mobile device may include any type of mobile device, including a cellular phone, a tablet computer, a handheld computer, a media device, a mobile device associated with a vehicle, a PDA, an e-reader, and/or any other type of mobile device.

In one embodiment, the trigger may include receiving a communication (e.g. advertisement, message, etc.) and the response action may include displaying an advisement. In one embodiment, the advertisement may be displayed in a non-intrusive manner. For example, in one embodiment, the action (e.g. advertisement, etc.) may be manifested utilizing a lock screen, or any other type of additional screen (e.g. swipe down screen, etc.), of the mobile device. In another embodiment, the action (e.g. advertisement, etc.) may be manifested during an unlocking of a lock screen of the mobile device. In still other embodiments, the action (e.g. advertisement, etc.) may be manifested in a manner that is integrated in any regular usage of the mobile device. Of course, any such manifestation of the aforementioned action may be presented in any manner that reduces an intrusiveness of a presentation thereof.

In another embodiment, the trigger may include receiving input from the user, including navigating to a gallery of photos, selecting photos to be shared, and selecting a recipient. The response action to such triggers may be to send the photos (e.g. email, SMS, etc.) to the recipient, to upload the photos (or a compressed folder of photos, etc.) to an account (e.g. social networking site, etc.) associated with the recipient, to modify (e.g. compress, apply filters, etc.) the photos before sending them to the recipient, and/or to take any other action relating to the selection of the photos and of a recipient. The instruction recorded therefore may include both the triggers (e.g. input from the user, etc.) and the response action or one or more actions.

Further still, in one embodiment, the trigger may include receiving a weather update (e.g. via RSS feed, via email, via weather application, via push update, etc.). A response action may include displaying a notification, causing a map application to update a route to account for weather conditions, causing a calendar appointment to calculate the time at which the user must leave to arrive at one or more appointments on time, sending an email notification to participants of an event regarding the weather update, and/or taking any other action in response to the weather update. The instruction recorded therefore may include both an update received (e.g. regarding weather, etc.) and one or more response actions (e.g. display notification, interact with other applications, etc.).

In the context of the present description, executing the instruction may include implementing the one or more triggers and the one or more response actions in any manner. For example, in various embodiments, executing the instruction may include applying a macro, causing one or more applications to interact, applying a script, applying a string of commands, and/or applying one or more triggers and one or more response actions. In one embodiment, the instruction may be executed automatically (e.g. as a result of one or more triggers, etc.) or manually. Additionally, in another embodiment, the instruction may be executed by a voice command, by a remote configuration (e.g. command from a remote device, etc.), and/or by any other manner.

As an example, in one embodiment, the instruction may include pressing a button on a homescreen (or anywhere located on the device, etc.), causing a string of commands to be implemented including determining all emails received from the last week from CONTACT_X, forwarding the batch of emails onto CONTACT_Y, archiving the emails to a predefined location (e.g. dropbox folder, etc.), and emailing a list of received emails to CONTACT_Z. In another embodiment, the instruction may be executed by giving a predefined voice command (e.g. "execute weekly email cleanup," etc.). Of course, any command and/or string of commands (e.g. relating to one or more triggers and one or more actions, etc.) may be implemented by an instruction (e.g. via a shortcut, a button, a voice command, an app, etc.). As such, the instruction may be manually executed.

In a separate embodiment, the instruction may be executed automatically. For example, in one embodiment, the mobile device may indicate (e.g. via sensors, etc.) that the user has entered a restaurant. In response, the instruction may cause a response action to be automatically initiated including updating a status on social networking site (e.g. Facebook, Foursquare, etc.), sending a message (e.g. email, SMS, etc.) to participants of the event that the user has arrived, and/or taking any other action or actions as initiated by the instruction.

In another embodiment, the instruction may automatically execute (e.g. on a weekly basis, time trigger, etc.) a string of commands to be implemented including determining all emails received from the last week from CONTACT_X, forwarding the batch of emails onto CONTACT_Y, archiving the emails to a predefined location (e.g. dropbox folder, etc.), and emailing a list of received emails to CONTACT_Z. Of course, any command and/or string of commands (e.g. relating to one or more triggers and one or more actions, etc.) may be implemented in a similar. As such, the instruction may be automatically executed.

More illustrative information will now be set forth regarding various optional architectures and features with which the foregoing techniques discussed in the context of any of the present or previous figure(s) may or may not be implemented, per the desires of the user. For instance, various optional examples and/or options associated with the one or more triggers of operation 302, the instruction of operation 304, the executing of the instruction of operation 306, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 4:
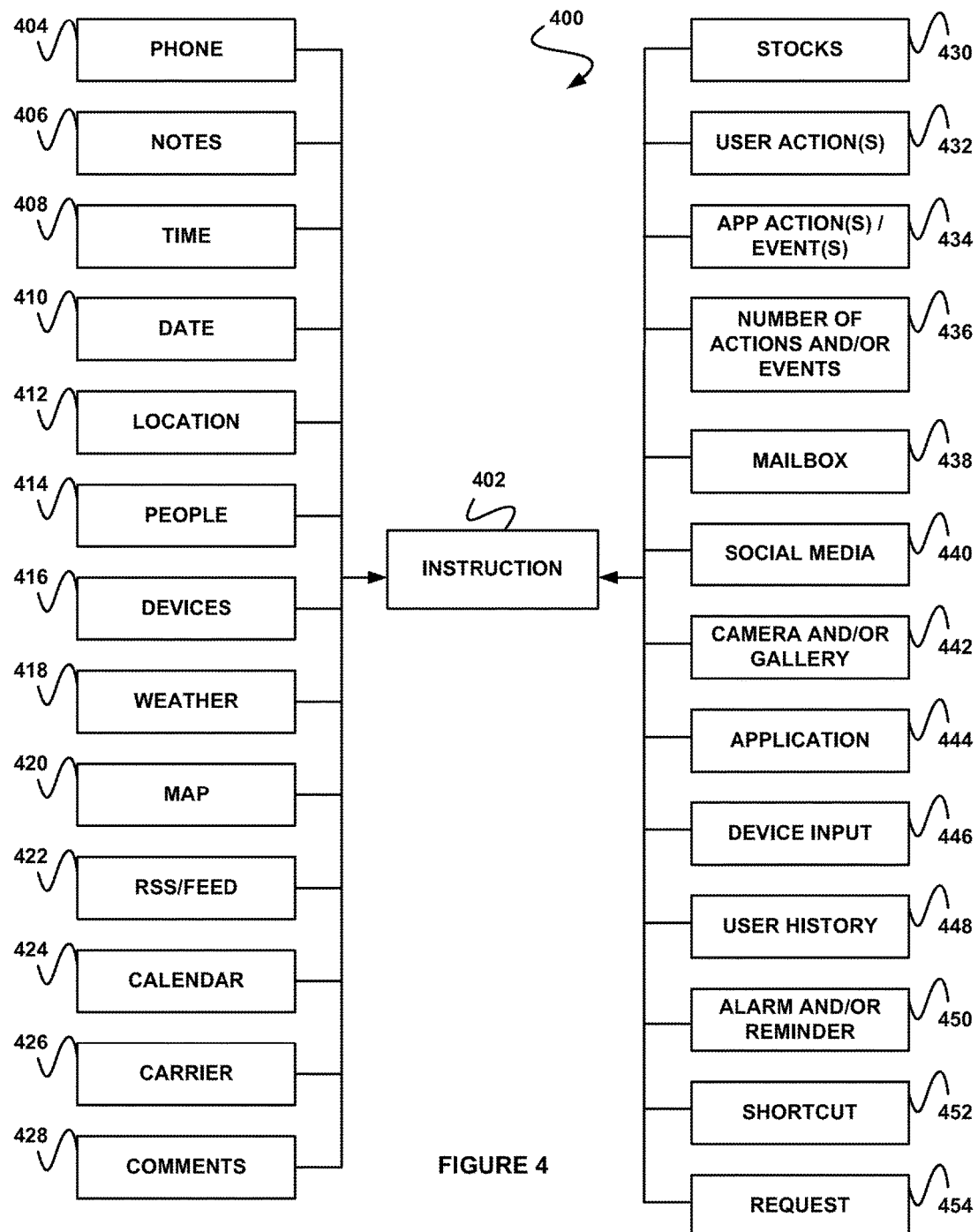
FIG. 4 shows a system for triggering an instruction in connection with a mobile device, in accordance with another embodiment.

FIG. 4 shows a system 400 for prompting an action by a platform in connection with a mobile device, in accordance with another embodiment. As an option, the system 400 may be implemented in the context of the architecture and environment of the previous Figures and/or any subsequent Figure(s). Of course, however, the system 400 may be implemented in the context of any desired environment. It should also be noted that the aforementioned definitions may apply during the present description.

As shown, one or more triggers 404-454 may cause an instruction 402 in connection with a mobile device to be executed. In one embodiment, a trigger may include a phone 404. In various embodiments, a phone call may trigger an action, including automatic speech-to-text dictation, the display of a notes application screen (e.g. to jot down some notes, etc.), rejection of the phone call, priority tagging (e.g. application of a different ringer, elevation of ringtone, etc.) of the phone call, the sending (e.g. via SMS, email, etc.) of a pre-scripted message response (e.g. "Inside of a noisy hall. I'll call you back after my event," "Running a bit late—will be there in a few minutes," etc.), and/or any other action. Of course, any pre-scripted message response may be sent, and in another embodiment, a list of pre-scripted messages may be presented to the user for selection, and if no selection is made, the top message response (e.g. determined by user usage, determined by relevancy, etc.) may be sent.

In other embodiments, the action taken in response to the phone call may be dependent on the user identity, a user tag, and/or any other information associated with the caller. For example, in one embodiment, the caller may be a manager or boss of the user, in which case the phone call may be prioritized (e.g. ringer volume increased, etc.). In another embodiment, the caller may have a tag of "client" and if the user does not answer the call, a message may be automatically sent (e.g. via SMS, via email, etc.) to the caller thanking him/her for the call and indicating that the user will respond to the call as soon as is possible. Of course, any message and/or action may be taken in response to the phone call.

In one embodiment, a trigger may include notes 406 such as text entered, a recorded audio, a speech-to-text function, and/or any other input associated with a note. In some embodiments, the notes may be associated with an app (e.g. Evernote, a notes app, phone, etc.), with an event (e.g. calendar item, etc.), with a contact (e.g. contact manager, etc.), and/or any other with any other feature (or app) of the mobile device. In another embodiment, the notes may include context awareness features such as the ability to determine who the note relates to (e.g. note may include the text "Call Bill," etc.), what the note relates to (e.g. time, place, and/or other information associated with the text or audio of a note, etc.), and/or the ability to track the note (e.g. note sent from user to contact, and from the contact to another contact and so forth, etc.).

In various embodiments, a notes may trigger an action, including initiating a phone call (e.g. based on a contact listed in a note, etc.), sending a message (e.g. email, SMS, etc.), setting a reminder (e.g. calendar reminder, etc.), creating an event detail (e.g. calendar item, etc.), uploading information to an online server (e.g. social networking site, blog, etc.), and/or taking any other action in response to a note. In one embodiment, the note may be spoken as a voice command (e.g. "NOTE: remind me to clean the bathroom," etc.) and may be set to remind the user based off of a proximity timer (e.g. if the user exceeds the proximity, it may activate the reminder, etc.), a time based timer (e.g. 12 pm the next day, etc.), a calendar based availability timer (e.g. device may recognize the user has free time the following day at 2 pm and may remind the user at that time due to the availability, etc.), and/or taken any other action relating to the voiced note.

In one embodiment, a trigger may include a time 408. For example, in various embodiments, a time may include the amount of time at a location, a time of day (e.g. morning, afternoon, night, etc.), an exact time (e.g. 6:43 pm, etc.), availability (e.g. free time in a schedule, etc.), and/or any other association to time. For example, in one embodiment, the mobile device may belong a young child, and at 9 pm, if the child is not at home, the current location of the child (e.g. based on GPS signal, etc.) may be pushed to other subscribing devices (e.g. mobile device associated with a parent, etc.). Of course, any action may be triggered in response to a time trigger.

In another embodiment, a trigger may include a date 410. For example, in various embodiments, a date may include a date range (e.g. an event lasting three days, vacation dates, etc.), a reoccurring day and/or range of the week and/or month and/or year (e.g. every Monday of the month, third Sunday of every month, quarterly and/or annual basis, etc.), a specific date (e.g. May 20, 2012, etc.), and/or any other association to a date. As an example, in one embodiment, the user of the mobile device may have an event scheduled for a specific date. In response to the event scheduled, the upcoming date may trigger one or more actions, including sending out a general reminder to participants, providing a weather forecast for the event, presenting any necessary detours to navigate to the event (e.g. based on scheduled construction issues, etc.), requesting participants to update a status (e.g. will attending, will not attend, etc.), and/or taking any other action in response to the event scheduled. In another embodiment, a preview (e.g. of an email, of a message, of a reminder, etc.) associated with a date may be automatically sent to a user of the mobile device for approval before being sent to a participant and/or another recipient contact.

Still yet, in another embodiment, a trigger may include a location 412. In various embodiments, a location may include a current location of the mobile device, a preconfigured address (e.g. address associated with "home," "work," and/or any preset location, etc.), a destination, and/or any other address. In various embodiments, the location may trigger a number of one or more actions, including updating a social networking site (e.g. Facebook, Foursquare, etc.), sending a message (e.g. email, SMS, etc.) to a contact, updating a management system (e.g. truck route progress, etc.), displaying a website associated with the location, displaying an app associated with the location (e.g. an app from the store, etc.), and/or taking any other action in response to the location.

In one embodiment, a trigger may include people 414. For example, in various embodiments, people may include individuals within a close geographic proximity (e.g. less than 10 feet, etc.) to the user, pre-selected contacts (e.g. favorite contacts, contacts with a tag, etc.), unknown individuals, and/or any person that may interact in some manner with the user's mobile device. For example, in various embodiments, people may trigger one or more actions, including a request to share information (e.g. meet new contacts, share business card, share data file such as a photo, etc.), to update a status on a social networking site (e.g. Facebook, etc.), to create a shared data file (e.g. shared whiteboard, etc.), to control another mobile device, and/or any other action in response to people.

As an example, in one embodiment, a user of a mobile device may be in close proximity to a group of friends. The mobile device may recognize (e.g. via device recognition, GPS location, etc.) the presence of the other friends and automatically update a status on a social networking site that the user is now with such friends. Any photos that are taken during the event may be instantly pushed and shared to other devices associated with the friends. Additionally, permission may be automatically granted to such friends to control at least some aspect (e.g. ability to push information, ability to control camera, etc.) associated with the user's mobile device. Of course, when the friends are beyond a threshold geographic proximity to the user, all automatic and applied settings may be terminated (e.g. sharing settings are severed, permissions are revoked, social networking updates of the group are halted, etc.).

In another embodiment, a trigger may include devices 416. For example, in various embodiments, devices may include any device located within a close geographically proximity (e.g. within 20 feet, etc.) of the mobile device of the user, any device already associated with the user's mobile device (e.g. known device associated with a trusted entity, etc.), any device not yet associated with the user's mobile device (e.g. new devices not before paired and/or connected, etc.), and/or any other device which may interact with the user's mobile device in some manner. Of course, devices may include other mobile devices, televisions, tablets, cash registers, and/or any other electronic device which may send and receive an electronic signal (e.g. to enable communication, etc.). In various embodiments, devices may trigger one or more actions, including a payment display page (e.g. electronic transfer, credit card charge, etc.), a display to share with and/or receive from another device (e.g. device associated with a trusted entity, etc.) data and/or information, stream data (e.g. photos, music, slideshow, videos, etc.) and/or other information (e.g. text feeds, etc.), display advertisements (e.g. relevant coupons and/or discounts, etc.), cause the user's mobile device display to function in another manner (e.g. secondary display to a master device, function as a mouse, keyboard, or another preselected function, etc.), and/or any other action taken in response to another device.

As an example, in one embodiment, the user's mobile device may detect that a cash register device is within a predetermined geographic proximity (e.g. within 10 feet, etc.). In response to the detection, the mobile device may display a payment display page with an option to pay. After the items have been scanned by the cash register, the items and total price may be displayed on the user's mobile device. The user may select to pay for the items using a stored payment account (e.g. credit card account, banking routing number and account, etc.). After the payment, the payment display page may automatically update a personal finance application with the pending transaction, as well as display to the user current budget balances. In another embodiment, current budget balances may be displayed to the user before processing the payment so that the user may verify that the purchase is within a predetermined expense budget.

In a further embodiment, the user's mobile device may detect other devices (e.g. relating to a brick and mortar store, etc.). Such other devices may seek to push coupons and/or ads, and/or invite the user to download and/or use an app associated with the store. In response, the mobile device may automatically filter and/or reject content pushed from other devices. For example, the user may indicate that all app requests are to be rejected except for entertainment related shops, and all content including coupons and/or ads are to be rejected unless it relates to a discount of at least 75%. If a coupon is at least 75% off, the coupon may be pushed and displayed to the user. Additionally, the user may have also configured the mobile device so that when such coupons and/or ads are displayed on the device, they are also automatically uploaded (e.g. to a blog, social networking site, etc.) and shared with other friends associated with the user.

In one embodiment, a trigger may include weather 418, including weather associated with the current location of the user, and/or weather associated with another location set by the user. The weather may trigger one or more actions, including displaying a notification (e.g. "weather is cool at 60 degree," etc.), sending a message (e.g. SMS, email, etc.) to a contact (or participants of an event, etc.), rerouting a navigation route, displaying a recommendation (e.g. "take a coat," safety recommendations, weather advisory warnings, etc.), and/or taking any action in response to the weather.

In another embodiment, a trigger may include a map 420. In one embodiment, the map may be a separate and distinct app. In another embodiment, the map may be included and be embedded within another app and/or feature associated with the mobile device (e.g. pushed interactive image from another device, device map platform, etc.). In various embodiments, the map may trigger one or more actions, including navigating to a location, finding a location (e.g. address, store, sites, etc.), displaying trusted entities (e.g. friends, etc.) near the user, estimating one or more times of arrival, displaying one or more overlays (e.g. bike view, real time traffic, pedestrian view, points of interest [POI], etc.), and/or any other action associated with the map app.

As an example, every time the user gets into a car, the user starts a map app to display real-time traffic updates. In response, the user activates a navigation feature to apply the quickest route home. In one embodiment, rather than go through the same process repeatedly, the user may automate the process so that as soon as the user enters the car (e.g. based off of sensors, etc.), the map application automatically displays real-time traffic feeds, selects the quickest route home, and then begins the navigation feature to apply the quickest route home. In another embodiment, the user may select a button the homescreen of the mobile device which would then start a navigation feature to apply the quickest route (from real time traffic updates) home. In a further embodiment, the user may give a verbal command (e.g. "navigate home," etc.) to navigation feature to apply the quickest route (from real time traffic updates) home. Of course, any method may be used to save and execute the string of commands.

In another embodiment, on a daily basis, the user may open a map app to view possible locations to eat lunch. Additionally, the user may view other friends on the map who intend to eat lunch with the user. After selecting a location, the user sends a message out to all friends giving the location. Once at the location, the user sends a message out to all friends notifying them that the user has arrived. In one embodiment, rather than apply these same steps repeatedly (e.g. daily, etc.), the user may automate the process so that every morning, the map app gives a recommendation (e.g. based on Yelp ratings, etc.) of a lunch location, and after the user approves, the mobile device automatically sends a message to all friends. When the user arrives at the intended location, the mobile device may automatically send a message out to all friends that the user has arrived, as well as automatically display a map with a real time update of the location of each friend. Of course, permissions to view the location of a friend may be controlled by the friend (e.g. temporary permission, full permission, etc.). Additionally, in other embodiments, the string of commands may be saved to a button shortcut, and/or be used by a verbal command (e.g. send my friends a lunch update, view my friends, etc.), and/or executed in any manner.

In another embodiment, a trigger may include an RSS/Feed 422. In various embodiments, the RSS and/or Feed may be associated with an app (e.g. gaming app, food app, news app, etc.), may be an app (e.g. RSS management app, feed management app, etc.), may be associated with an online site (e.g. site which pushes updates to a mobile device, blog entries, news headlines, etc.), and/or may be associated with an RSS reader, feed reader, aggregator (e.g. web based, desktop-based, mobile device based, etc.), and/or any other app and/or RSS tool. The RSS/Feed may trigger one or more actions, including causing the mobile device to sound an audible and/or visible (e.g. flashing light, display feed on home screen, display feed on locked screen, etc.) notification, send a message (e.g. SMS, email, etc.), post a message (e.g. onto a blog, onto a social networking site, etc.), give a recommendation (e.g. best feed deal out of the past ten feeds, etc.), forward on the feed (e.g. to a contact, etc.), provide a summary (e.g. of the article referenced by the feed, etc.), provide a text-to-speech function (e.g. for immediate playback in a vehicle, etc.), and/or any other action taken in response to receiving an RSS and/or feed.

In some embodiments, the action may require approval by the user before being completed. For example, in various embodiments, receiving a RSS feed update may initiate the creation of a blog posting. The blog posting may be prepared (e.g. with text, graphics, photos, etc.) with a preview sent to the user (e.g. via mobile device app, via email, etc.). If the user approves of the preview (e.g. by selecting an "approve" button, etc.), the posting may be uploaded to a bog. Of course, any preview and/or approval process may be associated with an RSS and/or feed item.

In another embodiment, the user may belong to a technology group focusing on semi-conductors. Whenever the user receives a RSS and/or feed relating to a competitor's use of doping (e.g. addition of impurities in semiconductor material, etc.), the user immediately forwards on the update to all in the technology group. The user may automate the process so that whenever a RSS and/or feed is received which relates to semiconductors and which relates doping, the RSS and/or feed is immediately forwarded on to preselected members of the user's technology group. The string of commands (making up the automated process, etc.) may be saved within an app (e.g. RSS management app, etc.), by the mobile device (e.g. native utility on the device, etc.), by an online platform (e.g. online RSS feed subscription management site, etc.), and/or saved in any manner. Additionally, in other embodiments, the string of commands may be saved to a button shortcut, and/or be used by a verbal command, and/or executed in any manner.

In one embodiment, a trigger may include a calendar 424. In various embodiments, an action may be taken in response to a scheduled event (e.g. appointment, etc.), unscheduled time (e.g. free time, etc.), a metadata tag (e.g. appointment is tagged as relating to work, a priority tag associated with the event, etc.), an event creation source (e.g. created by another user on a shared calendar, etc.), an event duration (e.g. one hour, two days, etc.), and/or any other feature associated with a calendar. The calendar may trigger one or more actions, including rescheduling an event, notifying participants of an event of a conflict (e.g. new conflict, existing conflict, etc.), notifying participants of an event of newly added participants, finding and/or presenting related content (e.g. airline ticket, car rental, hotel rental, points of interest, etc.), displaying and/or playing a notification (e.g. audible, text, alarm, etc.), sharing an event (e.g. with a contact, with a participant, etc.), creating a shared resource to be used at the event (e.g. shared word processing document, shared photo platform, etc.), and/or taking any other action in response to a calendar.

As an example, in one embodiment, a user may set up an event relating to a business travel trip. After scheduling the time for the event, the user may search for airplane tickets, hotels in the vicinity, maps to get to the destination, and/or other items relating to the business travel trip. After making all such reservations and/or gathering the material, the user may send an overview of the event (e.g. location, hotels, car rental, etc.) to a business manager, as well as to a business accountant so that the user can be reimbursed for the trip. Such a series of one or more actions may be automated. For example, after creating an event (e.g. including time, dates, location, metadata tag indicating business trip, etc.), the calendar may fetch related items (e.g. airplane tickets, recommended hotels, rental car, etc.) and present a package to the user. After selecting an appropriate package, the calendar may communicate with each item to finalize the reservation. After receiving confirmation of each reservation (e.g. via email, etc.), the calendar app may generate an overview of the entire event (e.g. each confirmed reservation, location specifics, price for each item and total price, etc.). Such an overview may be sent to the user (e.g. preview pane, preview screen, via email, etc.) to obtain the user's approval. Once the user approves of the overview, it may be automatically sent to the user's manager and the business accountant. In this manner, the number of steps (and time) required of the user may be greatly reduced. Of course, any action may be taken in response to a calendar. Additionally, in other embodiments, the string of commands (e.g. one or more actions relating to the calendar event, etc.) may be saved to a button shortcut, and/or be used by a verbal command, and/or executed in any manner.

In another embodiment, a trigger may include a carrier. For example, in various embodiments, a carrier may include a network data signal, a network telephone signal, a roaming signal, and/or any other type of signal and/or feature associated with a carrier. In some embodiments, the carrier may be used to trigger one or more actions, including an ability to stop, cancel, and/or limit a feature and/or service (e.g. SMS, data, voice, specialized ringtones, etc.), send a message (e.g. SMS, email, etc.), enable emergency services and/or features (e.g. 911 calls only, etc.), and/or any other action relating to a carrier.

As an example, in one embodiment, the user of a mobile device may automate a process so that when the user is near exiting a carrier's data signal (e.g. based off of carrier coverage maps, etc.), the user's mobile device may automatically send out a message (e.g. SMS, email, etc.) to one or more contacts (e.g. preselected contacts, filtered contacts based on metadata tag, etc.) to inform them that the user will be losing coverage and will not be able to respond to messages (e.g. email, SMS, voice, etc.) immediately. Of course, the automatic one or more actions may relate to anything and/or be configured in any manner by the user. Additionally, in other embodiments, the string of commands (e.g. one or more actions relating to a network carrier signal, etc.) may be saved to a button shortcut, and/or be used by a verbal command, and/or executed in any manner.

In one embodiment, a trigger may include comments. For example, in various embodiments, comments may be associated with an online forum (e.g. blog, social networking site, video sharing site, photo sharing site, etc.), received via a messaging platform (e.g. email, SMS, chat, etc.), may include text, audio, photos, videos, and/or any other data file (e.g. document, spreadsheet, etc.), and/or may be received in any manner. In various embodiments, the comment may be analyzed to determine a context (e.g. based off of text, sender location, destination location, calendar item, purchase history, email history, browsing history, etc.), may be associated with a metadata tag (e.g. comment relates to vacation, Hawaii, family, and year 2012 tags, etc.), may be associated with a string of comments and/or conversation (e.g. chat, etc.), and/or may be associated with any item associated with the comments.

In one embodiment, the context of the comments may be used to trigger an action. For example, in various embodiments, the context may include any circumstances associated with a comment, and/or location information (e.g. UPS location information, a physical address, an IP address, shopping center, movie theatre, stadium, etc.), network information (e.g. information associated with the network currently being utilized or currently being accessed, etc.), information relating to applications being utilized (e.g. games, maps, camera, retailer, social networking, etc.), current activities (e.g. shopping, walking, eating, reading, driving, etc.), browsing activity, environment (e.g. environmental audio, weather, temperature, etc.), payment activities (e.g. just purchased coffee, groceries, clothes, etc.), comment history, social networking site history, actual text of comment, attachment associated with a comment, data item (e.g. photo, video, etc.) associated with a comment, and/or any other type of information which may relate in some manner to context and/or comments.

In one embodiment, the context may be determined based, at least on part, on information provided by one or more sensors, applications, inputs, software associated with the mobile device, an advertisement/content management platform, an operating system associated with the mobile device, and/or any context source. In another embodiment, the context may be determined based, at least in part, on current and/or past activities of the user (e.g. as determined by hardware/software associated with the mobile device, etc.). In another embodiment, the context may be determined by current and/or past activities of the mobile device. In another embodiment, the context may be determined based on a location of the user and/or the mobile device.

The context may include any circumstances that form one or more settings for an instruction (e.g. an input, display settings, location settings, content display, advertisement display, etc.). For example, in various embodiments, information for determining the context may include location information (e.g. GPS location information, a physical address, an IP address, shopping center, movie theatre, stadium, etc.), network information (e.g. information associated with the network currently being utilized or currently being accessed, etc.), applications being utilized (e.g. games, maps, camera, retailer, social networking, etc.), current activities (e.g. shopping, walking, eating, reading, driving, etc.), browsing activity, environment (e.g. environmental audio, weather, temperature, etc.), payment activities (e.g. just purchased coffee, groceries, clothes, etc.), and/or any other type of information associated with a context.

In some embodiments, based on the context of a comment, an action may be triggered, including setting an alarm and/or reminder (e.g. including setting a geofence border and/or trigger, etc.), creating and/or modifying a calendar event, providing a response to a comment (e.g. using pre-scripted responses, etc.), maintaining statistics (e.g. positive comments v. negative comments, etc.), posting a message (e.g. blog, social networking site, etc.), and/or taking any further action based off of the context of a comment. In other embodiments, a comment, regardless of the context, may be used to trigger an action, including giving a notification (e.g. 5 new comments, etc.), maintaining statistics (e.g. relating to comments generated, etc.), aggregating the comments to be presented to the user (e.g. displayed on a comments screen, overlay, menu, in an email, etc.), and/or taking any action in response to a comment.

As an example, in one embodiment, a user may post a blog posting which is published on more than one blog site. In response, comments relating to a blog posting may be posted on more than one site. The user's mobile device may take all such comments, aggregate them into one collection in a central comments repository (e.g. comments app, etc.). Additionally, in response to issues raised in the comments, the user may respond to such comments. Often, the issues raised may be very similar. Rather than respond to each comment individually, the user may automate responding to all pertinent comments (e.g. via a comments app on mobile device, etc.). The mobile device may identify a common issue in more than one comment (e.g. based on the text of the comments, etc.) and present the one or more issues to the user of the mobile device. The user may write one or more comment responses (e.g. based on the one or more issues identified, etc.). The mobile device may automatically select more one or more comment to which the response may pertain, request approval of the selected applicable comments from the user, and then the mobile device (e.g. comments app, etc.) may automatically post the response to the appropriate site. In this manner, an action may be taken in response to a context of a comment. Of course, in another embodiment, the user may write a comment response and then select a button to apply a string of preconfigured one or more actions, including formatting the response in a different manner (e.g. depending on the intended recipient and/or destination, etc.), modifying the text (e.g. insert name of original comment author, etc.), and/or taking any further action relating to the context of the comment.

In another embodiment, a comment may be received by the user from a trusted entity (e.g. friend, trusted business, etc.). The comment may include a confirmation of a ticket and/or an event. In response to the comment, the mobile device may automatically extract relevant information from the comment (e.g. date, location, time, participants, etc.), and based on the context (e.g. including the extracted relevant information, etc.) of the comment, create a calendar event, create a notification reminder (e.g. reminder set to one day before the event, reminder set using predetermined settings, etc.), post a social media posting (e.g. Facebook, etc.) indicating you will be attending an event, send an invite to other contacts (e.g. friends, etc.), import and/or download information (e.g. maps, etc.) relating to the event (e.g. information assembled within an event page, on a calendar item, etc.), and/or any other action taken in response to the context of the comment.

In a separate embodiment, an action may be triggered by a tag associated with a comment. For example, in one embodiment, a comment may be received and a tag may be associated with the comment indicating "work," "tech group," and "Boston location." Based on the tag associated with the comment, the user's mobile device may automatically take an action by forwarding (e.g. via email, chat, SMS, etc.) the comment (or a link thereto) to one or more contacts (e.g. or predefined groups, etc.). Of course, in other embodiments, an action may be triggered in response to any element associated with a comment. Additionally, rather than apply one or more commands (e.g. one or more actions, etc.) automatically, the commands may be manually executed via a shortcut button, a voice command, and/or any other way.

In a separate embodiment, a set of threshold triggers may be required in order for one or more actions to be taken. For example, in one embodiment, a string of commands may relate to formatting a comment, including taking the written response, modifying it by inserting the name of the author of the original comment, applying site-specific formatting requirements (e.g. size, length, etc.), and/or uploading the response to each particular site. In order for such one or more actions to be executed, the manually executed button may have a set of threshold triggers including requiring a comment to have been received, the comment to contain an author name, and/or any other information and/or triggers which may relate to the comment. Of course, any triggers may be required in order to apply and/or execute a string of commands (e.g. one or more actions, etc.).

In one embodiment, a trigger may include stocks 430. For example, in various embodiments, stocks may include closing time prices, percent change of individual stocks and/or of a portfolio, top stock sales, supply and/or demand changes, new stocks released, companies recently have gone public, and/or any other information which may relate in some manner to stocks. In some embodiments, stocks may be used to trigger one or more actions, including aggregating stock changes (e.g. stocks daily report, etc.), presenting recommendations (e.g. sell/buy stocks, etc.), notifying one or more contacts (e.g. stock client, etc.), and/or taking any other action in response to the stocks. As an example, in one embodiment, a user of a mobile device may be notified of recent top stocks. In response, the user may often forward such top stocks to investors associated with the user, and based on the response, may take an action (e.g. buy/sell stock shares, etc.). The user may automate such a string of commands and/or process, including receiving notification of top stocks, sending (e.g. via email, SMS, chat, etc.) such notifications to one or more predetermined recipients (e.g. investing clients, etc.), and based on the response of the one or more recipients (e.g. sell, buy, no action, etc.), automatically complete a transaction based on the input from the one or more recipient. In one embodiment, the string of commands may be automatically implemented once a top stock notification is received. In another embodiment, the string of commands may be invoked and/or executed by the user (e.g. select which top stock notifications to send, etc.). Additionally, the string of commands may be executed via shortcut button, a voice command, and/or any other method.

In another embodiment, a trigger may include one or more user one or more actions 432. For example, in various embodiments, the one or more user one or more actions may include starting an application, interacting in some manner with an application (e.g. within app action, etc.), navigating a menu (e.g. app menu, OS menu, etc.), sending a message and/or invite (e.g. via email, SMS, chat, etc.), setting a reminder and/or alarm, creating an event (e.g. calendar, etc.), activating/deactivating and/or modifying a device setting and/or feature (e.g. volume, WiFi, Bluetooth, NFC, GPS, accelerometer, screen brightness, etc.), posting a message and/or status (e.g. social networking site, etc.), checking-in to a location (e.g. Foursquare check-in, actual reservation check-in, etc.), connecting to another device (e.g. secondary device, display, etc.), navigating to one or more websites, updating an app (e.g. financial app updated per transaction, etc.), receiving a voice command, receiving a swipe command (e.g. swipe action correlates to a command, etc.), and/or interacting in some manner (e.g. via an action, etc.) with the mobile device.

In some embodiments, one or more user actions may be used to trigger one or more actions, including starting an application, interacting in some manner with an application (e.g. within app action, etc.), navigating a menu (e.g. app menu, OS menu, etc.), sending a message and/or invite (e.g. via email, SMS, chat, etc.), setting a reminder and/or alarm, creating an event (e.g. calendar, etc.), activating/deactivating and/or modifying a device setting and/or feature (e.g. volume, WiFi, Bluetooth, NFC, GPS, accelerometer, screen brightness, etc.), posting a message and/or status (e.g. social networking site, etc.), checking-in to a location (e.g. Foursquare check-in, actual reservation check-in, etc.), connecting to another device (e.g. secondary device, display, etc.), navigating to one or more websites, updating an app (e.g. financial app updated per transaction, etc.), receiving a voice command, receiving a swipe command (e.g. swipe action correlates to a command, etc.), and/or interacting in some manner (e.g. via an action, etc.) with the mobile device. Of course, any action may be taken in response to a user action. Additionally, a string of commands (e.g. one or more actions, etc.) may be invoked and/or executed by a shortcut button, a voice command, and/or by any other method.

As an example, in one embodiment, a user may make a reservation (e.g. via Kayak.com app, etc.) for an upcoming travel. In response to the user action, the mobile device may create a calendar item (e.g. based on the date, time, and location of the reservation, etc.), notify predetermined contacts of the reservation (e.g. close friends, etc.), and give a page of recommendations (e.g. expected weather, maps of the area, etc.). Of course, any item and/or action may be taken in response to the user making a reservation.

In another embodiment, a trigger may include one or more app actions and/or events 434. For example, in various embodiments, one or more app actions and/or events may include creating an event (e.g. calendar item, etc.), recording an item (e.g. recording a game score onto an online score database, recording an audio clip, recording a video clip, etc.), downloading and/or uploading a data file (e.g. document, photo, video, audio, GPS location, Geotag, etc.), controlling in some manner a system feature (e.g. volume, screen brightness, WiFi, Bluetooth, GPS, camera, etc.), displaying one or more advertisement elements (e.g. ads, ad platform, etc.), displaying one or more notifications (e.g. reminders, alarms, updates, etc.), interacting with one or more apps (e.g. request info from another app, cause another app to take an action, etc.), updating an app (e.g. updating a database associated with the app, etc.), syncing (e.g. with an online database, with another device, etc.), controlling in some manner another device (e.g. display, trusted device, etc.), looking up information (e.g. barcode, etc.) via an online database system, tracking progress (e.g. education app, etc.), authenticating (e.g. a user, a device etc.), recording a trip (e.g. GPS path/track, breadcrumb trail, etc.), sending a product (e.g. postcard, etc.), buying/selling a product (e.g. via Amazon.com, etc.), buying/reserving a ticket (e.g. via Kayak.com, etc.), displaying and/or using a digital card (e.g. card in digital wallet, etc.), interacting with a media file (e.g. play video, play music, listen to radio, etc.), create a new contact entry (e.g. new contact, etc.), print a data file, apply a toddler and/or kid's mode, receiving an input (e.g. from a user, etc.), and/or any other action and/or event which may relate to an app. Of course, any action and/or event may be used to trigger an action.

In some embodiments, one or more app actions and/or events may trigger one or more actions, including creating an event (e.g. calendar item, etc.), recording an item (e.g. recording a game score onto an online score database, recording an audio clip, recording a video clip, etc.), downloading and/or uploading a data file (e.g. document, photo, video, audio, GPS location, Geotag, etc.), controlling in some manner a system feature (e.g. volume, screen brightness, WiFi, Bluetooth, GPS, camera, etc.), displaying one or more advertisement elements (e.g. ads, ad platform, etc.), displaying one or more notifications (e.g. reminders, alarms, updates, etc.), interacting with one or more apps (e.g. request info from another app, cause another app to take an action, etc.), updating an app (e.g. updating a database associated with the app, etc.), syncing (e.g. with an online database, with another device, etc.), controlling in some manner another device (e.g. display, trusted device, etc.), looking up information (e.g. barcode, etc.) via an online database system, tracking progress (e.g. education app, etc.), authenticating (e.g. a user, a device etc.), recording a trip (e.g. GPS path/track, breadcrumb trail, etc.), sending a product (e.g. postcard, etc.), buying/selling a product (e.g. via Amazon.com, etc.), buying/reserving a ticket (e.g. via Kayak.com, etc.), displaying and/or using a digital card (e.g. card in digital wallet, etc.), interacting with a media file (e.g. play video, play music, listen to radio, etc.), create a new contact entry (e.g. new contact, etc.), print a data file, apply a toddler and/or kid's mode, and/or any other action and/or event which may relate to an app. Of course, any action and/or event may be used to trigger an action.

As an example, in one embodiment, an app may record a GPS path of a user. In response to the recording, the app may upload the GPS tracks to an online system (e.g. online database, social networking site, etc.), update a status (e.g. "I'm hiking at _____" on Facebook, Geocached object found status update, etc.), display relevant advertisements (e.g. based on location, based on hiking activity, etc.), and/or take any other action in response to recording a GPS path of a user. Of course, any app action and/or event may trigger any action. Additionally, the string of commands (e.g. one or more actions, etc.) may be initiated and/or executed via a shortcut button, a voice command, and/or by any other method.

In another embodiment, a trigger may include one or more actions and/or events 436. For example, in various embodiments, one or more actions and/or events may include one or more actions and/or events (e.g. a number of steps in a string of actions and/or events, etc.) taken by a user, one or more actions and/or events (e.g. a number of steps in a string of actions and/or events, etc.) taken by an app, and/or any other action relating to the number of actions and/or events. In some embodiments, a number of actions and/or events (e.g. a number of steps in a string of actions and/or events, etc.) may trigger one or more actions, including prompting the user (of the mobile device, etc.) to save a string of actions, prompting the user (of the mobile device, etc.) to send a string of actions to a contact (e.g. friend, etc.), canceling/modifying a system resource (e.g. executing the one or more actions, and/or taking any other action relating to a number of actions and/or events.

As an example, in one embodiment, a user may take several steps relating to a photo album, including selecting a camera and/or gallery application, selecting an appropriate photo album (e.g. new photos, etc.), selecting one or more photos, selecting to share the one or more photos, selecting and/or inputting addresses (e.g. email address, etc.) of one or more photo recipients, inputting a message to be sent with the photos, and sending the message to the one or more photo recipients. After inputting such actions, the number of steps (actions) taken may cause a prompt to be displayed prompting the user to save the string of actions. In various embodiments, the user may set up the string of actions to be executed automatically every time four new photos (or any number) have been taken, to be executed whenever the user selects a shortcut button, to be executed in response to an input by the user (e.g. voice command, use of camera, etc.), to be executed in response to a timer (e.g. once a month, etc.), and/or to be executed in response to any trigger. Of course, any number of actions and/or events may be used to trigger an action.

In one embodiment, a trigger may include a mailbox 438. For example, in various embodiments, a mailbox may include a voice message, an email message, a SMS message, a chat message, scanned documents, social updates, RSS/Feed updates, a digital mailbox (e.g. digital mail service, digital archival, etc.), and/or any other item which may relate in some manner to a mailbox. In some embodiments, a mailbox may trigger one or more actions, including sending a message response (e.g. pre-scripted responses, etc.), posting a message (e.g. to an online platform, to a social networking site, etc.), archiving a message, deleting a message, applying a filter (e.g. move to a folder, auto-tag, star, mark as spam, etc.) to a message, forwarding a message, and/or interacting with a mailbox in any manner.

As an example, in one embodiment, a user may receive a message relating to technology. The user may then tag the email with a "technology" tag, move it to a technology folder, and forward it onto a friend interested in technology. In one embodiment, the user may automate the process whereby when an email is received, a filter is applied to it including tagging it with a "technology" tag, and moving it to a designated technology folder. Additionally, the message may be automatically forwarded onto a predetermined friend interested in technology. In another embodiment, a preview email may be sent to the user (e.g. with respect to the automatic forwarding of the email, etc.) for approval before being sent. Of course, any action may be taken relating to the email message received. Additionally, the string of commands (e.g. actions, etc.) may be saved to a shortcut button (e.g. manually initiated by the user, etc.), may be activated by a voice command, and/or may be controlled and/or initiated in any manner.

In another embodiment, a trigger may include social media 440. In various embodiments, social media may include receiving a posting (e.g. Facebook post, wall post, etc.), receiving an update (e.g. Twitter update, news update, blog update, etc.), receiving an email and/or instant messaging and/or chat (e.g. via social media site platform, etc.), interacting in some manner with a social media platform (e.g. magazines, Internet forums, weblogs, social blogs, microblogging, wikis, social networks, social site, dating forum, photo sharing site, vlog, music sharing site, etc.), interacting in some manner with a social media data file (e.g. podcasts, photographs and/or pictures, videos, document, etc.), submitting and/or receiving a rating (e.g. "like," etc.), receiving and/or creating a social bookmark and/or tag, setting a level of trustworthiness (e.g. associated with a contact and/or friend, etc.), and/or interacting in any way with a platform and/or a site which facilitates interaction and dialogue.

In some embodiments, social media may trigger one or more actions, including uploading and/or reposting to a posting, uploading and/or sending an update (e.g. Twitter update, news update, blog update, etc.), sending an email and/or instant messaging and/or chat (e.g. via social media site platform, etc.), interacting in some manner with a social media platform (e.g. magazines, Internet forums, weblogs, social blogs, microblogging, wikis, social networks, social site, dating forum, photo sharing site, vlog, music sharing site, etc.), interacting in some manner with a social media data file (e.g. podcasts, photographs and/or pictures, videos, document, etc.), submitting and/or receiving a rating (e.g. "like," etc.), receiving and/or creating a social bookmark and/or tag, setting a level of trustworthiness (e.g. associated with a contact and/or friend, etc.), and/or taking any action in response to a social media trigger.

For example, in one embodiment, a user may receive a social media update (e.g. relating to a video blog the user follows, etc.). In response to the social media update, the user may share the update by posting it on other social media sites (e.g. Facebook, Youtube, Twitter, etc.), sending the update to specific contacts (e.g. friends, etc.), rate the update (e.g. "like it," etc.), and archiving it to a social database. Rather than apply many individual actions, the user may save all such one or more actions to a string of command. In various embodiments, the string of command may occur automatically based on the receipt of the blog update (or by any other trigger to automatically initiate the string of command), or may occur manually based on a shortcut button, a voice command, or any other input given by the user to initiate the string of commands.

In another embodiment, a trigger may include a camera and/or gallery 442. In various embodiments, a camera and/or gallery may include a live camera view, one or more photos (e.g. already taken photos, etc.), a webcam, a camera attached to the mobile device, a camera associated with another device (e.g. secondary device, etc.), an online gallery (e.g. photo sharing site, etc.), a voice activated camera feature, a camera filter (e.g. b&w, heavy saturation, etc.), a camera setting (e.g. exposure, aperture, etc.), and/or any feature associated with a camera and/or gallery.

In some embodiments, a camera and/or gallery may trigger one or more actions, including sharing a photo and/or an album (e.g. via photo sharing platform, via email, etc.), activating and/or deactivating a camera, activating and/or deactivating a camera option (e.g. time-lapse, webcam, collage, burst mode, panoramic, etc.), attaching a geotag (e.g. add GPS location to the photo, etc.) and/or other metadata tags, modifying and/or editing a photo (e.g. crop, resize, rasterize, etc.), altering camera types (e.g. video camera, still camera, digital camera, etc.), uploading captured images (e.g. to an online database, to a photo sharing site, etc.), applying a filter (e.g. b&w, heavy saturation, etc.), creating a photo collage (e.g. vignette of more than one photo, collection of more than one photo, etc.), and/or taking any other action in response to a camera and/or gallery. In various embodiments, the one or more actions taken in response to the camera and/or gallery may be executed automatically (e.g. in response to a trigger, etc.), in response to an action by a user (e.g. voice command, pressing a shortcut button, etc.), and/or in response to any other trigger.

As an example, in one embodiment, after a user takes a photo, the user may upload the photo to a photo sharing site (e.g. Flickr, etc.), a social media site (e.g. Facebook, etc.), and an online database site (e.g. Dropbox.com, etc.). The user may save such one or more actions to an instruction to be executed manually (e.g. button, shortcut, etc.) and/or automatically (e.g. when a photo is taken it triggers a series of other commands, etc.). Of course, a string of commands (e.g. actions, etc.) may be initiated in any manner (e.g. gesture, movement, action, etc.).

In another embodiment, a trigger may include an application 444. In various embodiments, an application may include any type of online or locally stored application, including a social network application, a dating service application, an on-line retailer application, a browser application, a gaming application, a media application, an application associated with a product, an application associated with a location, an application associated with a store (e.g. an online store, a brick and mortar store, etc.), an application associated with a service, an application associated with discounts and/or coupon services, an application associated with a company, any application that performs, causes, or facilitates the aforementioned action(s), and/or any other type of application including, but not limited to those disclosed herein.

In some embodiments, an application may trigger one or more actions, including recording an application action (e.g. internet usage, use of system resources, use of data and/or information associated with another application, etc.), modifying and/or activating and/or deactivating a system setting (e.g. WiFi, Bluetooth, NFC, volume, screen brightness, etc.), interacting with another app (e.g. associated or not associated with the initial application, etc.), uploading information (e.g. data file, metadata, stats, etc.), syncing information (e.g. data file, metadata, stats, etc.), and/or taking any action in response to the application. As an example, in one embodiment, after an application is opened, the user may dim the screen of the device to conserve power usage, retrieve recent social media postings from other apps (e.g. applications associated Facebook, Twitter, Foursquare, and/or Youtube, etc.), upload the user's current status (e.g. GPS location, hanging out with other contacts, etc.), and start a music app to listen to music. Rather than execute each action individually, the user may save such actions as a string of commands (e.g. actions, etc.) and which may be executed automatically (e.g. as soon as the app is opened, etc.), and/or manually (e.g. voice command, selecting a shortcut button, etc.). Of course, the string of commands may be executed and/or selected in any manner.

In another embodiment, a trigger may include device input 446. For example, in various embodiments, the device input may include receiving input from one or more sensors (e.g. accelerometer, gyroscope, camera, light, proximity, temperature, magnetometer, microphone, etc.), receiving input from one or more location based sensors (e.g. GPS, carrier triangulation, digital compass, barometer, altimeter, etc.), and/or any other sensor and/or device which may provide input to a mobile device. In some embodiments, the device input may trigger one or more actions, including starting and/or ending an application associated with the mobile device, recording a path (e.g. GPS tracks, etc.), activating and/or unlocking and/or restricting a service (e.g. premium features, app usage, etc.), activating and/or deactivate a mode (e.g. airplane mode, car mode, walking mode, office mode, etc.), activating and/or modifying and/or deactivating a device setting (e.g. volume, screen brightness, etc.), and/or taking any other action in response to the device input.

As an example, in one embodiment, every time a user gets into the user's car, the user activates the Bluetooth to communicate with the car's audio system, starts Pandora music application, and activates a car hand's free mode. In various embodiments, the user may save such actions to an instruction and execute the instruction automatically (e.g. when the user enters the user's car as determined by sensors, etc.), manually (e.g. giving a voice command, pressing a shortcut button, etc.), and/or in any other manner. In another embodiment, the sensors may sense that the user is in a plane (e.g. high altitude, traveling at a fast speed, etc.), and in response, deactivate the carrier network, activate a WiFi signal (e.g. for inflight WiFi service, etc.), decrease the brightness of the screen, and sign into to the WiFi using Gogo login credentials. In one embodiment, such actions may be implemented automatically (e.g. after detecting the user is in a plane, etc.), after receiving approval from a user (e.g. "It has been detected you are in a plane. Would you like to enable Airplane Mode?," etc.), manually (e.g. voice command, button shortcut, etc.), and/or by any other manner.

In one embodiment, a trigger may include user history 448. In various embodiments, user history may include browsing history, purchase history, app usage history, battery usage history, location history, workout history (e.g. exercise regime, etc.), work history (e.g. time-in, time-out, etc.), and/or any other history which may be associated with the user. In some embodiments, user history may trigger one or more actions, including restricting use of a carrier network (e.g. data plan, etc.), providing targeted advertisements and/or relevant content (e.g. ads, recommended apps, relevant content based on context, etc.), starting and/or ending an app (e.g. maps app, exercise app, purchase app [e.g. Amazon, etc.], etc.), activating and/or modifying and/or deactivating a device setting (e.g. volume, screen brightness, etc.) and/or service (e.g. WiFi, Bluetooth, NFC, etc.), and/or taking any other action in response to user history.

In various embodiments, the user history may be aggregated periodically (e.g. once per month, placed in an archival directory, etc.) and/or aggregated continuously (e.g. real time archival of history, etc.). In other embodiments, the user history may be reviewed by the user or another user (e.g. manager, etc.) periodically (e.g. monthly report, etc.), manually (e.g. as requested by the user and/or another user, etc.), automatically (e.g. after each browsing session, as part of the shut-down and/or log off process of the device, etc.), and/or in any other manner.

As an example, in one embodiment, the user may frequently go to a site (e.g. Amazon, etc.), select a product, do a price-check (e.g. via Google, etc.) to see if the price is good, consider buying the product used versus new (e.g. consider shipping charges, consider reduced price of product, consider reputation of third party seller, etc.), and after making the final decision, buying the product and having the product shipped to the user. In various embodiments, such actions may be saved to an instruction and implemented automatically (e.g. product text inputted in search field of Amazon.com, etc.), manually (e.g. voice command, shortcut button, etc.), and/or in any other manner. In another embodiment, in response to the actions of the user (e.g. selecting a product, price-checking, etc.), the mobile device may display relevant content automatically (e.g. on locked-screen, on pull down screen, etc.), after receiving an approval from the user (e.g. "You recently searched for X. Would you like to receive relevant related content?," etc.), manually (e.g. voice command, shortcut button, etc.), and/or in any other manner.

In various embodiments, a trigger may include an alarm and/or reminder 450, including playing an audio (e.g. music clip, etc.), showing a visual (e.g. flashing light, etc.), making a movement (e.g. vibrate the user's mobile device, etc.), communicating with another device (e.g. turn on television, turn on lights, etc.), and/or any other item which may be associated with an alarm and/or reminder. In some embodiments, an alarm and/or reminder may trigger one or more actions, including controlling in some manner the user's mobile device (e.g. increase/decrease volume and/or screen brightness, refresh content on locked screen, etc.), controlling in some manner an application associated with the mobile device (e.g. start and/or display a news app, a game puzzle app, etc.), controlling in some manner another device (e.g. another mobile device, television, secondary display, lights, smart appliance, etc.), and/or taking any other action in response to an alarm and/or reminder.

As an example, in one embodiment, the user may have a wake-up alarm that goes off at 6 am every morning. After the alarm has gone off, the user may turn on a light, turn on the television to get the latest news, check any email received on the user's mobile device, and check road traffic conditions. Rather than perform each action separately, the user may save such actions to an instruction and execute the instruction automatically (e.g. when the alarm goes off, etc.), manually (e.g. voice command, shortcut button, etc.), and/or in any other manner. In another embodiment, the mobile device may recognize the one or more actions performed by the user, and in response, prompt the user to save the instructions (e.g. as a string of commands, etc.).

In another embodiment, a trigger may include a shortcut 452, including a voice command, a displayed button (e.g. on a homescreen, on a menu, etc.), a gesture (e.g. swipe, a predetermined motion, etc.), a physical button (e.g. on the mobile device, etc.) or combination of two or more physical buttons, and/or any other function or item which may execute a string of one or more commands. In some embodiments, a shortcut may trigger one or more actions, including executing a saved set of commands and/or actions, controlling in some manner the mobile device, controlling in some manner one or more applications associated with the mobile device, and/or taking action in response to the shortcut. Each of the foregoing descriptions relating to FIG. 4 may each be associated with a shortcut. Of course, a shortcut may be applied to any further embodiment not disclosed herein.

In another embodiment, a trigger may include a request 454. In various embodiments, a request may include receiving a request from a network (e.g. WiFi, cellular carrier data network, cellular carrier voice network, etc.), a request from another device (e.g. secondary device, another mobile device, smart appliance, secondary display, etc.), a request from one or more applications (e.g. request for information, request for permission, request to control in at least some manner the mobile device or another device associated with the user, etc.), a request from one or more contacts (e.g. social media site contact, trusted contact, etc.), a request from a location (e.g. brick and mortar store, etc.), and/or from any other location and/or item which may provide a request.

In some embodiments, a request may trigger one or more actions, including granting and/or denying and/or modifying one or more permissions, downloading and/or installing an app, displaying content (e.g. ad, photo, video, text, interactive graphic, ticket, security credentials, etc.), starting an application, performing a function (e.g. complete a sale and/or transaction, etc.), verifying the identity of the user (e.g. via photo id, wireless handshake protocols, etc.), and/or taking any other action in response to the request.

As an example, when a user is at an airport, many requests may be made, including a request to transfer electronic luggage verification tabs (e.g. as a result of checking in baggage, etc.) to the user's mobile device from the personnel's computer, a request to display a boarding pass ticket, a request to display some form of identification, and a request to push updated gate change information to the device. Rather than accept and/or interact with each of the requests separately and individually, the user may choose to create an instruction (e.g. commands to accept multiple requests, etc.). In various embodiments, the instruction may be permanently saved (e.g. to a local cache, to an online database of instructions, etc.), may be temporarily saved (e.g. valid for only a set period of time, valid for only while the user is at a set location, valid for only requests made from airport personnel, etc.). After executing the saved instruction, any request made while the user is at the airport may be accepted and/or cause another function (e.g. string of commands, actions, etc.) to be performed.

In a separate embodiment, when a user is at a movie theater, the user may seek to buy a ticket using the user's mobile device. A request may be made from a device associated with the ticket teller to the user's mobile device to complete the transaction. After completing the transaction, a request may be made at the door for the user to display the ticket purchased. Additionally, while at the movie theater, a friend of the user may send a request to share a photo taken, and/or interact with the user in some manner. In various embodiments, rather than interact separately and individually with each request, the user may automate the process so that any request made while the user is located at the movie theater may be granted, and/or any request made by movie theater personnel may be granted, and/or any request made by friends located also at the movie theater may be granted. Of course, the user may control the instruction in any manner.

In various embodiments, the user may fully control the instruction, including the duration (e.g. length of time, etc.), the scope (e.g. location, friends, proximity, etc.), the permissions (e.g. ability for trusted personnel to read and/or write and/or edit information, ability for friends to read and/or send information, etc.), and/or any other item which may be associated with controlling in some manner the instruction. In some embodiments, the instruction may be saved to a local cache (e.g. on the user's mobile device, etc.), to an online server and/or database, to a cache associated with another device (e.g. secondary device, attached storage, etc.), and/or to any item, system, and/or environment where an instruction may be saved. In other embodiments, after an instruction has been created, a user may modify an instruction, including adding and/or removing triggers and/or actions.

In another embodiment, one or more instructions may be collected and/or organized in an instruction database, including a hierarchal database structure, a relational database, and/or any other type of organized database system. In various embodiments, the one or more instructions may be displayed in a drop-down menu format (e.g. list box, etc.), a hierarchal format, organized into groups and/or page elements, and/or structured in any manner.

In various embodiments, the one or more instructions may be further controlled, including modifying a time of applicability (e.g. when I hang out with my friends, only when I am alone, etc.), associating it with a schedule (e.g. 6-9 am daily, month of September, at 10 am today for my appointment, always, etc.), associating it with a context (e.g. location, time, participants, etc.), and/or taking any other action to control at least in part the one or more instructions. Of course, in other embodiments, the instructions may be further controlled by applying one or more additional triggers (e.g. time of applicability trigger, schedule trigger, context trigger, etc.).

In one embodiment, the one or more instructions may be recorded and/or created and/or modified on the user's mobile device. In another embodiment, the one or more instructions may be sent by another user and/or device. For example, in one embodiment, the user may have created an instruction which takes photos taken in the last week, compiles them into a photo newsletter, and emails it out to everyone designated in contacts as a favorite. The user may send (e.g. via email, via a link, via bumping the two devices, via Bluetooth, via physical cord, etc.) the instruction to another contact, and/or receive an instruction from another entity in a similar manner.

In a further embodiment, one or more instructions may be selected and/or downloaded from a service, server, and/or online database. For example, in one embodiment, a collection of instructions may be found on an online service. The user may navigate to the online service (e.g. via a website address, etc.) and may select one or more instructions organized by category, by function, by apps used, and/or organized in any manner. In various embodiments, the instructions may be sent to the user's mobile device, including downloading (e.g. from a website, etc.), pushing (e.g. from online service, etc.), synching (e.g. instructions management app on mobile device, etc.), and/or receiving the instruction in some manner on the user's mobile device.

Figure 5:
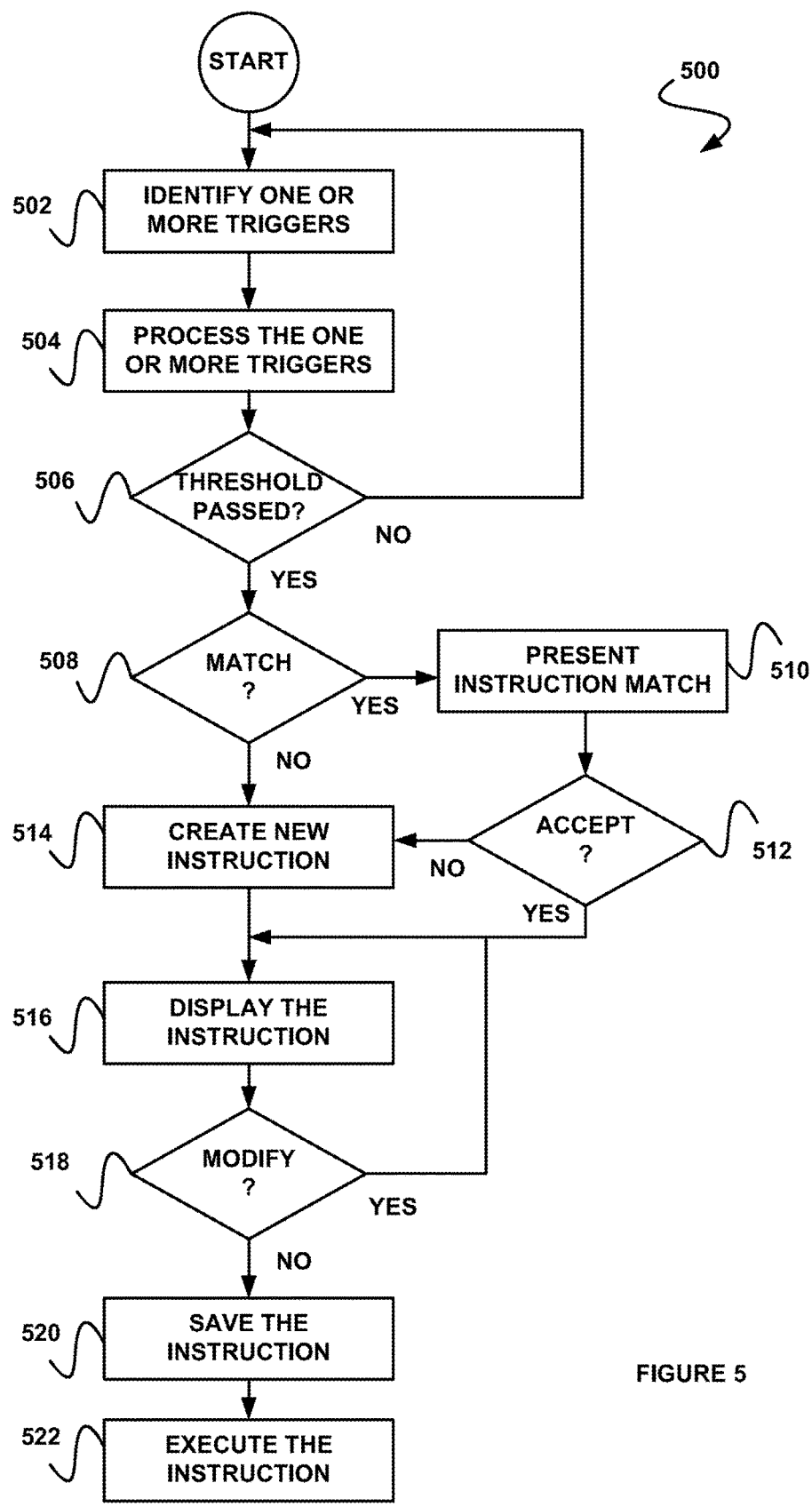
FIG. 5 shows a method for saving one or more instructions with a mobile device, in accordance with another embodiment.

FIG. 5 shows a method 500 for saving one or more instructions with a mobile device, in accordance with another embodiment. As an option, the method 500 may be implemented in the context of the architecture and environment of the previous Figures and/or any subsequent Figure(s). Of course, however, the method 500 may be implemented in the context of any desired environment. It should also be noted that the aforementioned definitions may apply during the present description.

As shown, one or more triggers are identified. See operation 502. In various embodiments, the one or more triggers may be identified using an input (e.g. screen surface input, microphone, multi-touch sensor, proximity sensor, vision-based commands and/or guidance, etc.), a sensor associated with the user's mobile device (e.g. GPS, accelerometer, NFC, gyroscope, temperature, magnetometer, barometer, altimeter, etc.), and/or by any other method. In one embodiment, the one or more triggers may be identified through a continuous (e.g. continuous motion and/or input, continuous menu selection, etc.) and/or near continuous (e.g. touching sequence includes a pause, wait for app to respond, wait for page load, etc.) process and/or motion. In a separate embodiment, the one or more triggers may be identified through a non-continuous process and/or motion. For example, in one embodiment, the trigger may include a context awareness (e.g. location, etc.), an action by the user (e.g. start social networking app, etc.), and a new photo to have been taken, each of which may be identified separately and in a non-continuous manner, before an instruction is triggered to upload a new photo with geotag metadata to a social networking site.

In one embodiment, the triggers may be inputted and/or collected at any time (e.g. whenever the user is using the mobile device, etc.). In other embodiments, the triggers may be inputted and/or collected based on an input and/or recording designation. For example, in one embodiment, the user may open an instruction app and select a "record now" option to record one or more triggers and/or actions. In other embodiments, the user may give a voice command "record now" to record one or more triggers and/or actions. Of course, the one or more triggers and/or actions may be recorded in any manner, and in response to any action and/or input.

Additionally, the one or more triggers may be processed. See operation 504. For example, in various embodiments, the one or more triggers may be processed using a processor on the user's mobile device, using a carrier network (e.g. trigger actions and/or metadata identified by the carrier, etc.), using an online service (e.g. trigger actions and/or metadata identified by an online service, etc.), and/or using any other type of network and/or service whereby the one or more triggers may be processed.

As shown, it is determined whether a threshold has been passed. See determination 506. In one embodiment, a threshold may include requiring a minimum amount of actions and/or triggers (e.g. at least four input actions from the user, etc.). In another embodiment, a threshold may relate to creating and/or recording new instructions. For example, in one embodiment, a trigger may include one action of the user opening up an application. In response to the trigger, a saved instruction may include taking one or more actions, including setting power usage profiles (e.g. conserve battery, etc.), setting a volume level (e.g. mute, etc.), and/or taking any other action. In contrast, in another embodiment, a user may give an input of at least four actions (e.g. open gallery, select one or more photos, select to share photos, select recipients, etc.), and based off of the four actions, a threshold may be passed (e.g. minimum three actions, etc.) whereupon the user's mobile device may prompt the user to save the actions to an instruction, look up an instruction based on the actions, and/or take any other action in response to the set of input actions.

If it is determined that a threshold has been passed, it is determined whether the one or more triggers match an existing instruction. See determination 508. For example, in various embodiments, the triggers may be compared to saved instructions on the user's mobile device (e.g. associated with instructions app, saved in local cache, etc.), on an online server system (e.g. online database, online service, online server, etc.), on another device (e.g. within a near geographic proximity to the user, from a trusted source, etc.), and/or on any platform, device, and/or system.

As shown, if a match is found, an instruction match is presented. See operation 510. For example, in various embodiments, an instruction match may be presented by a separate GUI (graphical user interface), a screen overlay, a pop-up box, may be visual, textual, and/or audible, and/or be presented in any manner. In one embodiment, an exact match of triggers may be displayed with a list of accompanying actions taken in response to the one or more triggers. In another embodiment, a match of instructions including at least the one or more triggers used may be displayed. For example, in one embodiment, the user may have recorded one or more triggers, including enabling the GPS, starting a map application, and displaying a map overlay of friends nearby. In response to such triggers, a match (or list of matches) may be displayed to the user including instructions which include the detected triggers as well as other triggers, such as selecting friends designated as favorite, and selecting friends that are within a proximity of 4 miles. The instruction may include one or more actions, including inviting friends (e.g. via each contact's preferred method of contact [email, SMS, chat], etc.), and posting an update on Facebook (e.g. regarding a status update, etc.). Of course, the foregoing example is only one embodiment of a match. A match may be composed of any triggers and/or actions.

In one embodiment, a user may control how a match (or list of matches) is displayed, including applying filters and/or restrictions (e.g. display only exact trigger matches, display top five most popular trigger matches, etc.), controlling the manner of the display (e.g. fill entire screen, notification in notification bar, text and/or audible notification, etc.), automating at least one aspect of the match (e.g. post update of instruction to a site, etc.), and/or taking any other action to control at least an aspect of a match (or list of matches).

As shown, it is determined whether a user accepts the presented instruction match. See determination 512. In various embodiments, the instruction match may be accepted by selecting a button (e.g. physical button, screen button, etc.), giving a voice command (e.g. "accept," etc.), exceeding a time threshold (e.g. 10 seconds, etc.), applying an automatic function (e.g. automatic acceptance based on whether exact trigger match is determined, automatic acceptance based on ratings of the match by one or more friends, etc.), giving a gesture (e.g. swipe motion, etc.) and/or movement (e.g. shake device, etc.), and/or giving any other input to indicate acceptance of the presented instruction.

If it the user does not accept the instruction match, or if the one or more triggers do not match an instruction, a create new instruction page is displayed. See operation 514. In one embodiment, the create new instruction page may be associated with the mobile device (e.g. associated with an installed app, etc.). In another embodiment, the create new instruction page may be a website, a portal to an online website, and/or associated with an online service. In one embodiment, tools may be presented to the user to create a new instruction. For example, in various embodiments, tools may include pre-inputted triggers and/or actions, an ability to input a custom (e.g. not before inputted, etc.) trigger and/or action, and/or any other tool which may facilitate creating a new instruction. In one embodiment, recommended triggers and/or actions may be presented to the user.

For example, in one embodiment, a user may input one or more triggers, including starting a gallery application, selecting photos, and applying a filter to all photos (e.g. b&w, saturation level, brightness, etc.). Based on such triggers, an instruction match may not be found (or a found instruction match may be rejected), whereupon a create new instruction page may be presented to the user, which may include the detected triggers, recommended additional one or more triggers, potential one or more actions, recommended instructions (e.g. a set of one or more recommended triggers and/or actions), and/or any other element which may facilitate the creation of a new instruction. The recommended one or more triggers and/or the one or more actions may include a recommendation to select one or more contacts as recipients of the selected photos, upload the selected photos to a social networking site (e.g. Facebook, etc.), back up the photos to a digital archive (e.g. Dropbox.com, etc.), send a multimedia message (e.g. text with image, etc.) to one or more recipients, and/or taking any further action. Alternatively, a recommended instruction may be presented based on the inputted triggers, with an additional trigger of selecting to share the photos, and based off of the combined set of triggers, taking action including sharing the photos with family (e.g. via email, etc.), uploading the photos to a personal blog, and archiving them on an online data storage site. Of course, in one embodiment, the user of the mobile device may combine one or more triggers and/or actions as desired, and/or may select any recommended instruction.

In a further embodiment, the create new instruction page may include the ability to drag and drop the one or more triggers and actions, to interact with one or more widgets (e.g. trigger widget, action widget, etc.), an ability to run and/or see a preview of the instruction, to select and/or deselect elements (e.g. triggers, actions, etc.) from a list, to select and/or deselect one or more hyperlinks (e.g. relating to a trigger, action, etc.), and/or further interact with the create new instruction page in any manner.

As shown, after creating a new instruction (or accepting a presented instruction match), the instruction may be displayed. See operation 516. In various embodiments, the instruction may be displayed on a GUI, a separate page and/or pane, by text (e.g. textual description of the one or more triggers and actions, etc.), by graphic (e.g. graphic of the one or more triggers and actions, etc.), in a flowchart format (e.g. input order of triggers leading to execution order of actions, etc.), and/or in any other manner. In some embodiments, the instruction may be displayed with interactive elements (e.g. ability to modify and/or change the one or more triggers and/or actions, etc.) and/or may be displayed in a static manner (e.g. no input permitted).

It is determined whether to modify the instruction. See determination 518. For example, in various embodiments, the user may specify the run times (e.g. only at night, only when I take photos, etc.), format (e.g. color, position, etc.), notifications (e.g. text, audible, frequency, ringtone, etc.), additional rules (e.g. do not run if I am driving, do not run if another instruction is being run, etc.), and/or any further information and/or features which may relate in some manner to the instruction. In various embodiments, input on whether to modify the instruction (e.g. yes, no, etc.) may be received by a touch sensor, a voice command, a physical button (e.g. on the device, etc.), and/or in any other manner.

As shown, if it determined to not modify the instruction, the instruction may be saved. See operation 520. In one embodiment, the instruction may be permanently saved, including saving it to a local cache (e.g. associated with the user's mobile device, associated with an app, etc.), to an online database (e.g. online instruction database, online data backup, online instruction service, online server, etc.), to another device (e.g. associated with a trusted contact of the user, etc.), and/or to any other storage medium. In other embodiments, the saving of the instruction may be associated with an app (e.g. product specific app, instruction app, etc.), a native utility on the device (e.g. native app, native OS Platform, etc.), and/or any other feature on a mobile device. In another embodiment, the instruction may be saved to a shortcut (e.g. graphic and/or icon, text hyperlink, touch button, device button, etc.), to a gesture, and/or to any other element associated with the mobile device which may execute the instruction.

In one embodiment, the user may opt to classify all triggers as actions and save such actions to a shortcut (e.g. button, gesture, voice command, etc.). In another embodiment, the user may opt to retain one or more triggers (e.g. input from the user, etc.) which may then cause one or more actions to be executed.

Further, the instruction may be executed. See operation 522. In one embodiment, after creating and/or saving the instruction, the mobile device may prompt the user whether it is desired to execute and/or run the instruction immediately. In other embodiments, the instruction may be executed in response to a shortcut (e.g. a button, a gesture, a voice command, etc.), and/or in response to the saved one or more triggers.

As an example, in one embodiment, a user may give a voice command (e.g. "run photo instruction #1," etc.), tap and/or press a button (e.g. on a screen associated with the mobile device, physical button on mobile device, etc.), give a preconfigured motion and/or gesture (e.g. a swipe, etc.), and/or select any other item which has been preconfigured to execute one or more instructions. In such an embodiment, the preconfigured item, or combination of items (e.g. voice command, button, motion, etc.) may be saved as the sole trigger associated with the instruction. In a separate embodiment, an instruction (e.g. associated with a shortcut, etc.) may be set to be executed on a set basis (e.g. run every other Friday, every night, etc.). Of course, in other embodiments, an instruction may be set to any other automatic configuration and/or setting.

Additionally, in another embodiment, a user may give one or more triggers to execute the instruction. For example, the user may create a calendar event, including inputting an event time, time, and location. The user may then choose to share the event with a group of contacts (e.g. work clients, etc.). Based off of such inputs, an instruction prompt may be displayed on the screen (e.g. "Would you like to run Share Work Event Instruction," etc.). If the user chooses to accept the prompt, an instruction may be run including fetching a map based off of the location, creating an e-invite, sending the e-invite to preselected recipients, monitoring responses from the recipients (e.g. accept, do not accept, etc.), and compiling a feedback response (e.g. to be presented to the user in the form of an email, etc.). Of course, the foregoing example is only one example of a set of triggers executing an instruction and subsequent actions associated with the instruction. Any combination of one or more triggers and/or one or more actions may be saved to an instruction.

In another embodiment, an instruction may be received from another device. For example, in one embodiment, a user may push an instruction from a first mobile device to a second mobile device associated with a second user. The second user may configure the mobile device settings to permit pushing instructions, syncing instructions, and/or sharing instructions in any manner. Further, in one embodiment, the instructions pushed from a trusted source may be automatically saved and/or executed on the first mobile device. For example, in one embodiment, the user may have already indicated that a contact was a trusted source, and based on the trustworthiness of the source, the contact may push an instruction (e.g. relating to a clientele management process, etc.) from the contact's mobile device to the user's mobile device. In one embodiment, the pushed instruction may require user input before proceeding (e.g. acceptance to receive instruction, acceptance to execute pushed instruction, etc.). In another embodiment, the pushed instruction may execute automatically after being pushed to the user's mobile device.

Figure 6:
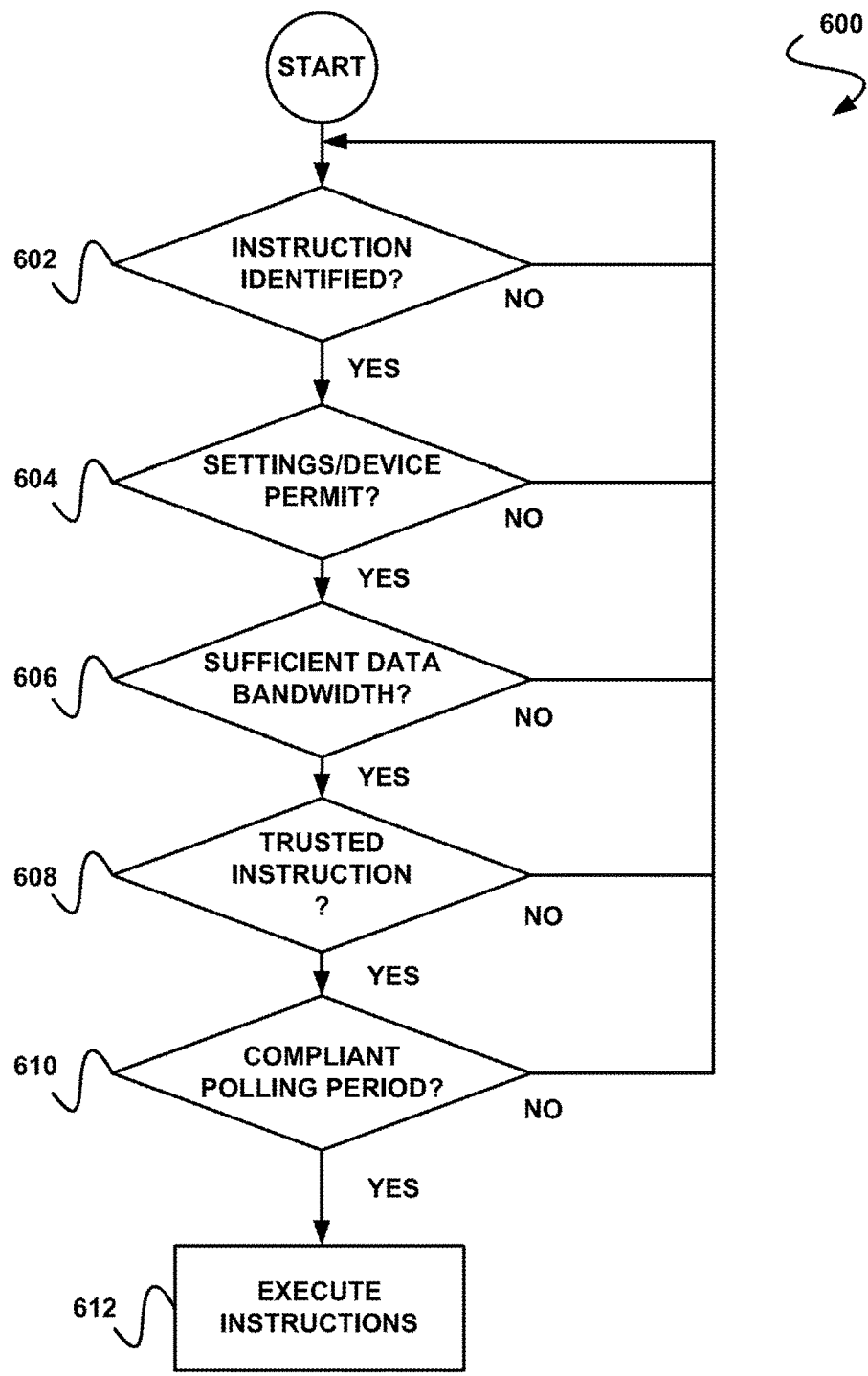
FIG. 6 shows a method for executing one or more instructions with a mobile device, in accordance with another embodiment.

FIG. 6 shows a method 600 for executing one or more instructions with a mobile device, in accordance with another embodiment. As an option, the method 600 may be implemented in the context of the architecture and environment of the previous Figures and/or any subsequent Figure(s). Of course, however, the method 600 may be implemented in the context of any desired environment. It should also be noted that the aforementioned definitions may apply during the present description.

As shown, it is determined whether an instruction is identified. See determination 602. In various embodiments, an instruction (e.g. combination of one or more triggers and one or more actions, etc.) may be identified by one or more triggers (e.g. predetermined one or more input from the user, a shortcut, etc.), an instruction match on the user's mobile device (e.g. saved instruction, app recognizes instruction, etc.), an instruction match on an online site (e.g. online instruction database, online instruction service, etc.), an instruction match on another device associated with the user (e.g. trusted device in close proximity to the user, etc.), and/or by any other method.

If it is determined that an instruction is identified, it is determined whether the settings and/or device permit executing the instruction. See determination 604. For example, in various embodiments, the settings and/or device may include settings relating to time, location, and/or people involved (e.g. do not run "Fred Instruction" if Fred is near, etc.), a battery status (e.g. do not run if less than 20% battery, etc.), a storage amount (e.g. do not run if less than 2 gb storage space, etc.), a data amount (e.g. restrict use of uploading photos while on carrier network, do not transfer data files over 200 mb, etc.), a permission (e.g. to execute instructions from trusted contacts, etc.), verifying an instruction source (e.g. instruction downloaded from an online source, instruction received from another device, etc.), a data transfer rate (e.g. only transfer using WiFi, only transfer if rate is greater than 1 mb/sec, etc.) and/or configuring any other setting associated with one or more instructions.

If it is determined that the settings and/or device permit executing the instruction, it is determined whether there is sufficient data bandwidth. See determination 606. For example, in various embodiments, sufficient data bandwidth may include a data transfer rate (e.g. minimum of 2 mb/sec, etc.), a sufficient amount of available data usage (e.g. based on data plan associated with the mobile device, etc.), a preferred network type (e.g. no data transfer while roaming, etc.), and/or any further item associated with data bandwidth.

If it is determined that there is sufficient data bandwidth, it is determined whether the instruction is trusted. See determination 608. For example, in various embodiments, determining whether the instruction is trusted may include verifying an instruction source (e.g. device, contact, etc.) and/or an instruction author (e.g. creator of the instruction, etc.), receiving instruction credentials (e.g. name and/or password, etc.), engaging in a security handshake (e.g. cryptographic protocol compliance, etc.), ensuring that the instruction is virus free (e.g. no viruses, worms, and/or malicious content, etc.) and/or any other item which may establish whether the instruction is to be trusted.

In another embodiment, an instruction may be verified using an instruction trustworthy app (e.g. virus scan app, Norton, etc.) associated with the instruction (or the device, or the app responsible for the instruction, etc.). In one embodiment, notwithstanding the lack of trust associated with an instruction, a user may still choose to execute and run an instruction by labeling an instruction as being trustworthy (e.g. "The source of this instruction is not trustworthy. Would you like to override the current settings and execute the instruction?," etc.). In another embodiment, in order to override a lack of trust associated with an instruction, a user may need to input a device administrator password and/or further authenticate in some manner to prevent any malicious activity. In such an embodiment, overriding a lack of trust may thereby reclassify the instruction as being a trusted instruction.

If it is determined that the instruction is trusted, it is determined whether the instruction is compliant with a polling period. See determination 610. For example, in various embodiments, a polling period may include periodically syncing (e.g. every 15 minutes, etc.) new and/or modified instructions (e.g. with an online database, etc.), periodically running (e.g. every 15 minutes, etc.) one or more instructions (e.g. a shortcut to an instruction including one or more triggers [shortcut button] and one or more actions, etc.), waiting for one or more triggers to complete (e.g. a trigger may be receipt of a new email and/or news article, etc.), and/or any other element which may relate to complying with a polling period. As an example, in one embodiment, the user may indicate that an instruction may relate to gathering the latest RSS feeds, filtering such RSS feeds by only including updates relating to cellular phone technology, and compiling such feeds into a report. The user may also indicate (e.g. as metadata associated with the instruction, as a polling period setting, etc.) that the instruction is to be run once a day at 6 pm. Of course, the polling period may relate to any time period and/or frequency.

As shown, if it is determined that the instruction is compliant with a polling period, the instructions may be executed. See operation 612. Of course, determinations 602-610 may occur simultaneously, in any order, and/or in any other manner.

Figure 7:
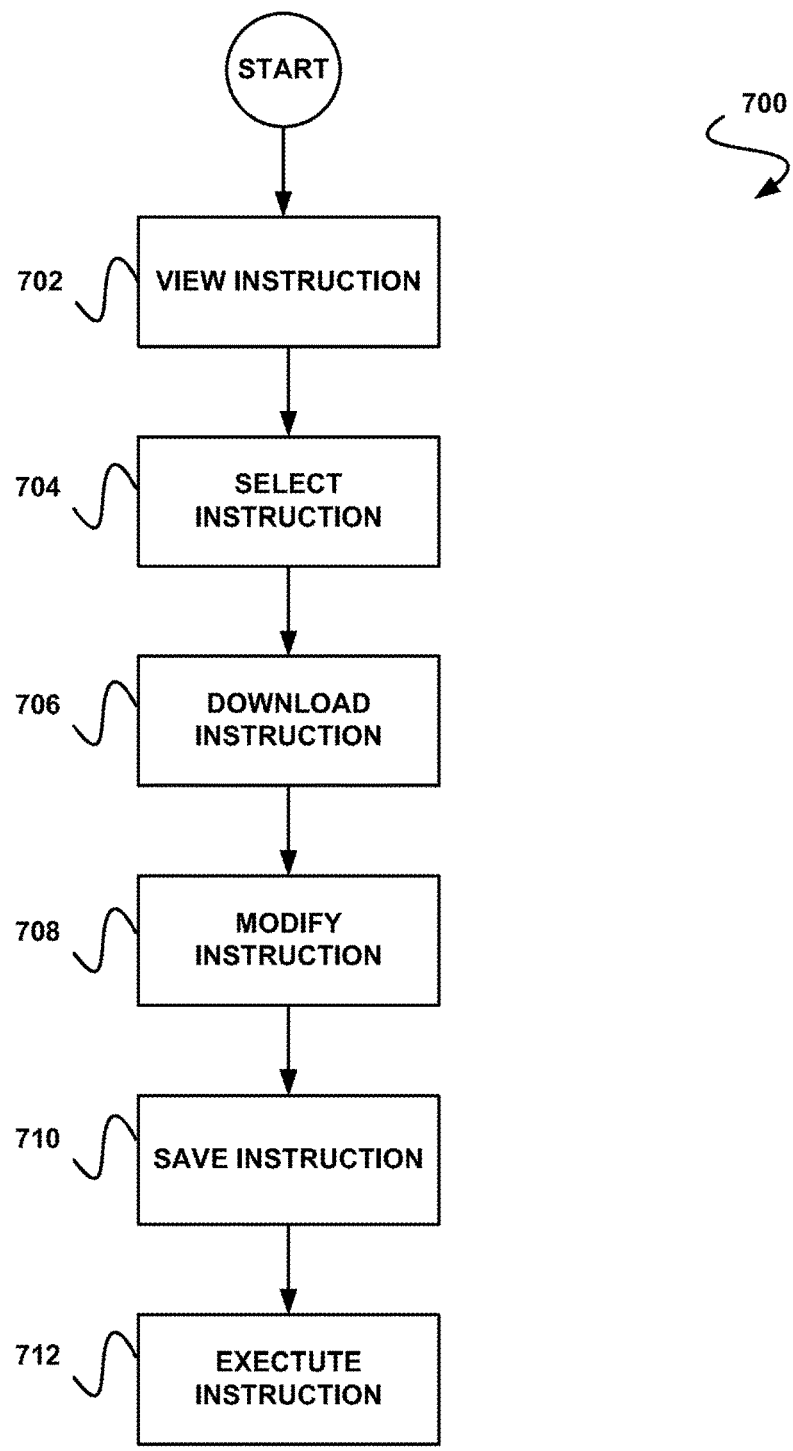
FIG. 7 shows a method for executing one or more instructions with a mobile device, in accordance with another embodiment.

FIG. 7 shows a method 700 for executing one or more instructions with a mobile device, in accordance with another embodiment. As an option, the method 700 may be implemented in the context of the architecture and environment of the previous Figures and/or any subsequent Figure(s). Of course, however, the method 700 may be implemented in the context of any desired environment. It should also be noted that the aforementioned definitions may apply during the present description.

As shown, an instruction may be viewed. See operation 702. In various embodiments, an instruction may be viewed on the user's mobile device, including viewing one or more instructions on an app (e.g. instruction store app, etc.), through an online portal (e.g. website, web portal, etc.), and/or through any portal and/or app which provides access (e.g. ability to view and/or download, etc.) to one or more instructions. In one embodiment, the user may view instructions associated with the user (e.g. previously downloaded, created instructions, active instructions, etc.). In another embodiment, the user may view new instructions (e.g. instructions not previously downloaded, etc.).

In various embodiments, an instruction store may include categorizations of instructions (e.g. productivity, social networking, calendar management, photo management, etc.). Of course, the instructions may be organized in any manner. In one embodiment, new instructions may be associated with the OS of the user's mobile device, including presenting new instructions as possible OS alterations and/or customizations (e.g. modify manner in which the phone responds based on different one or more triggers, etc.). In another embodiment, new instructions may be associated with a specific app (e.g. Facebook app, Dropbox app, Yelp app, etc.), with a genre of apps (e.g. business productivity apps, client management apps, social networking apps, etc.) which may be managed by a central instruction service (e.g. app platform, OS Native Utility, etc.), and/or with any app and/or item which may execute the one or more instructions.

In a separate embodiment, an instruction may be received via a messaging platform (e.g. SMS, email, chat, etc.). The user may select to save and/or associate the instruction with an installed app (e.g. managed by a specific app, managed by an OS Native Utility, etc.), with an app which may need to be downloaded and/or installed, with the messaging platform app (e.g. instruction is executed from directly within the messaging platform [e.g. email app, SMS app, chat app, etc.], etc.). Of course, new instructions may be viewed on any platform, associated with any app, and/or displayed in any manner.

In a further embodiment, an instruction may be viewed at the request of the user. For example, in various embodiments, the instruction may take an action to view one or more instructions, including browsing an online portal (e.g. instruction site, instruction database, etc.), navigating a specific app (e.g. app associated with a specific business and/or product and/or brick and mortar store, etc.), navigating an instruction store (e.g. instruction management app, etc.), receiving a text and/or chat and/or message (e.g. email, posting response, etc.), and/or taking any other action wherein the user requests to view one or more instructions.

As shown, an instruction may be selected. See operation 704. In some embodiments, the selection may include selecting one or more instructions (multiple instructions), combining more than one instruction together into an instruction packet (e.g. of more than one instruction, etc.), mixing and matching desired instructions, and/or taking any other action to select the one or more instructions in some manner.

In one embodiment, the instructions may be selected using the user's mobile device. In other embodiments, the one or more instructions may be selected using another device (e.g. device associated with another entity, a second mobile device, a computer, etc.), a device associated with a physical store (e.g. brick and mortar store, etc.), a device associated with an automobile (e.g. infotainment system console, etc.), and/or any other device which may permit selection of one or more instructions.

As shown, the one or more instructions may be downloaded. See operation 706. In one embodiment, the one or more selected instructions may be requested from the user's mobile device and downloaded to the user's mobile device. In other embodiments, the one or more selected instructions may be requested from another device and downloaded to the user's mobile device. In such an embodiment, the user may set trustworthy and/or permission settings associated with contacts, devices, and/or other entities (e.g. brick and mortar store, etc.).

As an example, in one embodiment, an employee of a corporation may be issued a mobile device, which may belong to and be controlled by the company. When instructions (e.g. client management, employee resources, etc.) need to be updated and/or downloaded to each employee's phone, a central app management section (or any person and/or group) may update and/or create an instruction and push (e.g. send to each employee's device to be executed, etc.) such an instruction to each employee's device. Of course, the employee's device may be controlled in any manner (e.g. send any type of instruction to the device, etc.).

Additionally, in other embodiments, the user's mobile device may display a notification of new one or more instructions, including displaying a status of one or more instructions (e.g. "HR Dept installed 2 new automatic executing instructions on your device: Instruction A (client management); Instruction B (employee resource)," etc.), a compliance agreement notification (e.g. "Please select 'accept' if you agree to the terms of the new one or more instructions," etc.), an employee input (e.g. "The downloaded Instruction from HR relates to sales. Would you like to install and/or execute (i.e. make it active) this instruction?," etc.), and/or any other notification relating to the one or more instructions.

In various embodiments, the user of the mobile device may set and/or control the level of permissions associated with pushing and/or installing one or more instructions on the user's mobile device. For example, in one embodiment, the user may be the sole entity permitted to install and/or execute instructions on the mobile device. In other embodiments, the user may grant permission to a group (e.g. "family" designation in metadata of contact, etc.), a specific entity (e.g. Bob, BestBuy stores, etc.), a location (e.g. instructions pushed from X location, instructions may be pushed while I am present at X location, etc.), a device (e.g. trusted device, established connections with one or more devices, etc.), and/or to any other entity and/or criteria which may relate in some manner to permissions.

In some embodiments, the permission may be complete and/or may be partial. For example, in various embodiments, partial permission may include an ability for another entity to send an instruction to a user's mobile device (e.g. execution may be dependent on the user accepting and/or giving some other approval of the instruction, etc.), to recommend (e.g. Bob recommends "Instruction A." Would you like to check it out?," etc.), to send a link to (e.g. within an email, etc.), to push a notification to the user's device (e.g. "Hi. I've been trying out this Instruction. It works great. Let me know if you like it.," etc.), to push an Instruction to the user's device (e.g. install, download, begin to execute, etc.), and/or to partially interact with the user's mobile device in some manner.

As shown, one or more instructions may be modified. See operation 708. In various embodiments, modifying the one or more instructions may include adding and/or deleting a specific trigger and/or action (e.g. as included in the downloaded instruction, etc.), adding and/or deleting a custom trigger and/or action (e.g. an item created by user, etc.), adding metadata to the instruction (e.g. name, creator, date modified, title, etc.), associating the instruction with one or more settings (e.g. time of applicability, permission level required in order to run, data network restriction, polling period, battery status requirement, etc.), and/or taking any further action to modify one or more instructions.

In one embodiment, a time threshold may be applied to modifying the one or more instructions. For example, in one embodiment, if the user does not modify the downloaded instruction within a set time period (e.g. 30 min, etc.), the instruction may be automatically saved and/or implemented (e.g. ready for execution, etc.). In another embodiment, the user may configure device settings such that when an instruction is downloaded, it is automatically saved and implemented (e.g. ready for execution, etc.). Of course, the user may modify the manner in which any automatic settings are applied to an instruction. For example, in some embodiments, the automatic settings may relate to applying a set of predetermined settings (e.g. including permissions, etc.) and/or metadata, interacting with the downloaded instruction to determine if it is safe to use (e.g. virus free, malicious software free, etc.), and/or applying any item (or items) which may be automated.

In another embodiment, modification to an instruction may be made at any time (e.g. after download, after install, after save, after executing, etc.). As an example, in one embodiment, the user may select an instruction and apply (e.g. after it has already been saved and executed, etc.) settings including making modifications to the saved instruction (e.g. actions, triggers, metadata, device settings, etc.). As such, settings and/or modifications relating to an instruction may be made at any period after downloading the instruction.

As shown, an instruction may be saved. See operation 710. In one embodiment, the instruction may be permanently saved, including saving it to a local cache (e.g. associated with the user's mobile device, associated with an app, etc.), to an online database (e.g. online instruction database, online data backup, online instruction service, online server, etc.), to another device (e.g. associated with a trusted contact of the user, etc.), and/or to any other storage medium. In other embodiments, the saving of the instruction may be associated with an app (e.g. product specific app, instruction app, etc.), a native utility on the device (e.g. native app, native OS Platform, etc.), and/or any other feature on a mobile device. In another embodiment, the instruction may be saved to a shortcut (e.g. graphic and/or icon, text hyperlink, touch button, device button, etc.), to a gesture, and/or to any other element associated with the mobile device which may execute the instruction.

In one embodiment, the user may opt to classify all triggers as actions and save such actions to a shortcut (e.g. button, gesture, voice command, etc.). In another embodiment, the user may opt to retain one or more triggers (e.g. input from the user, etc.) which may then cause one or more actions to be executed.

Further, the instruction may be executed. See operation 712. In one embodiment, after creating and/or saving the instruction, the mobile device may prompt the user whether it is desired to execute and/or run the instruction immediately. In other embodiments, the instruction may be executed in response to a shortcut (e.g. a button, a gesture, a voice command, etc.), and/or in response to the saved one or more triggers.

As an example, in one embodiment, a user may give a voice command (e.g. "run photo instruction #1," etc.), tap and/or press a button (e.g. on a screen associated with the mobile device, physical button on mobile device, etc.), give a preconfigured motion and/or gesture (e.g. a swipe, etc.), and/or select any other item which has been preconfigured to execute one or more instructions. In such an embodiment, the preconfigured item, or combination of items (e.g. voice command, button, motion, etc.) may be saved as the sole trigger associated with the instruction. In a separate embodiment, an instruction (e.g. associated with a shortcut, etc.) may be set to be executed on a set basis (e.g. run every other Friday, every night, etc.). Of course, in other embodiments, an instruction may be set to any other automatic configuration and/or setting.

Additionally, in another embodiment, a user may give one or more triggers to execute the instruction. For example, the user may create a calendar event, including inputting an event time, time, and location. The user may then choose to share the event with a group of contacts (e.g. work clients, etc.). Based off of such inputs, an instruction prompt may be displayed on the screen (e.g. "Would you like to run Share Work Event Instruction," etc.). If the user chooses to accept the prompt, an instruction may be run including fetching a map based off of the location, creating an e-invite, sending the e-invite to preselected recipients, monitoring responses from the recipients (e.g. accept, do not accept, etc.), and compiling a feedback response (e.g. to be presented to the user in the form of an email, etc.). Of course, the foregoing example is only one example of a set of triggers executing an instruction and subsequent actions associated with the instruction. Any combination of one or more triggers and/or one or more actions may be saved to an instruction.

Figure 8:
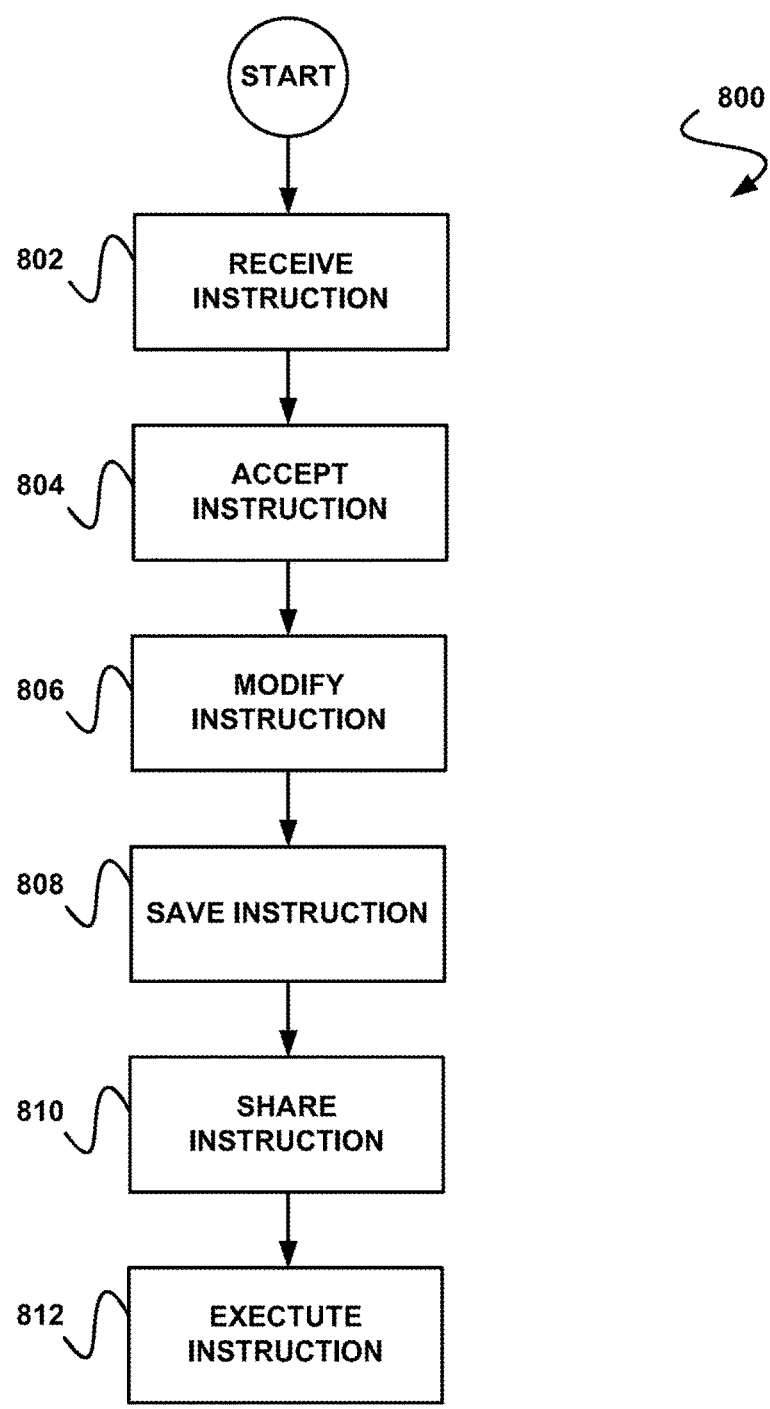
FIG. 8 shows a method for executing one or more instructions with a mobile device, in accordance with another embodiment.

FIG. 8 shows a method 800 for executing one or more instructions with a mobile device, in accordance with another embodiment. As an option, the method 800 may be implemented in the context of the architecture and environment of the previous Figures and/or any subsequent Figure(s). Of course, however, the method 800 may be implemented in the context of any desired environment. It should also be noted that the aforementioned definitions may apply during the present description.

As shown, an instruction may be received. See operation 802. In various embodiments, the instruction may be received from another device (e.g. secondary device, device associated with a trusted contact, device associated with a trusted entity such as a brick and mortar store, etc.), a messaging platform (e.g. email, SMS, chat, social networking messaging platform, etc.), an installed app (e.g. specific app installed on the mobile device, etc.), a network (e.g. WiFi, Bluetooth, etc.), a carrier (e.g. data carrier, mobile phone carrier, etc.), an online portal (e.g. website, web portal, etc.), an instruction store (e.g. instruction database, instruction repository, etc.), an OS platform (e.g. sync updates to device, etc.), a host system (e.g. a system to which the mobile device is physically connected, etc.), and/or from any system from which an instruction may be sent.

In another embodiment, an instruction may be received at the request of another entity (e.g. other than the user of the mobile device, etc.). For example, in various embodiments, the instruction may be received via a notification (e.g. from a contact, from a trusted entity, from a trusted device, etc.) prompting the user to take an action (e.g. view an instruction, download an instruction, etc.), via a message (e.g. email, chat, SMS, etc.), via a link (e.g. HTML link, download location site, etc.), via an attachment (e.g. to a message, etc.), and/or via any communication and/or data sent to the user's mobile device.

In one embodiment, a user may configure settings to enable notification and/or installation of instructions from trusted entities and/or sources. For example, the user may select filters to be applied to incoming notifications (e.g. relating to one or more instructions), including the type (e.g. clientele instructions, productivity instructions, etc.), the complexity (e.g. only permit at most 10 combined triggers and/or actions, etc.), the content (e.g. relating only to cell phone technology, etc.), a keyword (e.g. "AT&T," etc.), and/or any other filter which may relate in some manner to a notification. In some embodiments, the filters may be applied by an OS Native Utility (e.g. system app, system feature, etc.), an installed app (e.g. app associated with Yelp.com, Dropbox.com, Facebook.com, etc.), and/or by any system and/or feature associated with the user's mobile device. In other embodiments, the user may select to reject all notifications relating to instructions.

In another embodiment, one or more instructions may be received based off of a context associated with the user, including location information (e.g. GPS location information, a physical address, an IP address, shopping center, movie theatre, stadium, etc.), network information (e.g. information associated with the network currently being utilized or currently being accessed, etc.), applications being utilized (e.g. games, maps, camera, retailer, social networking, etc.), current activities (e.g. shopping, walking, eating, reading, driving, etc.), browsing activity (e.g. history, etc.), purchase activity (e.g. history, etc.), environment (e.g. environmental audio, weather, temperature, etc.), payment activities (e.g. just purchased coffee, groceries, clothes, etc.), and/or any other type of information.

As an example, in one embodiment, a user may have researched online how to get to an airport. Additionally, the user may have received an email confirming a flight purchase as well as a hotel reservation. Based on the context of such information, the user may be presented with a notification (e.g. on the device, via messaging platform, etc.) for an instruction (e.g. "Travel Instruction," etc.) which may including triggers such as receipt of a travel purchase and an event creation in a calendar app, as well as actions including aggregating travel information into one location (e.g. an event page, etc.), fetching and downloading relevant trip information (e.g. maps, public transportation information, etc.), posting a status update on a social networking site, and fetching emergency information (e.g. emergency numbers, headquarter contact info, etc.) for each of the reservations. As such, an instruction may be received at the request of another entity and/or as the result of contextual input.

In a separate embodiment, a user may be located at a restaurant for a lunch appointment, text the lunch appointment participant that the user has arrived, post a status update on a social networking site, and browse the internet searching for reviews of the lunch location and recommended food to eat. Based on the context of such information, the user may be presented with a notification (e.g. on the device, via messaging platform, etc.) of a relevant instruction (e.g. "Lunch Location Instruction," etc.), which may include triggers such as time (e.g. near lunchtime, etc.), location (e.g. near a restaurant, etc.), a calendar time (e.g. lunch appointment, etc.), as well as actions including texting the one or more participants that you have arrived, providing a real-time update of where other participants are located (e.g. based on permissions as set by the user and the one or more participants, etc.), and fetching and displaying relevant reviews of the location's menu and/or offerings. As such, an instruction may be received at the request of another entity and/or as the result of contextual input.

Additionally, in a further embodiment, the received notification of a relevant instruction may be relevant to one or more inputted triggers (e.g. opening an application, browsing for a keyword, calling a contact, etc.) and/or may be the result of a contextual understanding (e.g. location, time, contacts near, past browsing history, etc.). As such, a notification relating to one or more instructions may be given based on trigger inputs and/or contextual information and/or a request from an entity. Further, in another embodiment, more than one instruction may be given in a notification, including a list of possible relevant instructions (e.g. enable the user to choose from among highly relevant instructions, etc.).

As shown, one or more instructions may be accepted. See operation 804. In various embodiments, the instruction match may be accepted by selecting a button (e.g. physical button, screen button, etc.), giving a voice command (e.g. "accept," etc.), exceeding a time threshold (e.g. 10 seconds, etc.), applying an automatic function (e.g. automatic acceptance based on whether notification source is trusted, automatic acceptance based on ratings of the match by one or more friends, etc.), giving a gesture (e.g. swipe motion, etc.) and/or movement (e.g. shake device, etc.), and/or giving any other input to indicate acceptance of the presented instruction.

In some embodiments, the user may opt to forgo an acceptance step if the instruction passes a trustworthy threshold, including verifying the source of the instruction, the level of popularity of the instruction, the degree of friendship to the source (e.g. distant friend, close friend, etc.), and/or through applying any other test to the instruction associated with a notification.

As shown, one or more instructions may be modified. See operation 806. In various embodiments, modifying the one or more instructions may include adding and/or deleting a specific trigger and/or action (e.g. as included in the downloaded instruction, etc.), adding and/or deleting a custom trigger and/or action (e.g. an item created by user, etc.), adding metadata to the instruction (e.g. name, creator, date modified, title, etc.), associating the instruction with one or more settings (e.g. time of applicability, permission level required in order to run, data network restriction, polling period, battery status requirement, etc.), and/or taking any further action to modify one or more instructions.

In one embodiment, a time threshold may be applied to modifying the one or more instructions. For example, in one embodiment, if the user does not modify the downloaded instruction within a set time period (e.g. 30 min, etc.), the instruction may be automatically saved and/or implemented (e.g. ready for execution, etc.). In another embodiment, the user may configure device settings such that when an instruction is downloaded, it is automatically saved and implemented (e.g. ready for execution, etc.). Of course, the user may modify the manner in which any automatic settings are applied to an instruction. For example, in some embodiments, the automatic settings may relate to applying a set of predetermined settings (e.g. including permissions, etc.) and/or metadata, interacting with the downloaded instruction to determine if it is safe to use (e.g. virus free, malicious software free, etc.), and/or applying any item (or items) which may be automated.

In another embodiment, modification to an instruction may be made at any time (e.g. after download, after install, after save, after executing, etc.). As an example, in one embodiment, the user may select an instruction and apply (e.g. after it has already been saved and executed, etc.) settings including making modifications to the saved instruction (e.g. actions, triggers, metadata, device settings, etc.). As such, settings and/or modifications relating to an instruction may be made at any period after downloading the instruction.

As shown, an instruction may be saved. See operation 808. In one embodiment, the instruction may be permanently saved, including saving it to a local cache (e.g. associated with the user's mobile device, associated with an app, etc.), to an online database (e.g. online instruction database, online data backup, online instruction service, online server, etc.), to another device (e.g. associated with a trusted contact of the user, etc.), and/or to any other storage medium. In other embodiments, the saving of the instruction may be associated with an app (e.g. product specific app, instruction app, etc.), a native utility on the device (e.g. native app, native OS Platform, etc.), and/or any other feature on a mobile device. In another embodiment, the instruction may be saved to a shortcut (e.g. graphic and/or icon, text hyperlink, touch button, device button, etc.), to a gesture, and/or to any other element associated with the mobile device which may execute the instruction.

In one embodiment, the user may opt to classify all triggers as actions and save such actions to a shortcut (e.g. button, gesture, voice command, etc.). In another embodiment, the user may opt to retain one or more triggers (e.g. input from the user, etc.) which may then cause one or more actions to be executed.

As shown, an instruction may be shared. See operation 810. In various embodiments, the instruction may be shared by uploading the instruction to an online database (e.g. instruction store, instruction repository, instruction sharing site, etc.), sending the instruction to a recipient (e.g. contact, entity, via email, via chat, etc.), posting the instruction to a sharing platform (e.g. social networking platform, etc.), sending a link (or any representation of the instruction) to a recipient, beaming the instruction (e.g. via NFC, via Bluetooth, via close proximity data transfer, etc.) to another entity, and/or taking any other action to share the instruction.

As an example, in one embodiment, the user may wish to receive to share an instruction with a friend who is in close proximity to the user. The user may bring the user's mobile device within a close proximity (e.g. within 2 inches, etc.) of another device to transfer the instruction from one device to another (e.g. via NFC, via WiFi direct, etc.). In another embodiment, a user may be engaging in a conversation with a friend via a chat application. Using such an application, the user may share an instruction by sending a package (e.g. of the instruction with metadata and settings, etc.) to the friend. Of course, the instruction may be transferred in any manner.

Further, the instruction may be executed. See operation 812. In one embodiment, after creating and/or saving the instruction, the mobile device may prompt the user whether it is desired to execute and/or run the instruction immediately. In other embodiments, the instruction may be executed in response to a shortcut (e.g. a button, a gesture, a voice command, etc.), and/or in response to the saved one or more triggers.

As an example, in one embodiment, a user may give a voice command (e.g. "run photo instruction #1," etc.), tap and/or press a button (e.g. on a screen associated with the mobile device, physical button on mobile device, etc.), give a preconfigured motion and/or gesture (e.g. a swipe, etc.), and/or select any other item which has been preconfigured to execute one or more instructions. In such an embodiment, the preconfigured item, or combination of items (e.g. voice command, button, motion, set of commands, etc.) may be saved as the sole trigger associated with the instruction. In a separate embodiment, an instruction (e.g. associated with a shortcut, etc.) may be set to be executed on a set basis (e.g. run every other Friday, every night, etc.). Of course, in other embodiments, an instruction may be set to any other automatic configuration and/or setting.

Additionally, in another embodiment, a user may give one or more triggers to execute the instruction. For example, the user may create a calendar event, including inputting an event time, time, and location. The user may then choose to share the event with a group of contacts (e.g. work clients, etc.). Based off of such inputs, an already saved instruction may be displayed on the screen (e.g. "Would you like to run Share Work Event Instruction," etc.). If the user chooses to accept the prompt, an instruction may be run including fetching a map based off of the location, creating an e-invite, sending the e-invite to preselected recipients, monitoring responses from the recipients (e.g. accept, do not accept, etc.), and compiling a feedback response (e.g. to be presented to the user in the form of an email, etc.). Of course, the foregoing example is only one example of a set of triggers executing an instruction and subsequent actions associated with the instruction. Any combination of one or more triggers and/or one or more actions may be saved to an instruction.

Figure 9:
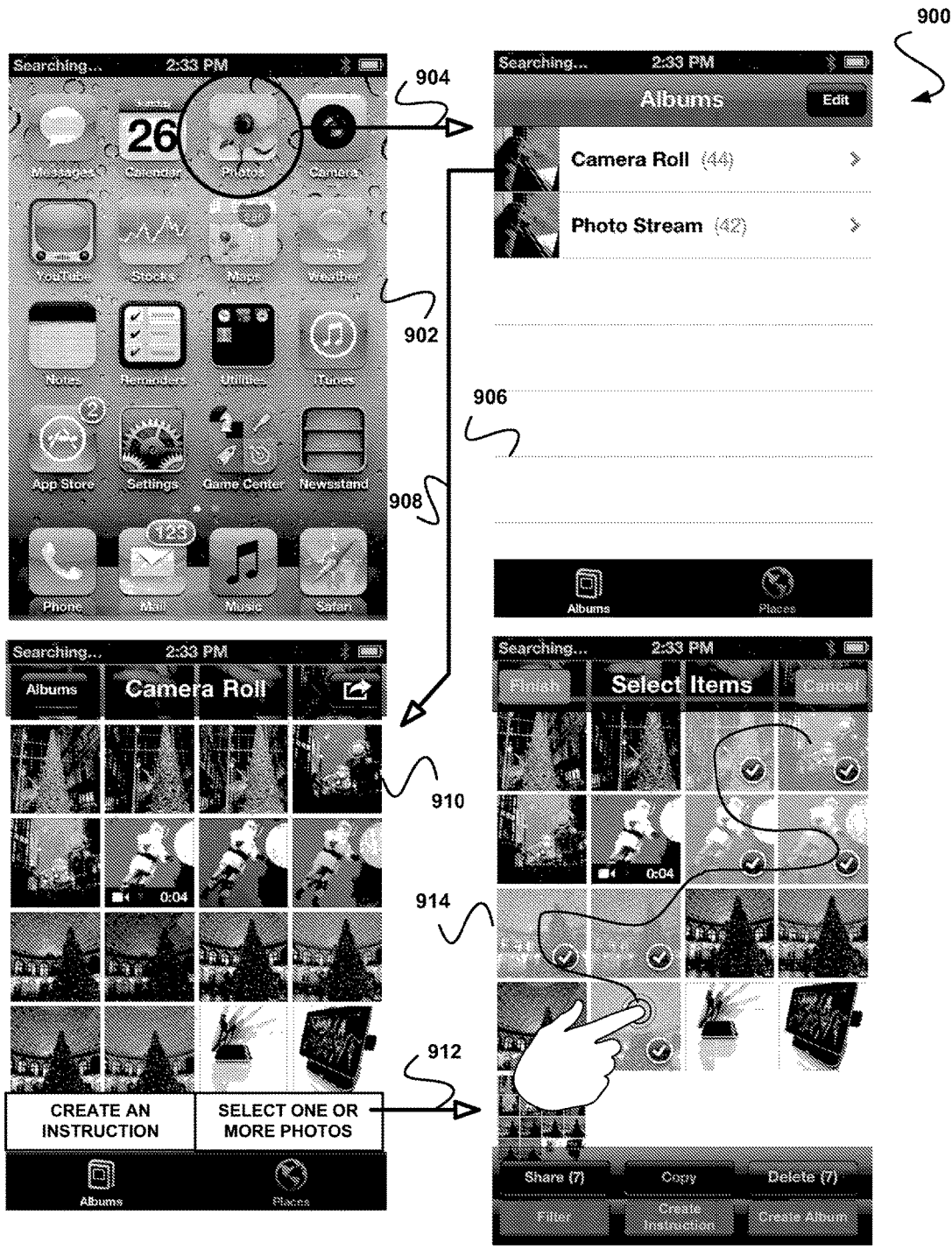
FIG. 9 shows a mobile device interface for receiving one or more triggers, in accordance with another embodiment.

FIG. 9 shows a mobile device interface 900 for receiving one or more triggers, in accordance with another embodiment. As an option, the mobile device interface 900 may be implemented in the context of the architecture and environment of the previous Figures and/or any subsequent Figure(s). Of course, however, the mobile device interface 900 may be implemented in the context of any desired environment. It should also be noted that the aforementioned definitions may apply during the present description.

As shown, a mobile device interface display 902 may be displayed. In various embodiments, a mobile device interface display may include a homescreen, a locked screen, a screen saver, a pull down display, a secondary display (e.g. external, secondary device, etc.), and/or any other type of display which may be associated with the mobile device. Additionally, an application may be selected 904. In one embodiment, the application may include a photo management app, a camera, a calendar, a map, a weather app, a notes app, a reminders app, a settings app, a phone app, a mail app, a music app, a browser app, and/or any app which may be capable of being selected.

In one embodiment, if a photos app is selected, a display of one or more albums 906 may be presented to the user. In one embodiment, the displayed albums may include albums synced with an online server (e.g. picasa albums, facebook albums, flickr albums, etc.), stock albums (e.g. provided by the operating system, an application, an online server, etc.), context-sensitive albums (e.g. automatic organization of photos based off of metadata such as year, location, etc.), and/or any type of album organization. Of course, in other embodiments, the user may define one or more albums and may manually add photos to the created one or more albums, and/or create a rule to add photos to the created one or more albums.

In various embodiments, the albums may be arranged according to one or more selected criteria (e.g. rules, alphabetical, location, date, etc.). In some embodiments, the display of one or more albums may include one or more tabs (e.g. alphabetical, location, date, people, etc.), a drop down menu, a hierarchal menu display, and/or any other item whereby the albums may be filtered and/or arranged.

As shown, an album may be selected 908, and a display 910 showing the photos associated with the album may be displayed. In various embodiments, an album may be selected by touching an icon (e.g. an album icon, etc.) on a screen and/or display, giving a voice command (e.g. "open camera roll," etc.), moving the mobile device in some manner (e.g. two forward movements selects the icon, a movement right or left selects a different icon, etc.), receiving an input from another device (e.g. secondary mobile device, keyboard, mouse, etc.), and/or receiving any other type of input wherein an album may be selected.

In one embodiment, the display showing the photos associated with the album may include one or more options. In various embodiments, the one or more options may include an ability to create an instruction, to select one or more photos, to categorize and/or arrange the photos in some manner, to share one or more photos and/or albums, and/or to interact with the photos and/or album in some manner.

As shown, the option to select one or more photos may be selected 912, and a display 914 showing the one or more selected photos may be displayed. In various embodiments, one or more photos may be selected, including individually selecting (e.g. by touching, giving voice command, using secondary device, etc.) each photo, selecting photos based on the trace path of the input (e.g. finger, stylus, etc.), selecting a metadata criteria (e.g. data, location, people included, etc.), selecting a recommendation from a contact (e.g. photos selected by a contact associated with a shared online album, etc.), selecting a recommendation from the mobile device (e.g. based on relevancy and/or context, from the app, from the operating system, etc.), selecting a popularity vote (e.g. associated with an online and/or shared album, etc.), and/or selecting any other item which may be associated with selecting one or more photos. In one embodiment, the trace path may be continuous (e.g. continuous input motion, one input path, etc.), or non-continuous (e.g. multiple input paths, broken input path, etc.).

Additionally, the trace path may be located on one page (e.g. one display screen) and/or on more than one page (e.g. multiple screens, tabbed screens, scrollable screen, etc.). In one embodiment, various methods may be utilized to select and/or navigate the one or more displays associated with the mobile device, including using a predetermined input to scroll (e.g. two fingers sliding up, etc.), a predetermined input to select (e.g. one finger slide and/or selection, etc.), a predetermined input to switch to an additional tab and/or additional album (e.g. two finger slide to the side, etc.), and/or using any other predetermined input to navigate the one or more displays associated with the mobile device and/or select the one or more photos.

In one or more embodiments, options may be shown which are associated with the selected one or more photos, including an ability to share (e.g. email, upload to online server and/or service, upload to blog, upload to social networking site, etc.), copy, delete, filter (e.g. use selected photos to select other like photos, etc.), edit (e.g. batch edit of photos, etc.), create one or more albums (e.g. of the selected photo(s), etc.), combine (e.g. create montage, etc.), create one or more photo books (e.g. through online server and/or service, through another app associated with the mobile device, etc.), to interact with any other app (e.g. associated with the mobile device, etc.) and/or take any other action which may relate to the one or more selected photos. Of course, after selecting one or more photos, the selected one or more photos may be deselected using a predetermined input (e.g. select the same photo twice, etc.).

Figure 10:
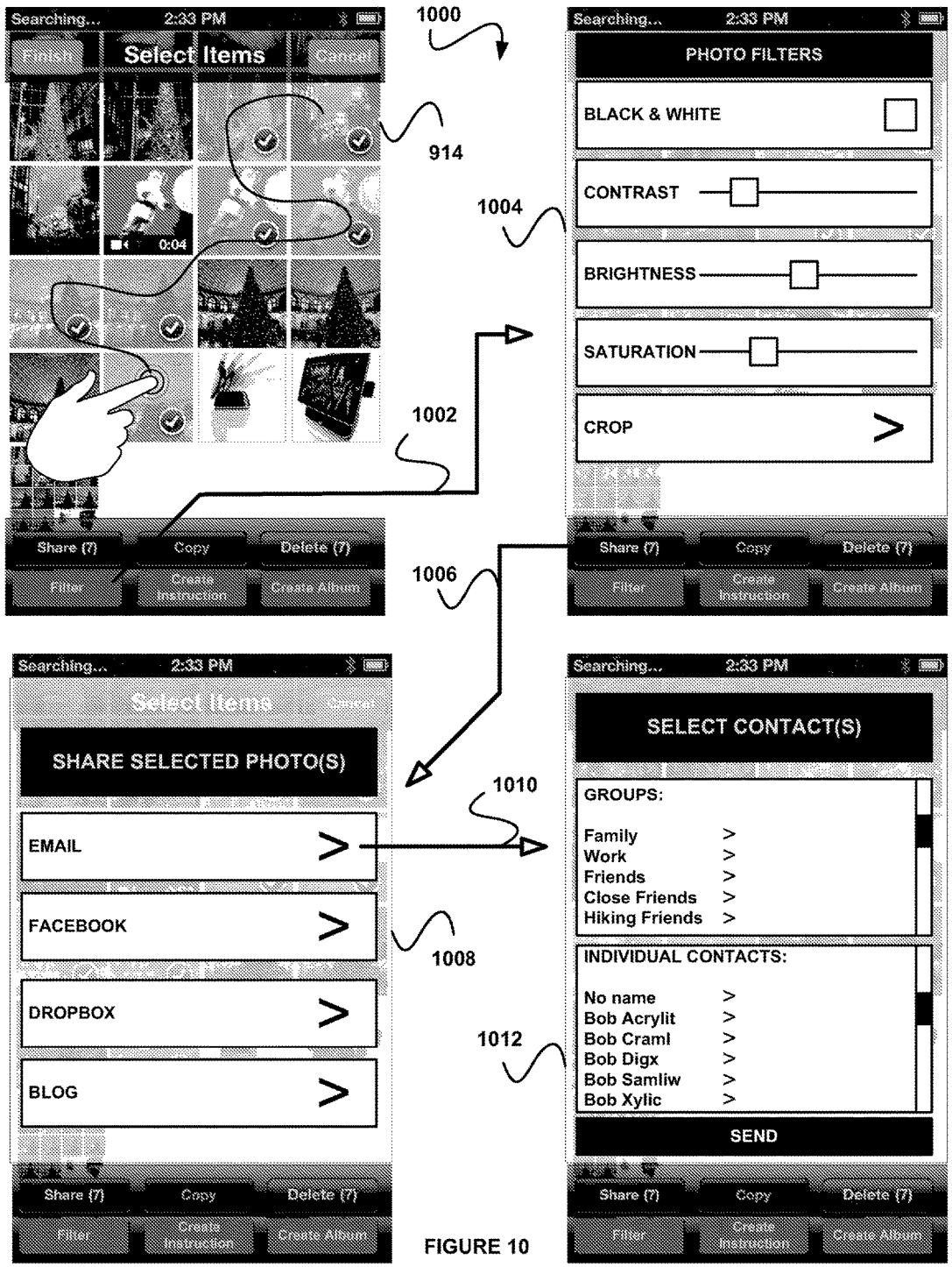
FIG. 10 shows a mobile device interface for receiving one or more triggers, in accordance with another embodiment.

FIG. 10 shows a mobile device interface 1000 for receiving one or more triggers, in accordance with another embodiment. As an option, the mobile device interface 1000 may be implemented in the context of the architecture and environment of the previous Figures and/or any subsequent Figure(s). Of course, however, the mobile device interface 1000 may be implemented in the context of any desired environment. It should also be noted that the aforementioned definitions may apply during the present description.

As shown, interface 914 is displayed. A filter option may be selected 1002 and a photo filter display 1004 may be shown. In various embodiments, a filter option may be selected by an input (e.g. finger, stylus, secondary device, mouse, keyboard, etc.), by a voice command (e.g. "select filter," etc.), and/or in any other manner. In other embodiments, a photo filter display may include filters such as ability to control the contrast, brightness, saturation, color, and/or white balance, ability to crop, to change the photo to black & white, to rotate, to apply a scene mode (e.g. landscape, night, portrait, sunset, backlit, etc.), to apply a border, to insert a caption and/or other modifications (e.g. custom photo edits, etc.), and/or to take any other action to filter the selected one or more photos in some manner.

In various embodiments, a share option associated with the selected one or more photos may be selected 1006. In some embodiments, the share option may be selected before or after the photo filters are applied, and/or may be selected at any time after the one or more photos have been selected. An interface 1008 associated with the share option may be displayed and may include ability to share the selected one or more photos by email, to Facebook (e.g. upload and/or post, etc.), to Dropbox (e.g. backup photos, etc.), to a blog (e.g. public or private, etc.), to an online storage site, to an online social media site, to another detected device (e.g. sent via WiFi, sent via NFC, sent via Bluetooth, etc.), and/or to any other destination selected by the user of the mobile device.

In another embodiment, the option to email the selected one or more photos may be selected 1010 and an interface 1012 associated with the option to email may be displayed. In various embodiments, possible destinations may include one or more contacts and/or groups. In some embodiments, the recipients may be preselected (e.g. associated with a group, commonly selected list of contacts based off of frequency of selection, etc.), associated and/or organized with one or more groups (e.g. based off of tags associated with the individuals, etc.), organized according to a recommendation by a contact, and/or organized in any other manner. In other embodiments, the recipients may be individually selected and/or managed (e.g. added to email, deleted from email, etc.).

After selecting the one or more possible destinations and/or recipients, the user may select "send" to send the photos to the selected destinations (e.g. contacts, groups, etc.). In some embodiments, the photos may be reduced in size (e.g. decreased resolution, etc.) and/or modified in another manner to optimize being sent. Of course, in another embodiment, the original photo(s) may be sent without any modification. In another embodiment, the one or more selected photos may be sent in multiple emails (e.g. batch of emails, etc.) based on a message size (e.g. maximum message size limited by application, etc.), a number of attachments (e.g. no more than 15 attachments per email, etc.), and/or any other criteria which may affect the one or more emails being sent.

In other embodiments, the email may be sent based off of one or more context sensors, including a location (e.g. send email when user is at home, etc.), a network (e.g. send only when connected to WiFi, etc.), one or more devices (e.g. send email when user is within a set geographic threshold to another contact's device, send email when user is within a set geographic threshold to a secondary device, etc.), a time (e.g. a minimum of five minutes at a location before sending the email, send email at 8 pm, etc.), and/or any other context aware criteria.

Figure 11:
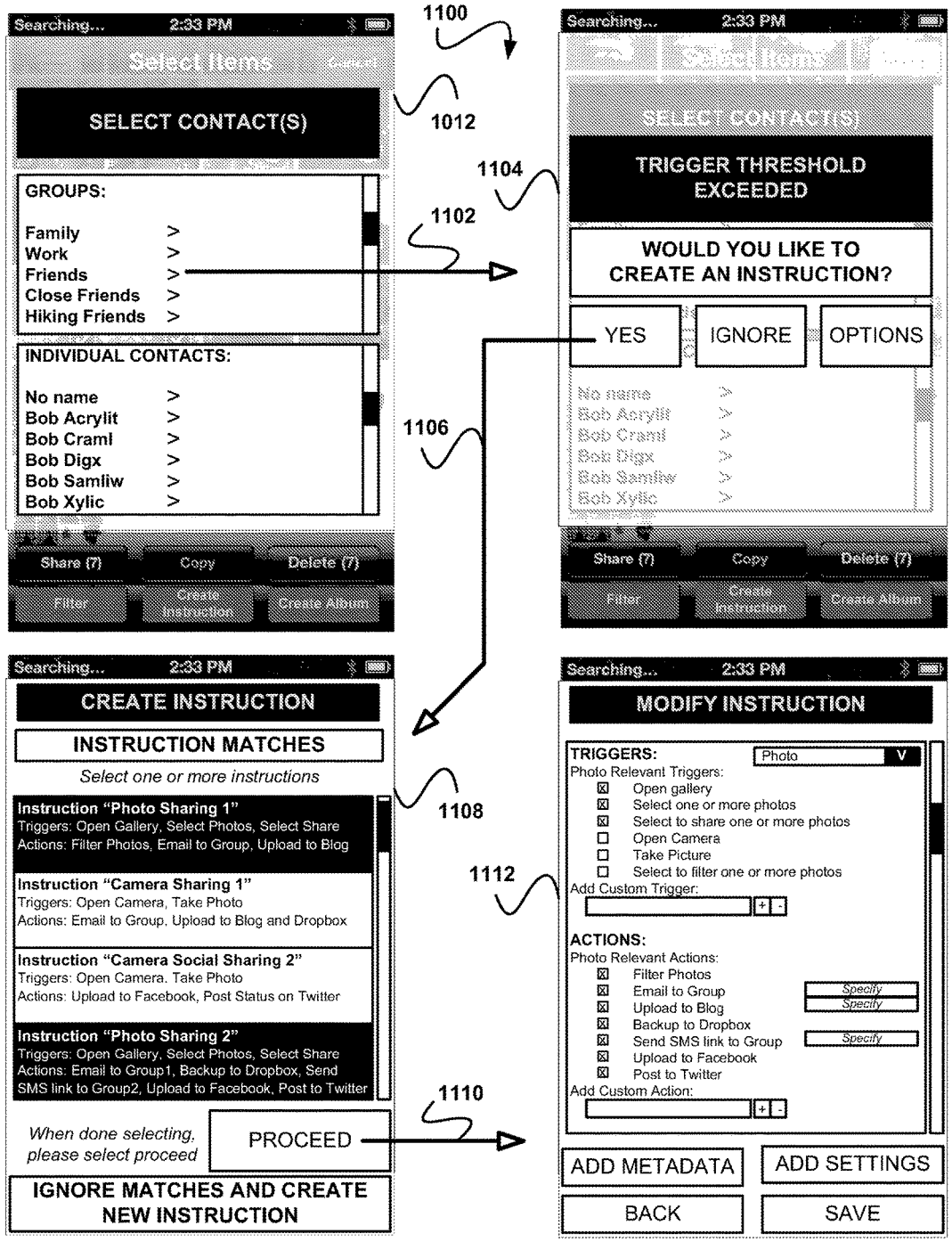
FIG. 11 shows a mobile device interface for creating one or more instructions, in accordance with another embodiment.

FIG. 11 shows a mobile device interface 1100 for creating one or more instructions, in accordance with another embodiment. As an option, the mobile device interface 1100 may be implemented in the context of the architecture and environment of the previous Figures and/or any subsequent Figure(s). Of course, however, the mobile device interface 1100 may be implemented in the context of any desired environment. It should also be noted that the aforementioned definitions may apply during the present description.

As shown, interface 1012 associated with the option to email may be displayed. A group of contacts may be selected 1102. In response to the selection 1102, a trigger threshold interface 1104 may be displayed.

In one embodiment, a trigger threshold may be displayed based on the number of consecutive actions (e.g. within a set time period, e.g. 30 seconds, between each action, etc.) by the user. For example, in one embodiment, the user may open a photo application, select an album, select one or more photos, apply one or more filters to the selected photos, select to share the selected photos via email, and select one or more recipients. In one embodiment, a minimum threshold (e.g. predetermined and/or selected by the user and/or the app, etc.) of six actions may cause a trigger threshold to be displayed. In various embodiments, exceeding a trigger threshold may cause a prompt to be displayed including a prompt to save such detected actions to an instruction, look up an instruction based on the actions, and/or take any other action in response to the set of input actions.

In one embodiment, the user may choose to ignore the trigger instruction prompt. Additionally, in another embodiment, the user may select and/or configure settings under the options prompt. In one embodiment, settings found under the options prompt may include the minimum threshold value before a prompt is displayed, actions to be displayed once a trigger threshold has been exceeded, automatic settings (e.g. after 5 continuous actions, automatically show instruction match screen, etc.), permission settings (e.g. receiving and/or sending one or more instructions, etc.), and/or any other feature which may relate in some manner to an instruction. Of course, in other embodiments, the options prompt may relate to global settings (e.g. device settings, user anonymous settings, etc.), user settings (e.g. user specific settings, etc.), and/or any other set of settings relating to a profile, identity, and/or device.

As shown, a "yes" prompt may be selected 1106, and a create instruction interface 1108 may be displayed. In various embodiments, a create instruction interface may display one or more instruction matches. For example, in one embodiment, the instruction matches may relate in some manner to the identified input actions (e.g. to one or more actions given by the user, etc.). In one embodiment, the user may set a threshold relevancy value (e.g. minimum of two same actions, etc.) that must be met in order for a match to be displayed. Based on one or more camera and/or photo relevant actions, a match may include "Instruction 'Photo Sharing 1'; Triggers: Open Gallery, Select Photos, Select Share; Actions: Filter Photos, Email to Group, Upload to Blog," "Instruction 'Camera Sharing 1'; Triggers: Open Camera, Take Photo; Actions: Email to Group, Upload to Blog and Dropbox," "Instruction 'Camera Social Sharing 2'; Triggers: Open Camera, Take Photo; Actions: Upload to Facebook, Post Status on Twitter," "Instruction 'Photo Sharing 2'; Triggers: Open Gallery, Select Photos, Select Share; Actions: Email to Group1, Backup to Dropbox, Send SMS link to Group2, Upload to Facebook, Post to Twitter," and/or any other relevant match.

In one embodiment, if a threshold of actions matches an instruction, the instruction may be automatically selected. For example, in one embodiment, the input actions may include opening a gallery, selecting photos, and selecting to share the photos via email and Facebook. A threshold may be configured so that if an instruction includes all of the input actions, it may be automatically selected as the relevant instruction match. In another embodiment, if more than one instruction results after the threshold is exceeded, all such results may be presented to the user for selection.

Additionally, in one embodiment, more than one instruction match may be selected. For example, the user may be interested in possible actions and/or triggers from more than one instruction match (e.g. sharing features of a match, productivity features of another match, etc.). As such, selecting more than one instruction match may enable the user to add, remove, and/or modify the combined instruction in any manner.

In another embodiment, the user may disregard the instruction matches and select to create a new instruction. Additionally, in one embodiment, a create instruction interface may display by default a new instruction interface rather than one or more instruction matches. Of course, the default view of the create instruction interface may be set and/or configured by the user (e.g. via options, via app settings, via Native Utility Platform, etc.).

After selecting the one or more instruction matches, the "proceed" prompt may be selected 1110, and a modify instruction interface 1112 may be displayed. In various embodiments, the modify instruction interface page may include possible triggers and actions, the ability to add, remove, and/or customize the triggers and/or actions, the ability to specify details (e.g. specify contacts in a group, specify blog details, specify application, etc.) relating to the triggers and/or actions, identify the relevancy (e.g. photo, calendar, contact management, productivity, video, social media, sharing, etc.) of the triggers and/or actions, and/or any other feature which may modify the instruction in some manner.

In one embodiment, actions and/or triggers relating to the selected one or more instructions may be displayed and/or modified. For example, in one embodiment, the relevancy may be automatically set (e.g. based off of the relevancy tag of the one or more instruction matches, etc.), and/or may be set by the user (e.g. via drop down menu, etc.). In another embodiment, upon selection of the relevancy, the triggers and/or actions may change to display a set of relevant triggers and/or actions. After the relevant triggers and/or actions are displayed, items relevant to the selected one or more instruction matches may be pre-selected. Additionally, if an item included with the one or more instruction matches is not included with the relevant triggers and/or actions, it may be added to the list of triggers and/or actions. In a further embodiment, a custom trigger and/or action may be added and/or deleted, including inserting a trigger and/or action not associated with the relevant triggers/actions (e.g. an item associated with productivity, etc.), creating a new trigger and/or action not associated with any previously created trigger and/or action, and/or adding any item not already listed with the relevant triggers and/or actions.

In some embodiments, a photo relevancy may display photo relevant triggers, including the ability to open a gallery, select one or more photos, select to share one or more photos, open camera, take picture, select to filter one or more photos, and/or select any other function which may relate to photos. Additionally, in another embodiment, a photo relevancy may display photo relevant actions, including the ability to filter photos, email to a group, upload to a blog, backup to Dropbox, send SMS link to a group, upload to Facebook, post to Twitter, and/or select any other action which may relate to photos.

In various embodiments, the modify instruction interface may display one or more options, including the option to add metadata, to add settings, to go back (e.g. to the prior screen and/or interface, etc.), and/or to save. Of course, any option which may relate to the modify instruction interface and/or to navigating the create instruction interface may be displayed. In one embodiment, saving the instruction may include storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

Figure 12:
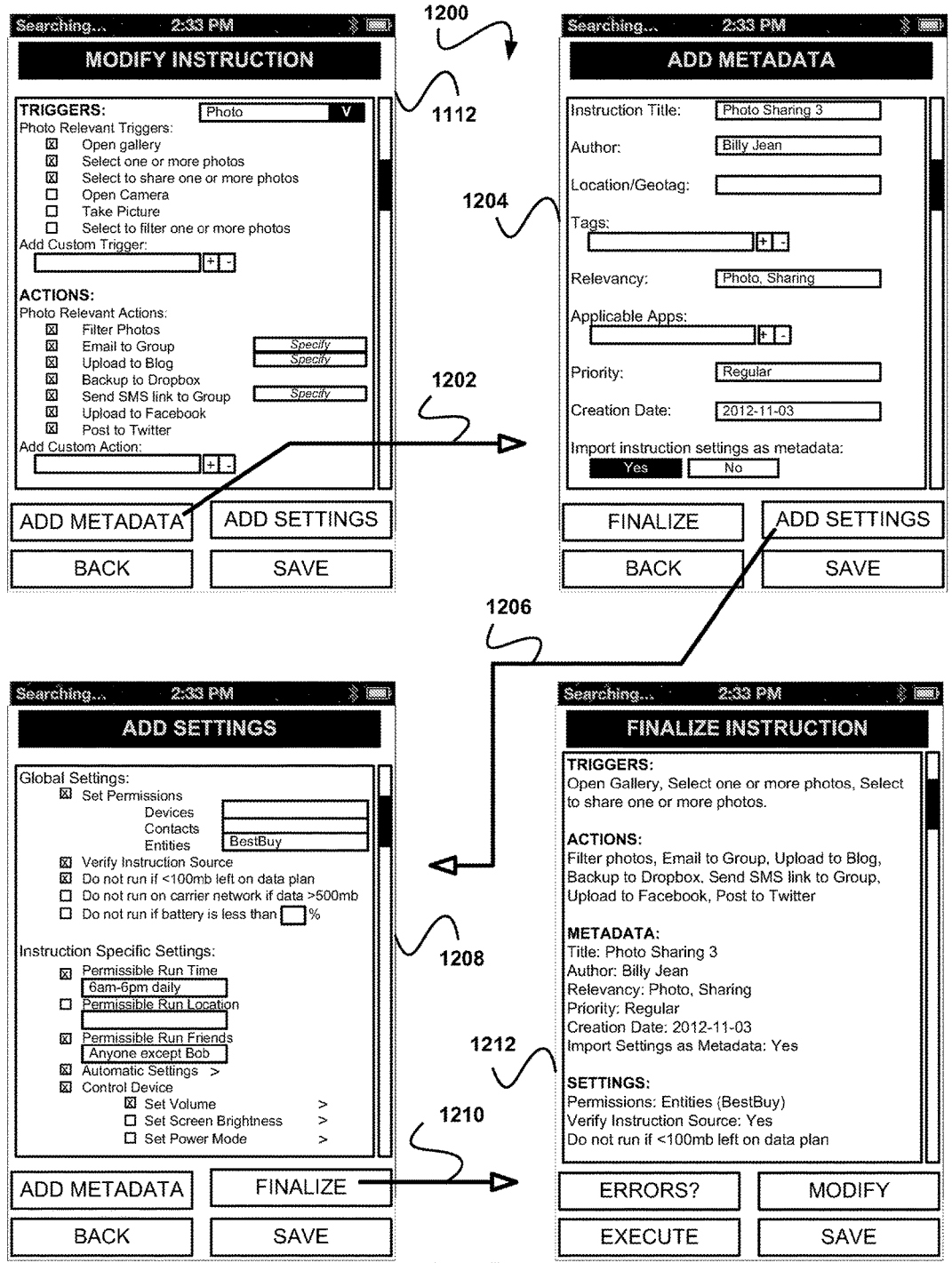
FIG. 12 shows a mobile device interface for creating one or more instructions, in accordance with another embodiment.

FIG. 12 shows a mobile device interface 1200 for creating one or more instructions, in accordance with another embodiment. As an option, the mobile device interface 1200 may be implemented in the context of the architecture and environment of the previous Figures and/or any subsequent Figure(s). Of course, however, the mobile device interface 1200 may be implemented in the context of any desired environment. It should also be noted that the aforementioned definitions may apply during the present description.

As shown, modify instruction interface 1112 may be displayed and the add metadata prompt may be selected 1202. The add metadata interface 1203 may be also displayed.

In one embodiment, the add metadata interface may include the ability to insert an instruction title, an author, a location/geotag, a tag (e.g. data content, application content, etc.), a relevancy (e.g. photo, sharing, etc.), applicable apps (e.g. apps which may relate and/or may be included in the instruction, etc.), priority (e.g. high, regular, low, priority with respect to other instructions being executed, etc.), creation date, the ability to import instruction settings as metadata (e.g. settings are also imported as metadata values associated with the instruction, etc.), and/or any other value which may relate to metadata.

In various embodiments, the metadata may be stored internally (e.g. in the same file as the instruction, etc.) and/or externally (e.g. in a separate file other than the instruction, etc.). Additionally, the metadata may be formatted in a human readable format (e.g. XML, etc.) and/or in a non-human readable format (e.g. binary, etc.).

As shown, an add settings option may be selected 1206, and an add settings interface 1208 may be displayed. In various embodiments, the add settings interface may include global settings, such as permissions (e.g. associated with device, contacts, entities, locations, etc.), ability to verify the instruction source (e.g. in the instance where an instruction is sent from another contact and/or device to the user's mobile device, etc.), restrictions where the instruction will not run if there is less than 100 mb left on the data plan, will not run on the carrier network if the data exceeds 500 mb, will not run if the battery is less than a set amount, and/or any other feature which may relate globally to the instruction and/or the application managing instructions. Of course, in another embodiment, any global setting may be modified on an individual instruction by instruction basis.

In various embodiments, the add settings interface may include instruction specific settings, including permissible run time (e.g. morning, night, 6 am-6 pm daily, Monday-Friday, etc.), permissible run locations (e.g. based off of device location, etc.), permissible run friends (e.g. instruction may be run when a device and/or contact is near, instruction may be prevented to be run when a device and/or contact is near, etc.), automatic settings (e.g. configure user's mobile device based on triggers, actions, and/or settings, etc.), settings associated with controlling the user's mobile device (e.g. set volume, set screen brightness, set power mode, etc.), and/or any other settings which may relate in some manner to the instruction. In another embodiment, a user may download and/or select a set of predefined settings (e.g. included in the instruction file, etc.), and/or may input all settings relating to the instruction.

As shown, a finalize option may be selected 1210 and a finalize instruction interface may be displayed 1212. In one embodiment, the finalize instruction interface may display all triggers, actions, metadata, settings, and/or any further information which may relate in some manner to the created instruction. In one embodiment, the user may select an errors option to verify if there are any errors associated with the instruction (e.g. inconsistent rules, inadequate permissions, etc.) and/or any errors associated with executing the instruction (e.g. with respect to other instructions, with respect to system resources, with respect to other applications, etc.).

In another embodiment, a modify option may be selected to modify the selected triggers, actions, metadata, and/or settings. In one embodiment, an execute option may be selected to immediately execute (e.g. run, etc.) the created instruction. Further, in another embodiment, the instruction may be saved, including storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

Figure 13:
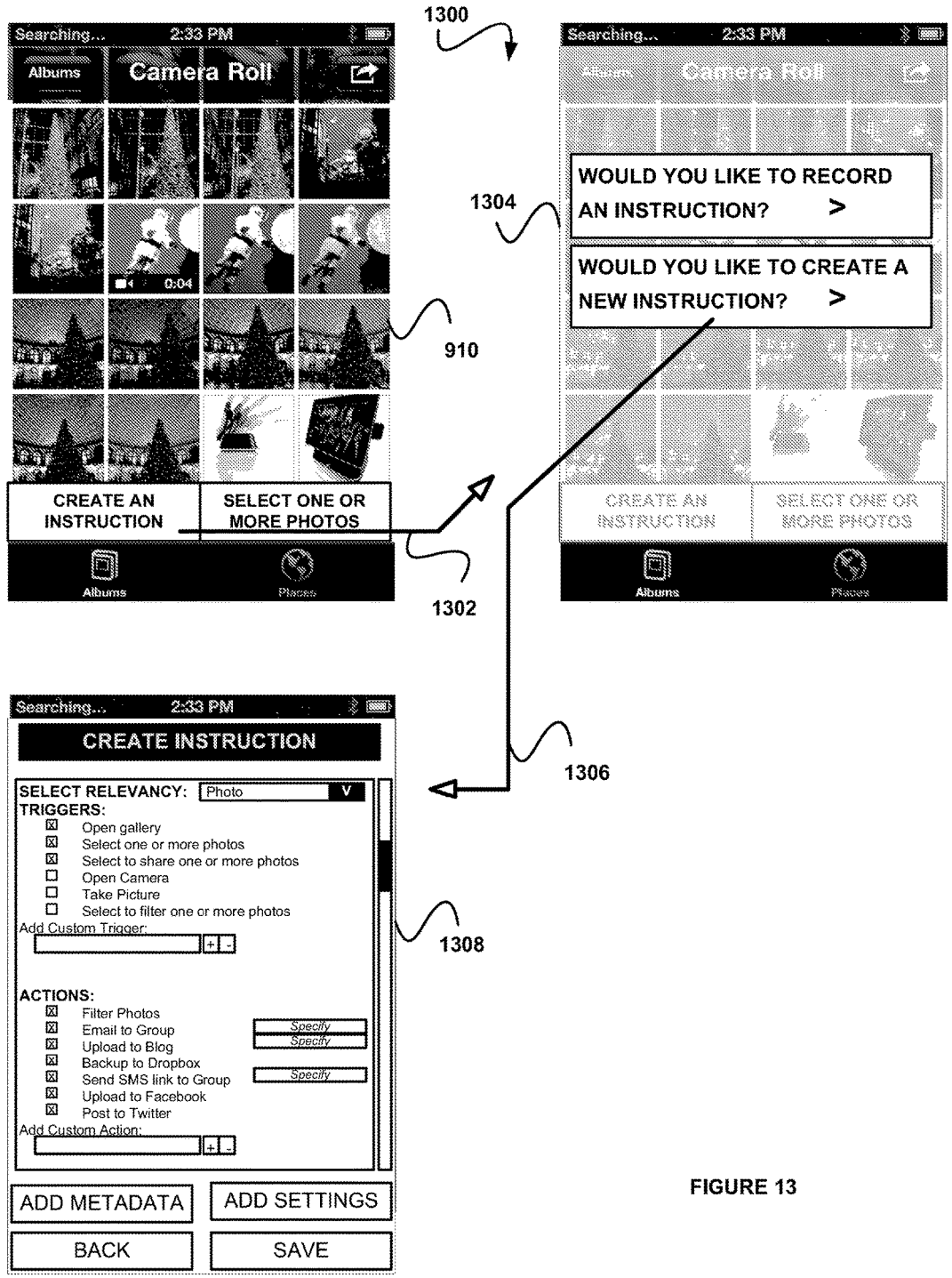
FIG. 13 shows a mobile device interface for creating one or more instructions, in accordance with another embodiment.

FIG. 13 shows a mobile device interface 1300 for creating one or more instructions, in accordance with another embodiment. As an option, the mobile device interface 1300 may be implemented in the context of the architecture and environment of the previous Figures and/or any subsequent Figure(s). Of course, however, the mobile device interface 1300 may be implemented in the context of any desired environment. It should also be noted that the aforementioned definitions may apply during the present description.

As shown, a display 910 showing the photos associated with the album may be displayed. A "create an instruction" option may be selected 1302, and a "create an instruction" prompt interface 1304 may be displayed.

In various embodiments, a create an instruction interface may be displayed automatically (e.g. threshold exceeded of input actions, another device may cause an instruction to be recorded, etc.), and/or may be displayed manually (e.g. in response to selecting a button, etc.). In some embodiments, a create an instruction interface may prompt the user with "would you like to record an instruction?," "would you like to create a new instruction?," and/or any other prompt associated with a new instruction.

In one embodiment, the ability to record an instruction may include giving further input actions, including opening application, navigating within the application (e.g. accessing submenus and/or subpages, etc.), taking an action within the application (e.g. open item, modify item, initiate program, etc.), modifying device setting (e.g. brightness, volume, permissions, network, etc.), interacting with one or more applications (e.g. backup data to Dropbox, share via Facebook, find restaurants via Yelp, etc.), and/or taking any other action which may be inputted and recorded by the mobile device. In a separate embodiment, an instruction may be recorded including input actions on a secondary device (e.g. second mobile device, input device, device associated with a trusted contact, etc.), sensors not physically associated with the mobile device (e.g. sensors on a secondary device, sensors in a car, sensors at an airport, etc.), and/or through any other input system.

In another embodiment, selecting the prompt to create a new instruction 1306 may cause a create instruction interface 1308 to be displayed. In various embodiments, the create instruction interface page may include possible triggers and actions, the ability to add, remove, and/or customize the triggers and/or actions, the ability to specify details (e.g. specify contacts in a group, specify blog details, specify application, etc.) relating to the triggers and/or actions, identify the relevancy (e.g. photo, calendar, contact management, productivity, video, social media, sharing, etc.) of the triggers and/or actions, and/or any other feature which may modify the instruction in some manner.

In one embodiment, any action and/or trigger relating to a relevancy criterion may be displayed and/or modified. For example, in one embodiment, the relevancy may be automatically set (e.g. based off of the relevancy tag of the application source, etc.), and/or may be set by the user (e.g. via drop down menu, etc.). In another embodiment, upon selection of the relevancy, the triggers and/or actions may change to display a set of relevant triggers and/or actions. In a further embodiment, a custom trigger and/or action may be added and/or deleted, including inserting a trigger and/or action not associated with the relevant triggers/actions (e.g. an item associated with productivity, etc.), creating a new trigger and/or action not associated with any previously created trigger and/or action, and/or adding any item not already listed with the relevant triggers and/or actions.

In some embodiments, a photo relevancy may display photo relevant triggers, including the ability to open a gallery, select one or more photos, select to share one or more photos, open camera, take picture, select to filter one or more photos, and/or select any other function which may relate to photos. Additionally, in another embodiment, a photo relevancy may display photo relevant actions, including the ability to filter photos, email to a group, upload to a blog, backup to Dropbox, send SMS link to a group, upload to Facebook, post to Twitter, and/or select any other action which may relate to photos.

In various embodiments, the create instruction interface may display one or more options, including the option to add metadata, to add settings, to go back (e.g. to the prior screen and/or interface, etc.), and/or to save. Of course, any option which may relate to the modify instruction interface and/or to navigating the create instruction interface may be displayed. In one embodiment, saving the instruction may include storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

Figure 14:
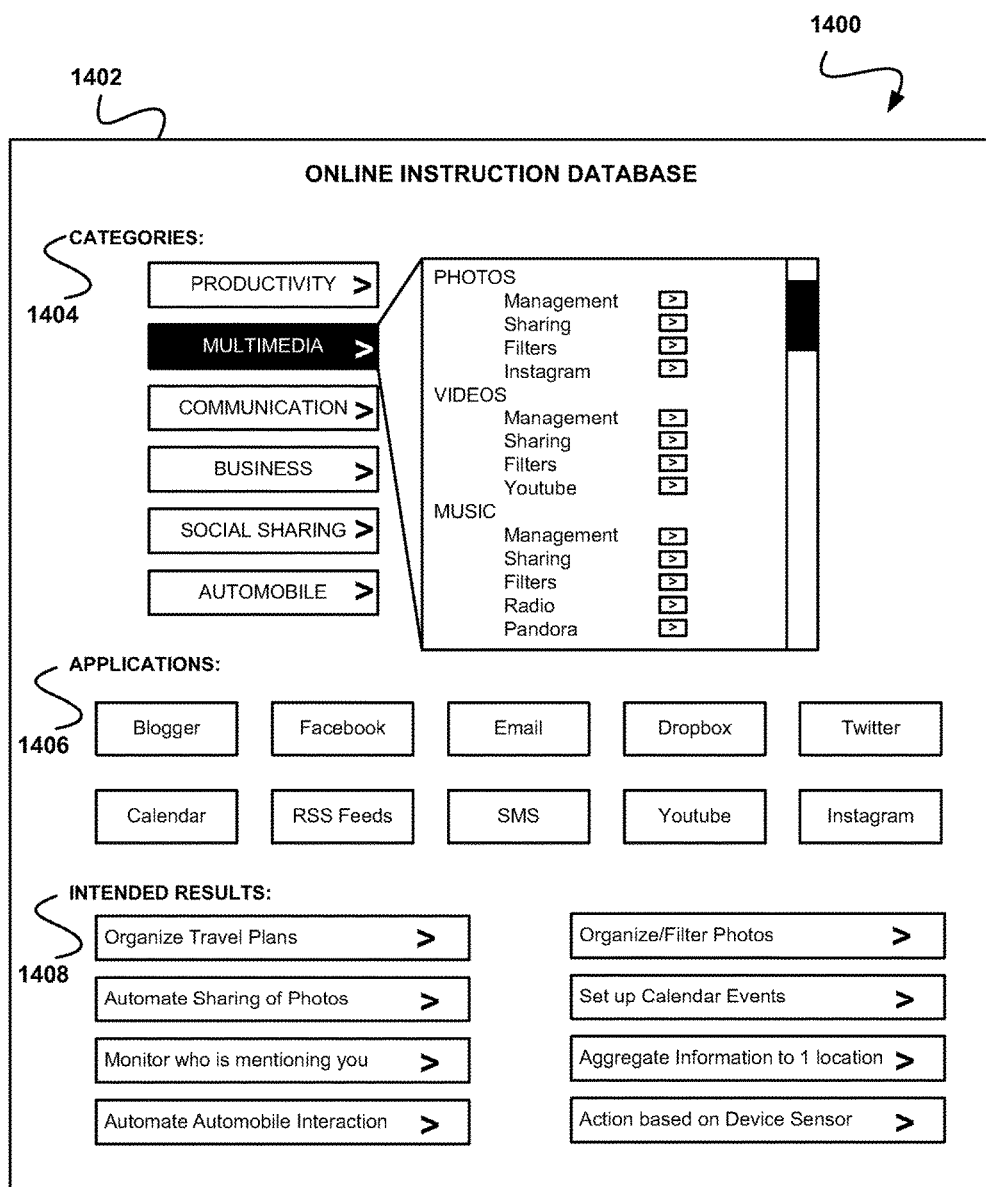
FIG. 14 shows an online interface for selecting one or more instructions, in accordance with another embodiment.

FIG. 14 shows an online interface 1400 for creating one or more instructions, in accordance with another embodiment. As an option, the online interface 1400 may be implemented in the context of the architecture and environment of the previous Figures and/or any subsequent Figure(s). Of course, however, the online interface 1400 may be implemented in the context of any desired environment. It should also be noted that the aforementioned definitions may apply during the present description.

As shown, an online instruction database interface 1402 may be displayed. In one embodiment, the online instruction database may be associated with a website (e.g. accessed via an html address, site external to the user's current network, etc.), with an internal server (e.g. site located within the user's current network, etc.), with one or more secondary devices (e.g. instruction database may be located on another device, etc.), and/or with any other database system. In various embodiments, the online instruction database may be managed by an app (e.g. as downloaded on the user's mobile device, etc.), by a separate entity (e.g. not affiliated with the app, etc.), by a collaboration of more than one user (e.g. a wiki of instructions, etc.), and/or by any other entity which may manage at least in part the online instruction database.

In one embodiment, the online instruction database may be organized by categories 1404, applications 1406, and/or intended results 1408. For example, in another embodiment, categories may include general instruction designation, such as productivity, multimedia, communication, business, social sharing, automobile, and/or any other category which may relate globally to one or many instructions. In one embodiment, each category may be comprised of one or more subcategories. As an example, in one embodiment, the multimedia category may be comprised of several subcategories such as photos, videos, music, and/or any other subcategory which may relate to multimedia. Each subcategory may be further refined. For example, photos may be further refined by relating to management, sharing, filters, and/or instagram. Videos may relate to management, sharing, filters, and/or youtube. Music may relate to management, sharing, filters, radio, and/or Pandora. Of course, each subcategory may be comprised of any number and type of refining categories. Additionally, in another embodiment, each refining category (e.g. management, sharing, filters, etc.) and subsequent category may be potentially further refined.

In various embodiments, the categories may be displayed as a set of tabs, as a hierarchal menu (e.g. menu which may be expanded and/or collapsed, etc.), as a set of links, and/or in any other manner whereby the categories and subcategories may be accessed. In some embodiments, a user utilizing the online instruction database may add additional categories and/or may modify existing categories and/or breakdowns. In another embodiment, permission may be granted to a user to modify and/or add categories.

In one embodiment, the online instruction database may be organized by applications. In various embodiments, the applications may relate to applications involved in at least one instruction, applications that are used predominately used (e.g. over half of the triggers and/or actions relate to the application, etc.) by at least one instruction, applications that have been rated as popular, and/or any other application category and/or organization designation. In some embodiments, the applications organization may be edited and/or a new application designation added. In other embodiments, permission may be granted to a user to modify and/or add application designations.

In the instance where an application has not hitherto been used in an instruction, the online instruction database may permit the user to add a new application to be recognized by the online instruction database. In various embodiments, a new application may be added by providing a link (e.g. HTML address, etc.) associated with the application, selecting the application from an online search result (e.g. Google search results, etc.), and/or providing information to validate the authenticity of the application. In one embodiment, validating the authenticity of the application may include confirming the existence of the application, inputting the correct name of the application (i.e. prevent misspellings, etc.), and/or incorporating additional application features to be used by the online instruction database (e.g. other features beyond those targeted and/or used by the user in the created instruction, etc.).

In one embodiment, the online instruction database may be organized by intended results. For example, in various embodiments, intended results may include organize travel plans, automate sharing of photos, monitor who is mentioning you, automate automobile interaction, organize/filter photos, set up calendar events, aggregate information to 1 location, action based on device sensor, and/or any category which is focused on the intended result of the instruction.

In some embodiments, the intended results categories may be populated based off of the popularity of downloaded instructions. Additionally, the online instruction database may request (e.g. through a prompt, question and response, etc.) the intended use of the instruction at the time the user seeks to download (or send) the instruction. In this manner, the online instruction database may collect information relating to each downloaded and/or sent instruction, and may use such information to populate and rank intended results categories.

Figure 15:
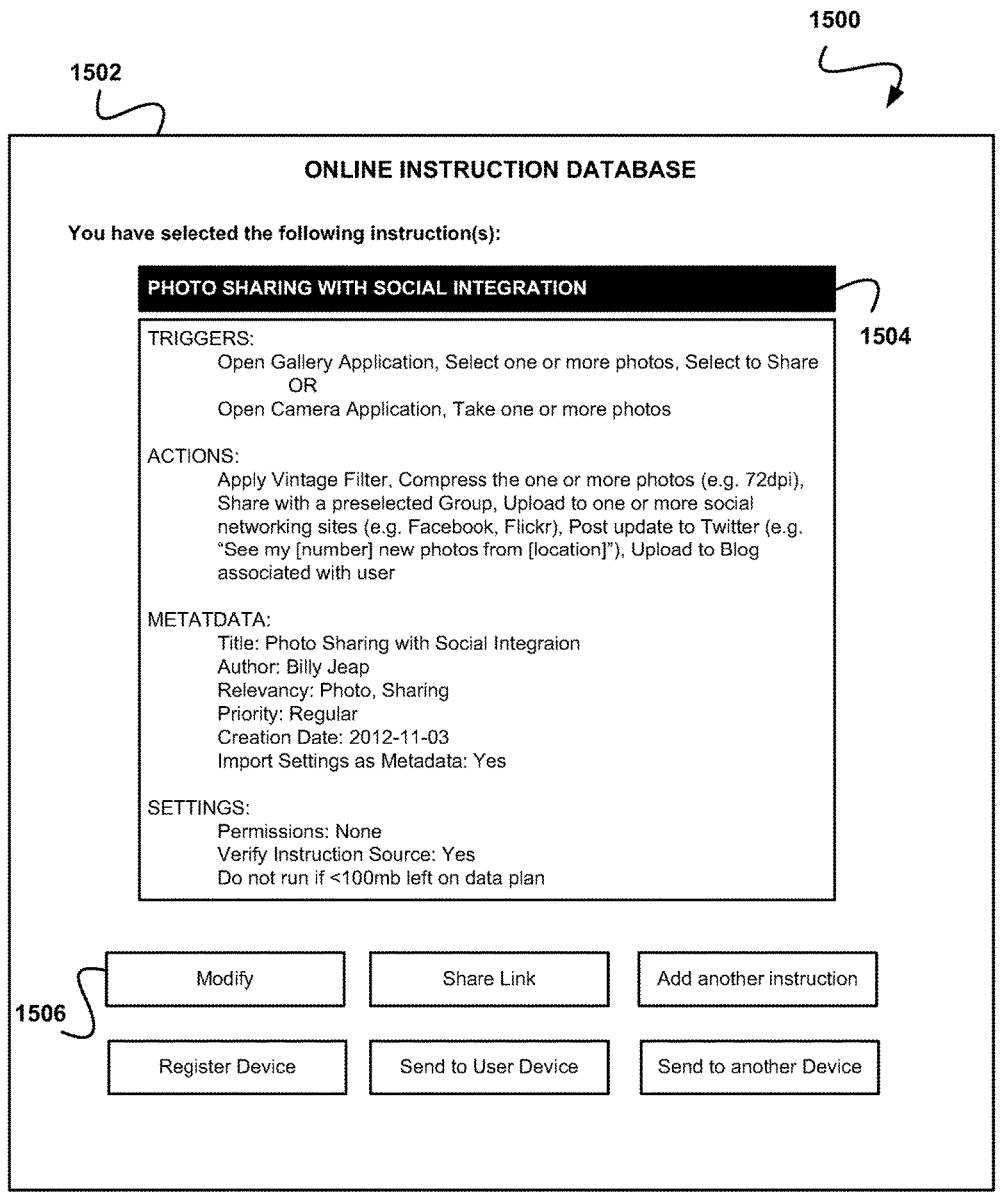
FIG. 15 shows an online interface for viewing one or more selected instructions, in accordance with another embodiment.

FIG. 15 shows an online interface 1500 for viewing one or more selected instructions, in accordance with another embodiment. As an option, the online interface 1500 may be implemented in the context of the architecture and environment of the previous Figures and/or any subsequent Figure(s). Of course, however, the online interface 1500 may be implemented in the context of any desired environment. It should also be noted that the aforementioned definitions may apply during the present description.

As shown, the online instruction database interface 1502 may display one or more selected instructions 1504. In one embodiment, when more than one instruction has been selected, the resulting selected instructions interface will display an instruction combining all previously selected instructions.

As an example, a user may have selected one or more instruction dealing with photo sharing and social integration. The title of the instruction may be displayed as "photo sharing with social integration." Of course, any title may be displayed and the title may be modified as desired by the user. In one embodiment, more than one set of triggers may have been previously selected by the user. The more than one set of triggers may be displayed as one combined set of triggers, or in another embodiment, more than one set of triggers may be associated with the instruction. For example, in one embodiment, one set of triggers may include open gallery application, select one or more photos, and select to share, and another set of triggers may include open camera application, and take one or more photos. The instruction therefore may be associated with both sets of triggers. Of course, any number of sets of triggers may be associated with the instruction.

In various embodiments, one or more actions may be associated with the selected instruction. For example, in one embodiment, the instruction may relate to photo sharing with social integration and the instruction actions may include apply vintage filter, compress the one or more photos, share with preselected group, upload to one or more social networking sites, post update to twitter, and/or upload to blog associated with user. In some embodiments, the user may specify further details relating to each action item, including, for example, specifying the level of compression associated with the photos (e.g. reduce to 72 dpi, etc.), specifying the users to be included in a group to which the photos will be sent, specifying login credentials for one or more social networking sites (e.g. Facebook, Flickr, Twitter, etc.), specifying login credentials for one or more blogs, and/or providing any further information relating to one or more actions.

Additionally, in one embodiment, metadata and settings may be displayed which are associated with the instruction. In another embodiment, where more than one instruction was previously selected, the metadata and settings may reflect more than one creation date and/or author. In one embodiment, the online instruction database will combine items that may be combinable (e.g. relevancy, priority, title, etc.). In various embodiments, metadata may include a title, author, relevancy (e.g. of the intended use, of applications used, etc.), priority (e.g. high, regular, low, priority with respect to other instructions being executed, etc.), creation date, the ability to import instruction settings as metadata (e.g. settings are also imported as metadata values associated with the instruction, etc.), and/or any other value which may relate to metadata.

In various embodiments, the metadata may be stored internally (e.g. in the same file as the instruction, etc.) and/or externally (e.g. in a separate file other than the instruction, etc.). Additionally, the metadata may be formatted in a human readable format (e.g. XML, etc.) and/or in a non-human readable format (e.g. binary, etc.).

In other embodiments, the settings may include global settings, such as permissions (e.g. associated with device, contacts, entities, locations, etc.), ability to verify the instruction source (e.g. in the instance where an instruction is sent from another contact and/or device to the user's mobile device, etc.), restrictions where the instruction will not run if there is less than 100 mb left on the data plan, will not run on the carrier network if the data exceeds 500 mb, will not run if the battery is less than a set amount, and/or any other feature which may relate globally to the instruction and/or the application managing instructions. Of course, in another embodiment, any global setting may be modified on an individual instruction by instruction basis.

In various embodiments, settings may also include instruction specific settings, including permissible run time (e.g. morning, night, 6 am-6 pm daily, Monday-Friday, etc.), permissible run locations (e.g. based off of device location, etc.), permissible run friends (e.g. instruction may be run when a device and/or contact is near, instruction may be prevented to be run when a device and/or contact is near, etc.), automatic settings (e.g. configure user's mobile device based on triggers, actions, and/or settings, etc.), settings associated with controlling the user's mobile device (e.g. set volume, set screen brightness, set power mode, etc.), and/or any other settings which may relate in some manner to the instruction. In another embodiment, a user may download and/or select a set of predefined settings (e.g. included in the instruction file, etc.), and/or may input all settings relating to the instruction.

As shown, the online instruction database interface may include one or more options 1506 associated with the selected one or more instructions, including the ability to modify, share link, add another instruction, register device, send to user device, send to another device, and/or any other feature which may relate to the instruction. In some embodiments, the ability to modify may include add, removing, and/or modifying in any manner the triggers, actions, metadata, settings, and/or any element associated with the instruction; the ability to share a link may include sending (e.g. via email, via html send form, via SMS, via chat, etc.) a link (e.g. HTML address, etc.) associated with the selected one or more instructions; the ability to add another instruction may include searching and adding in an additional one or more instructions; the ability to register device may include registering a device that is associated with the user (e.g. mobile device, desktop device, automobile, etc.); the ability to send to user device may include sending the displayed instruction to a default device (as preselected by the user, etc.); the ability to send to another device may include sending the displayed instruction to another device associated with the user and/or sending the instruction to a device not associated with the user (e.g. a device associated with a trusted contact, a device with permission to the user to modify, etc.). Of course, any option associated with the selected one or more instructions may be displayed.

Figure 16:
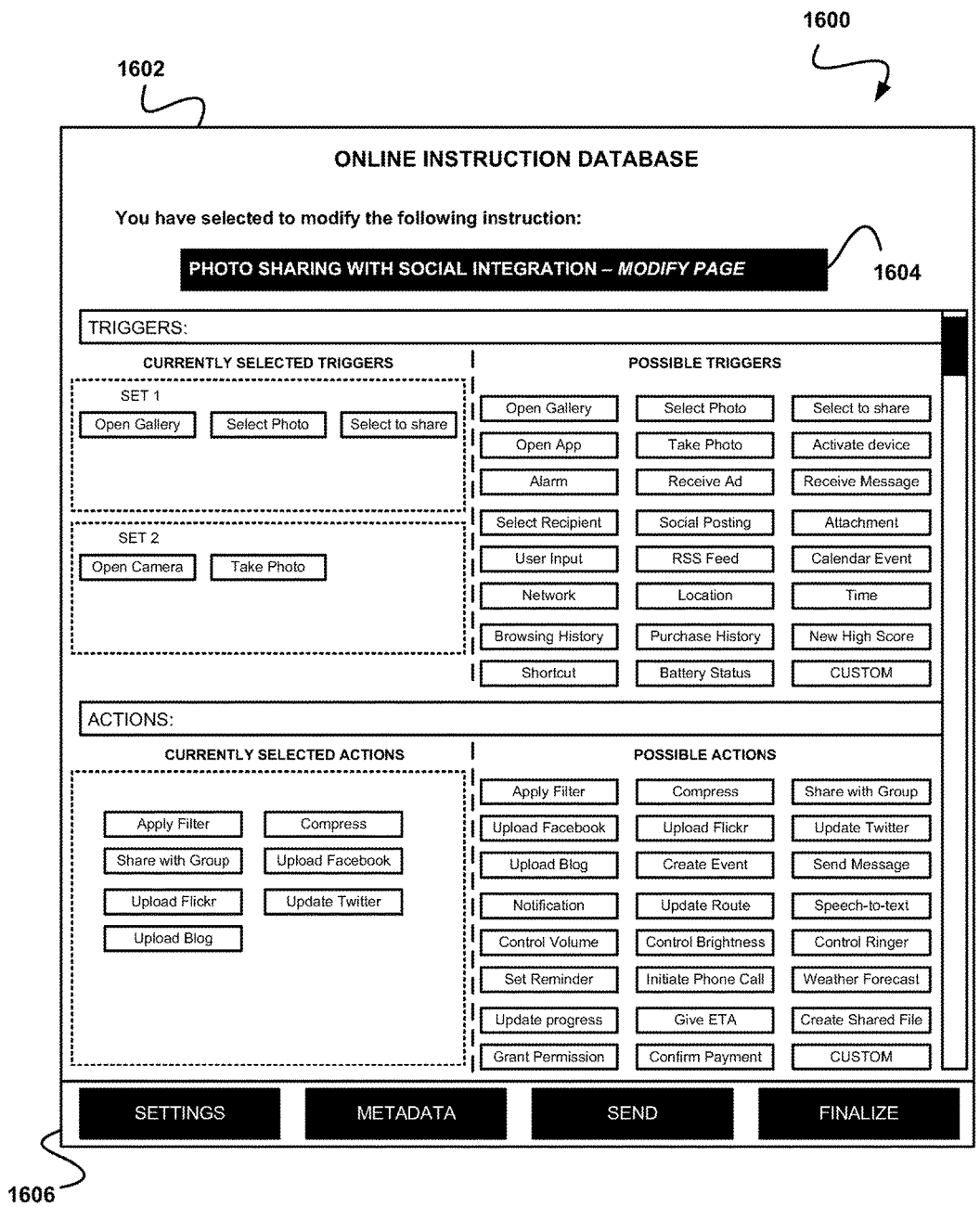
FIG. 16 shows an online interface for modifying an instruction, in accordance with another embodiment.

FIG. 16 shows an online interface 1600 for modifying an instruction, in accordance with another embodiment. As an option, the online interface 1600 may be implemented in the context of the architecture and environment of the previous Figures and/or any subsequent Figure(s). Of course, however, the online interface 1600 may be implemented in the context of any desired environment. It should also be noted that the aforementioned definitions may apply during the present description.

As shown, the online instruction database interface 1602 may display an instruction to be modified 1604. In one embodiment, the modification page may relate to one or more previously selected instructions. In another embodiment, the modification page may relate to creating a new instruction (e.g. not based on any previously existing instructions, etc.).

In various embodiments, the modification page associated with the online instruction database interface may display triggers, actions, settings, metadata and/or any other information. In one embodiment, the triggers may be separated into a "currently selected trigger" column and a "possible trigger" column. In such an embodiment, the user may drag and drop one or more triggers from the "possible trigger" column to the "currently selected trigger" column. Each trigger may be represented by a selectable (e.g. movable, etc.) box. In one embodiment, if a possible trigger has been moved to the "currently selected triggers" column, additional information may be requested of the user. For example, in one embodiment, a possible trigger may be "open app" whereupon when the trigger is moved to "currently selected triggers," a prompt may be displayed requesting the user to indicate what app or type of app the trigger should relate to (e.g. open gallery, open email app, open Facebook, open Yelp, etc.).

In one embodiment, more than one set of triggers associated with the instruction may be configured and/or created by the user. For example, if it was desired to create an instruction focusing on photo sharing with social integration, one set of triggers may focus on the opening of a gallery app whereas another set of triggers may focus on a camera app. Of course, any number of sets of triggers may be created and/or configured.

In one embodiment, all possible triggers may be listed in the "possible triggers" column. In another embodiment, the possible triggers may be displayed in response to a selection of a relevancy criteria, including, for example, productivity (e.g. time management, email, calendar, etc.), multimedia (e.g. photos, videos, music, etc.), communication (e.g. chat, SMS, email, etc.), business (e.g. CRM features, contact management, etc.), social sharing (e.g. social media posting, trusted device management, etc.), automobile (e.g. integration with infotainment system, management of communication, etc.), and/or any other relevancy category which may filter in some manner the possible triggers displayed. In various embodiments, the relevancy criteria may be displayed as a drop-down menu, as a set of links, as set of tabs (e.g. selection of the tab will display the associated possible triggers, etc.), and/or in any other manner.

In other embodiments, the currently selected triggers and the possible triggers may be displayed in any manner, including displaying the one or more triggers (including the currently selected triggers and/or the possible triggers) in a list (e.g. hierarchal list, etc.), as icons, in an interactive frame (e.g. wizard assistance in creating an instruction, etc.), as selectable objects, and/or in any other manner. Additionally, in other embodiments, the one or more possible triggers may be dragged and dropped, selected (e.g. select icon and/or text and/or check a selection mark next to a desired trigger, etc.), written in code (e.g. formulate instruction via code including requests and/or integration of possible triggers, etc.), and/or used in any manner.

In various embodiments, possible triggers may include the ability to open a gallery, select a photo, select to share an item, open an app, take a photo, activate a device, set an alarm, receive an ad, receive a message, select a recipient, create and/or receive a social posting, send and/or receive an attachment, request and/or receive user input, receive an RSS feed, receive and/or create a calendar event, connect to a network, and/or be associated with a location, time, browsing history, purchase history, new high score, a shortcut, a battery status, a custom item, and/or any other item which may relate to some input to the user device. In other embodiments, the possible trigger may relate to an action by a user, by another device (e.g. secondary device, server, etc.), by another user (or trusted contact), by an app (e.g. associated with the user's mobile device, associated with another device and/or user, etc.), and/or any input source.

In other embodiments, possible actions may include ability to apply a filter, to compress a file (e.g. photo, music, video, pdf, document, etc.), share an item with a group, upload item to Facebook, upload item to Flickr, update Twitter, upload an item to a blog, create an event (e.g. calendar appointment, party, e-vite invitation, etc.), send a message, receive and/or create a notification, update a route (e.g. GPS route, GPS tracks, etc.), enable and/or disable speech-to-text, control volume (e.g. of the device, of another associated device, etc.), control brightness (e.g. of the device, of another associated device, etc.), control ringer (e.g. of the device, etc.), set a reminder, initiate a phone call, provide and/or request a weather forecast, update progress (e.g. on a project, on a route, etc.), give an ETA (e.g. when the user will arrive at a destination, when a project will be turned in, etc.), create a shared file, grant a permission (e.g. to a user, to a device, to a group, etc.), confirm a payment (e.g. electronic transfer of funds, electronic purchase, etc.), apply a custom action, and/or take any other action. In some embodiments, the action may relate to a user, a user's mobile device, another device (e.g. secondary device, server, etc.), another user (or trusted contact), an app (e.g. associated with the user's mobile device, associated with another device and/or user, etc.), and/or any device or entity.

As shown, the online instruction database interface modification page may include one or more options 1606, including settings, metadata, send, and/or finalize. In one embodiment, the settings option may include global settings, such as permissions (e.g. associated with device, contacts, entities, locations, etc.), ability to verify the instruction source (e.g. in the instance where an instruction is sent from another contact and/or device to the user's mobile device, etc.), restrictions where the instruction will not run if there is less than 100 mb left on the data plan, will not run on the carrier network if the data exceeds 500 mb, will not run if the battery is less than a set amount, and/or any other feature which may relate globally to the instruction and/or the application managing instructions. Of course, in another embodiment, any global setting may be modified on an individual instruction by instruction basis.

In various embodiments, the settings may include instruction specific settings, including permissible run time (e.g. morning, night, 6 am-6 pm daily, Monday-Friday, etc.), permissible run locations (e.g. based off of device location, etc.), permissible run friends (e.g. instruction may be run when a device and/or contact is near, instruction may be prevented to be run when a device and/or contact is near, etc.), automatic settings (e.g. configure user's mobile device based on triggers, actions, and/or settings, etc.), settings associated with controlling the user's mobile device (e.g. set volume, set screen brightness, set power mode, etc.), and/or any other settings which may relate in some manner to the instruction. In another embodiment, a user may download and/or select a set of predefined settings (e.g. included in the instruction file, etc.), and/or may input all settings relating to the instruction.

In one embodiment, the metadata may include the ability to insert an instruction title, an author, a location/geotag, a tag (e.g. data content, application content, etc.), a relevancy (e.g. photo, sharing, etc.), applicable apps (e.g. apps which may relate and/or may be included in the instruction, etc.), priority (e.g. high, regular, low, priority with respect to other instructions being executed, etc.), creation date, the ability to import instruction settings as metadata (e.g. settings are also imported as metadata values associated with the instruction, etc.), and/or any other value which may relate to metadata.

In various embodiments, the metadata may be stored internally (e.g. in the same file as the instruction, etc.) and/or externally (e.g. in a separate file other than the instruction, etc.). Additionally, the metadata may be formatted in a human readable format (e.g. XML, etc.) and/or in a non-human readable format (e.g. binary, etc.).

In one embodiment, the send option may include sending the created instruction to a device associated with a user, a device associated with another contact (e.g. permission may be granted to the user [either preselected or when the instruction is received] to control some aspect of another device, etc.), an instruction repository (e.g. online instruction database, internal server, etc.), an email address, a backup archive (e.g. Dropbox, etc.), and/or to any other location desired by the user.

In another embodiment, a finalize option may display all triggers, actions, metadata, settings, and/or any further information which may relate in some manner to the created instruction. In one embodiment, a finalize option may include an ability to check for errors in the created instruction, including checking for inconsistent rules, inadequate permissions, instruction execution inconsistencies (e.g. with respect to other instructions, with respect to system resources, with respect to other applications, etc.), and/or any possible error associated with the instruction.

Figure 17:
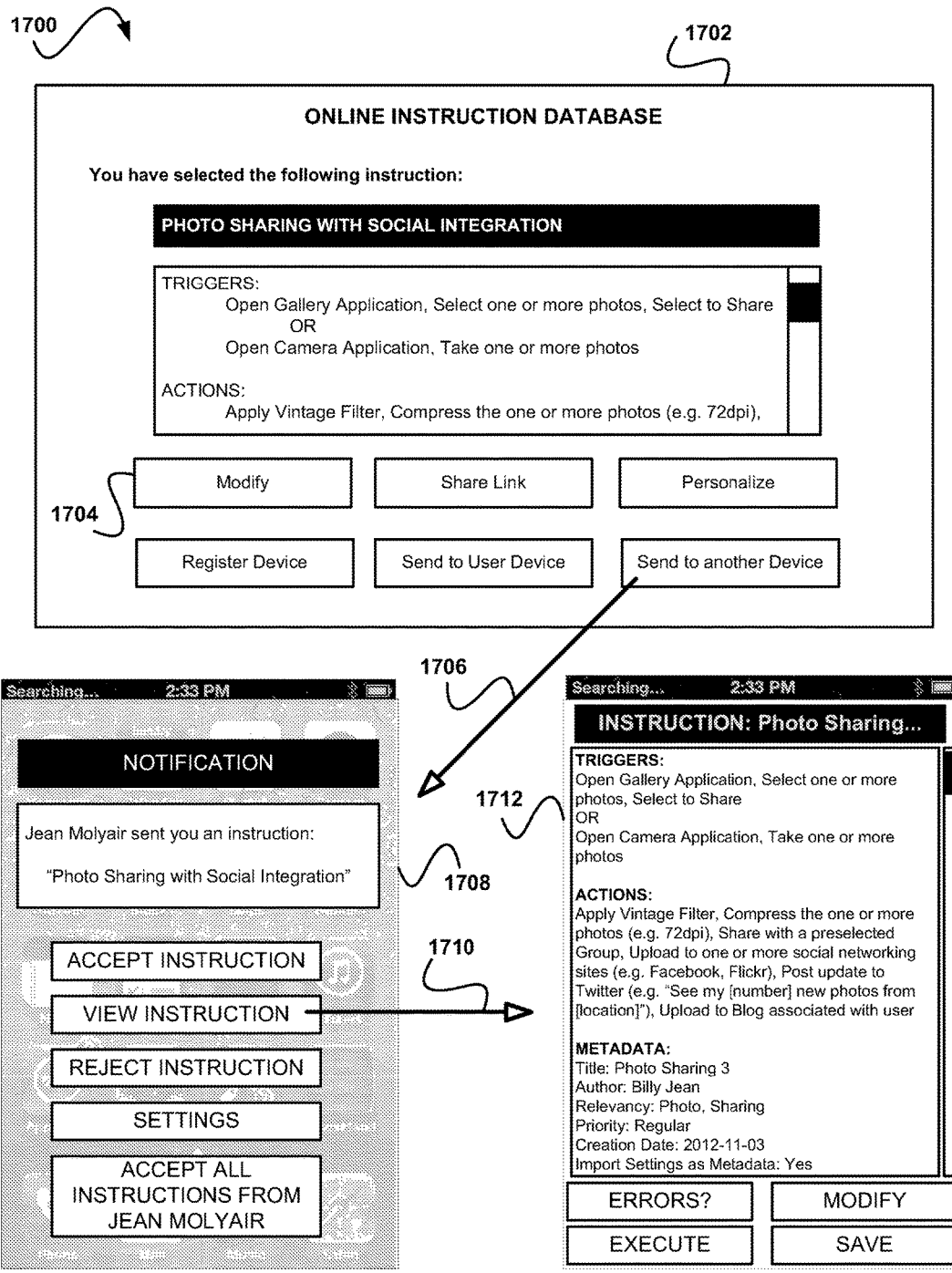
FIG. 17 shows an online and mobile interface for sending and receiving an instruction, in accordance with another embodiment.

FIG. 17 shows an online and mobile interface 1700 for sending and receiving an instruction, in accordance with another embodiment. As an option, the online and mobile interface 1700 may be implemented in the context of the architecture and environment of the previous Figures and/or any subsequent Figure(s). Of course, however, the online and mobile interface 1700 may be implemented in the context of any desired environment. It should also be noted that the aforementioned definitions may apply during the present description.

As shown, an online instruction database interface 1702 may include displaying an instruction. In various embodiments, the displayed instruction may have been created and/or modified previously by the user, may be the result of selecting one or more instructions by the user, may have been sent by a trusted contact (e.g. a friend, etc.) to the user (e.g. via email, via link, via recommendation, etc.), and/or may have been created and/or selected in any manner.

In various embodiments, the online instruction database interface may include one or more options 1704 associated with the instruction, including the ability to modify, share link, add another instruction, register device, send to user device, send to another device, and/or any other feature which may relate to the instruction. In some embodiments, the ability to modify may include add, removing, and/or modifying in any manner the triggers, actions, metadata, settings, and/or any element associated with the instruction; the ability to share a link may include sending (e.g. via email, via html send form, via SMS, via chat, etc.) a link (e.g. HTML address, etc.) associated with the selected one or more instructions; the ability to add another instruction may include searching and adding in an additional one or more instructions; the ability to register device may include registering a device that is associated with the user (e.g. mobile device, desktop device, automobile, etc.); the ability to send to user device may include sending the displayed instruction to a default device (as preselected by the user, etc.); the ability to send to another device may include sending the displayed instruction to another device associated with the user and/or sending the instruction to a device not associated with the user (e.g. a device associated with a trusted contact, a device with permission to the user to modify, etc.). Of course, any option associated with the instruction may be displayed.

As shown, the send to another device option may be selected 1706. In various embodiments, the user of the online instruction database may be presented with an interface to select the appropriate device to send the instructions. In one embodiment, the user may select one or more devices, may input information (e.g. phone number, device id, etc.) relating to a new device, and/or modify information of any existing device profiles. In another embodiment, a permission level may be associated with each device. For example, in various embodiments, the permission level may relate to a granted permission level sent by a user of the device (e.g. the recipient on the mobile device may designate a permission level associated with the sender of the instruction, etc.), to a permission level associated with a group (e.g. permission to implement instructions based on role and/or user identity, etc.), and/or to any other permission which may be associated with a device and the sending user of the instruction.

In one embodiment, a device may not have an associated permission. In such an embodiment, when the user of the device receives an instruction from the user (or device), the receiving user may designate a permission level to be associated with the sending user (or device). In various embodiments, the receiving user may permit the sending user (or device) to have permission to add and install instructions, to push information relating to the instruction to the receiving user's device (e.g. but not to install them, etc.), to install a temporary and/or trial version (e.g. limited features, etc.) of the instruction, and/or to have any other permission to interact with the receiving user's mobile device in some manner.

As shown, in response to an instruction being sent (e.g. from an online instruction database, etc.), a notification interface 1708 may be displayed on the receiving user's mobile device. Of course, in other embodiments, any device may function as the receiving device. In one embodiment, the notification may indicate the user that sent the instruction and the instruction title. For example, in one embodiment, the notification may display "Jean Molyair sent you an instruction: 'Photo Sharing with Social Integration.'" Of course, any notification may be displayed. For example, in another embodiment, the user of the mobile device may have already granted permission to "Jean Molyair" to add and install instructions on the user's mobile device. In such an embodiment, the notification may notify the user of an instruction that was added by "Jean Molyair."

In various embodiments, the notification interface may also include one or more options, including accept instruction, view instruction, reject instruction, settings, and/or accept all instructions. In one embodiment, the accept instruction may include installing and saving the instruction to a device instruction database. In some embodiments, the device instruction database may be synced with an online instruction database.

In another embodiment, the reject instruction may include denying installation of the instruction, filtering (e.g. blocking, etc.) further instruction notifications from a specific source (e.g. Jean Molyair, etc.), and/or rejecting in some manner the sent instruction. In some embodiments, settings may include management of sources (e.g. black list, white list, acceptable sources, etc.), the granting of one or more permissions (e.g. user X has permission to send and install one or more instructions, user permissions, device permissions, app permissions, etc.), the manner of notifications (e.g. notification display, notification sound, notification action, etc.), requests for recommended instructions (e.g. by the device, by the app, invitation sent to one or more contacts, etc.), communication between one or more device (e.g. do not accept an instruction from an unknown device, unknown device must be determined as trustworthy before acceptance of an instruction, etc.), communication between an online instruction database and a device instruction database, and/or any other setting associated in some manner with the instruction notification page.

In one embodiment, the user may select an option to accept all instruction. In one embodiment, the option may relate to a specific instruction source (e.g. Jean Molyair, etc.). In other embodiments, the option may relate to a device source (e.g. device ID xxxxx, etc.), an IP address, a website, a genre (e.g. instruction may relate to "productivity," etc.), and/or any other feature and/or identification which may relate in some manner to the instruction.

As shown, the view instruction option may be selected 1710. In response an instruction interface 1712 may be displayed. In various embodiments, the instruction interface may include triggers, actions, settings, metadata, and/or any other information associated with the instruction. As an example, in one embodiment, the sent instruction may be entitled "Photo Sharing with Social Integration;" the triggers may include open gallery application, select one or more photos, select to share, or open camera application, take one or more photos, and/or any other trigger which may relate to the photo sharing with social integration; the actions may include apply vintage filter, compress the one or more photos (e.g. 72 dpi), share with a preselected group, upload to one or more social networking sites (e.g. Facebook, Flickr, etc.), post update to Twitter (e.g. "see my [number] new photos from [location]," etc.), upload to blog associated with user, and/or taking any other action in response to the one or more triggers; the metadata may include the title of the instruction, the author, relevancy, priority, creation date, the ability to import settings as metadata, and/or any other relevant information; the settings may include any further information relating in some manner to the instruction.

In one embodiment, the instruction interface may include one or more options, including ability to check for errors, to modify the instruction, to execute the instruction, and to save the instruction. Of course, in other embodiments, any type of option may be associated with the instruction.

In one embodiment, the ability to check for errors may include verifying device capability (e.g. sufficient resources, applicable apps have been downloaded, etc.), one or more permissions (e.g. user must have permission to access database X in order to run the instruction, etc.), one or more triggers and/or actions (e.g. verify that the correct order of triggers and/or actions is included, etc.), and/or any other feature which may in some manner check for errors in the instruction. In other embodiments, the ability to modify the instruction may include modifying in some manner the one or more triggers, actions, metadata, and/or settings.

As an example, in one embodiment, a user accessing an online instruction database may select an instruction and choose to send the instruction to another device, or a device not associated with the user. A page (or pop-up display, etc.) may be displayed requesting further information from the user including the name of the new device, the cell phone number of the device (e.g. if the device was a mobile phone, etc.), the name of the user associated with the device, an identification associated with the device (e.g. device id, etc.), a time of delivery (e.g. immediate, 6 pm on Dec. 2, 2012, etc.), and/or any other information which may relating to sending the instruction to another device. After sending the instruction, a confirmation page (or pop-up display, etc.) may be displayed indicating that the instruction was successfully sent. In the event that there was an error in sending the instruction, an error page may be displayed indicating the applicable error (e.g. insufficient permission, no such device exists, etc.).

In one embodiment, devices may be registered (e.g. provide detailed information associated with the device, etc.) with an online instruction database or with a device instruction database. In one embodiment, in order for an instruction to be downloaded, sent, and/or created on a device, the device may be registered with an instruction database (e.g. online, on device, etc.). In other embodiments, a device may not need to be registered with an instruction database in order to download and/or receive an instruction. In such an embodiment, at the receipt (e.g. from downloading and/or receiving, etc.) of an instruction, a link may also be provided to register the device with an online or device instruction database. In a further embodiment, registering a device may permit additional features (e.g. premium features, etc.) to be accessed and/or used by the user.

Figure 18:
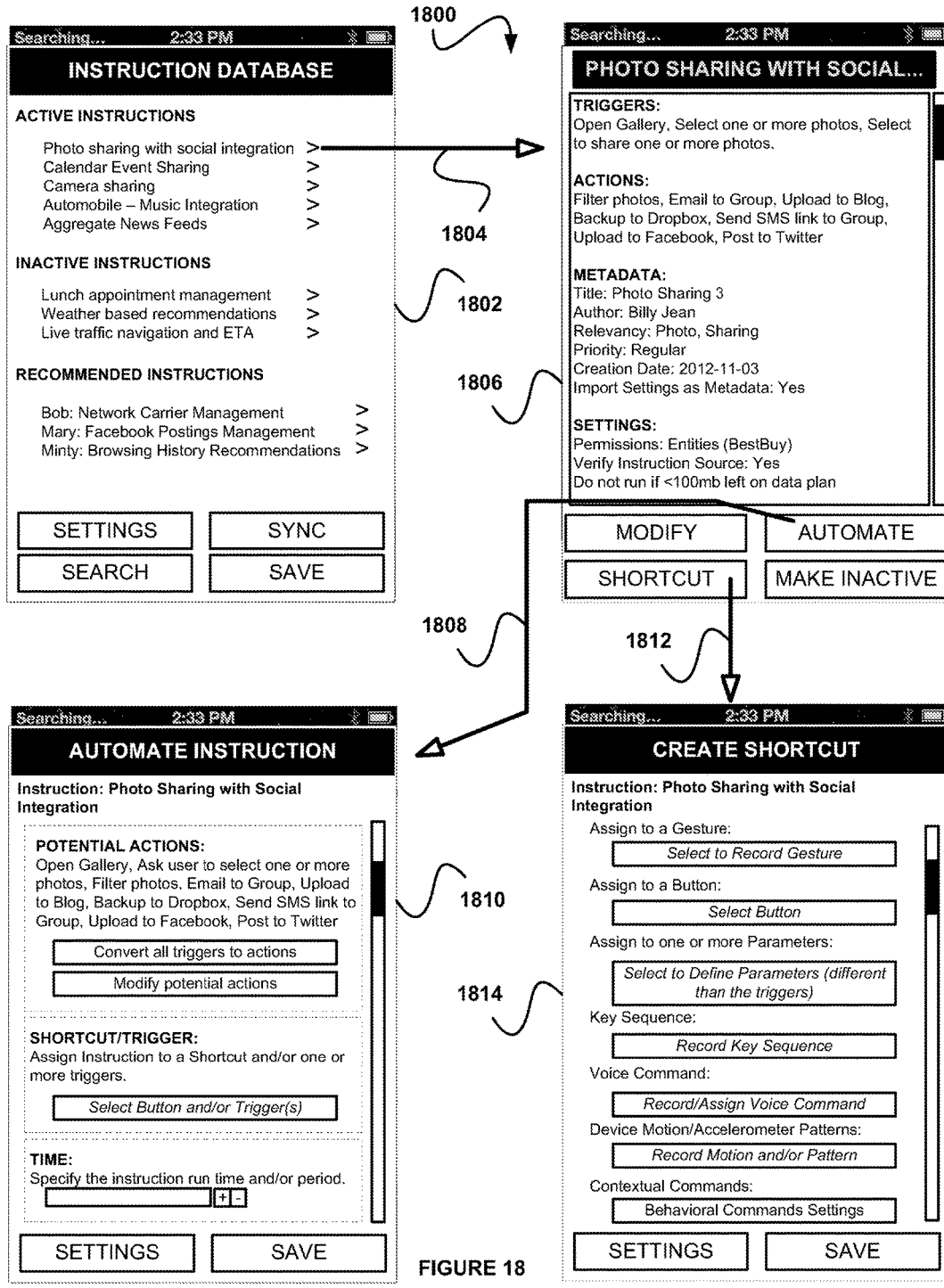
FIG. 18 shows a mobile interface for managing one or more instructions, in accordance with another embodiment.

FIG. 18 shows a mobile interface 1800 for managing one or more instructions, in accordance with another embodiment. As an option, the mobile interface 1800 may be implemented in the context of the architecture and environment of the previous Figures and/or any subsequent Figure(s). Of course, however, the mobile interface 1800 may be implemented in the context of any desired environment. It should also be noted that the aforementioned definitions may apply during the present description.

As shown, an instruction database interface 1802 may be displayed. In one embodiment, the instruction database interface may include a list of active instructions, inactive instructions, recommended instructions, and/or options associated with the instruction database. In another embodiment, the active instructions may include any instruction which is actively being used. In various embodiments, the separation of active and inactive instructions may occur automatically by the device. For example, in one embodiment, a created instruction may indicate that the instruction would be valid (i.e. would be active, etc.) for one week. After a week of use, the instruction may then be designated as "inactive." In other embodiments, if an error is found in the instruction (e.g. with a trigger, with an action, etc.), an instruction may also be placed in an "inactive instructions" category. Of course, in another embodiment, the categorization of active and inactive instructions may occur manually by the user.

In one embodiment, the recommended instructions may include one or more instructions which have been received but not yet installed and made active. For example, in one embodiment, a recommended instruction may be received from a contact (e.g. trusted contact, friend, device, etc.). In another embodiment, a recommended instruction may be included based on a recommendation from the user's device. For example, in one embodiment, the user may have given a set of input actions repeatedly (e.g. twice in a month, etc.) but not sufficiently frequent (e.g. at least twice in a week, etc.) to trigger a display associated with an instruction creation threshold. In such an embodiment, the mobile device may recommend one of more instructions based on the device usage history (e.g. actions taken by the user, actions taken by one or more apps, etc.). Of course, in another embodiment, the device may recommend one or more instructions based on any input and/or history associated with the device.

In one embodiment, the sync option may include syncing one or more instructions between the user's device and another database, including for example, a database in the cloud (e.g. cloud database, etc.), on a server (e.g. on local network, on external network, etc.), on another device (e.g. secondary device, device associated with a trusted contact, etc.), and/or any other device which may also store one or more instructions. In another embodiment, the search option may include the ability to search among previously used instructions (e.g. inactive instructions, etc.), active instructions, recommended instructions, as well as search potential instructions on an instruction database. In a further embodiment, the save option may include the ability to save the instruction database to more than one location (e.g. on the device, on a separate storage card associated with the device, etc.).

As an example, in one embodiment, active instructions may include "photo sharing with social integration," "calendar event sharing," "camera sharing," "automobile—music integration," and/or "aggregate news feeds;" inactive instructions may include "lunch appointment management," "weather based recommendations," "live traffic navigation and ETA;" recommended instructions may include "Bob: Network Carrier Management," "Mary: Facebook Postings Management," "Minty: Browsing History Recommendations."

In one embodiment, an active instruction "Photo Sharing with social integration" may be selected 1804 and an instruction page 1806 may be displayed. In various embodiments, an instruction page may include the one or more triggers and actions, metadata, and settings previously selected and/or accepted. In various embodiments, one or more options may be displayed including modify (e.g. change some aspect of the triggers, actions, metadata, and/or settings, etc.), automate, shortcut, and/or make inactive (e.g. remove the instruction from an active instruction designation, etc.). In other embodiments, the one or more options may be displayed as drop down menus. In another embodiment, an option to delete the instruction may be displayed.

As shown, an automate option may be selected 1808 and an automate instruction interface 1810 may be displayed. In various embodiments, an automate instruction interface may include displaying potential actions. In one embodiment, it may be desired to convert all triggers to actions. For example, in one embodiment, the number of triggers may be reduced by saving the instruction to a shortcut (e.g. button, gesture, etc.). Of course, in another embodiment, an option to modify the potential actions may be displayed, which may permit the user to add and/or remove potential action items (e.g. taken from the prior triggers, taken from the prior actions, taken from action and/or trigger database, etc.), and/or taken any other action to modify in some manner the instruction. In one embodiment, the potential actions may be modified after converting all triggers to actions.

In another embodiment, the automate instruction interface may include an option to assign the instruction to a shortcut and/or one or more triggers (e.g. other than those initially associated with the instruction, etc.). In various embodiments, the shortcut may be associated with a gesture, a button, a parameter, a sequence, a voice command, a device input, and/or any other feature which may be capable of causing the execution of an instruction. Of course, in other embodiments, any trigger (e.g. any input action, etc.) may be used as a shortcut and/or trigger.

In one embodiment, the automate instruction interface may include the ability to add in time instruction, including specifying the run time (e.g. run at 6 am, etc.), run period (e.g. daily, weekly, February 23, etc.), run duration (e.g. only run for maximum of 10 minutes, etc.), run cycle (e.g. only run 10 times, etc.), and/or any other option relating to time and the instruction. In another embodiment, the automate instruction interface may also include one or more thresholds (e.g. shortcut will not execute the instruction unless the user is at location X, the shortcut and/or trigger are pressed for a minimum of 3 seconds, etc.).

As shown, a shortcut option may be selected 1812 and a create shortcut interface 1814 may be displayed. In various embodiments, the create shortcut interface may include the ability to assign the instruction to a gesture (e.g. ability to record a custom gesture, selection of a predefined gesture, an input gesture on the device display, etc.), to a button (e.g. device physical button, software button, icon, etc.), to one or more parameters (e.g. input actions, device sensors, etc.), to a key sequence (e.g. keyboard command sequence, keyboard shortcut, etc.), to a voice command (e.g. record command, select from preconfigured commands, etc.), to a device motion/accelerometer pattern (e.g. move device in an "8" motion, move device up, move device to the side, etc.), to one or more contextual commands (e.g. identification of environment, identification of users, user is standing up or sitting down, user has entered a specific room, etc.), and/or any other feature (e.g. software based, physical, etc.) which may include assignment of a shortcut. Of course, any item associated with the device may potentially be assigned a shortcut. In another embodiment, options associated with the create shortcut interface may include settings (e.g. displayed options, etc.), save (e.g. to the device, to an online database, etc.), and/or any other item associated with creating a shortcut.

Figure 19:
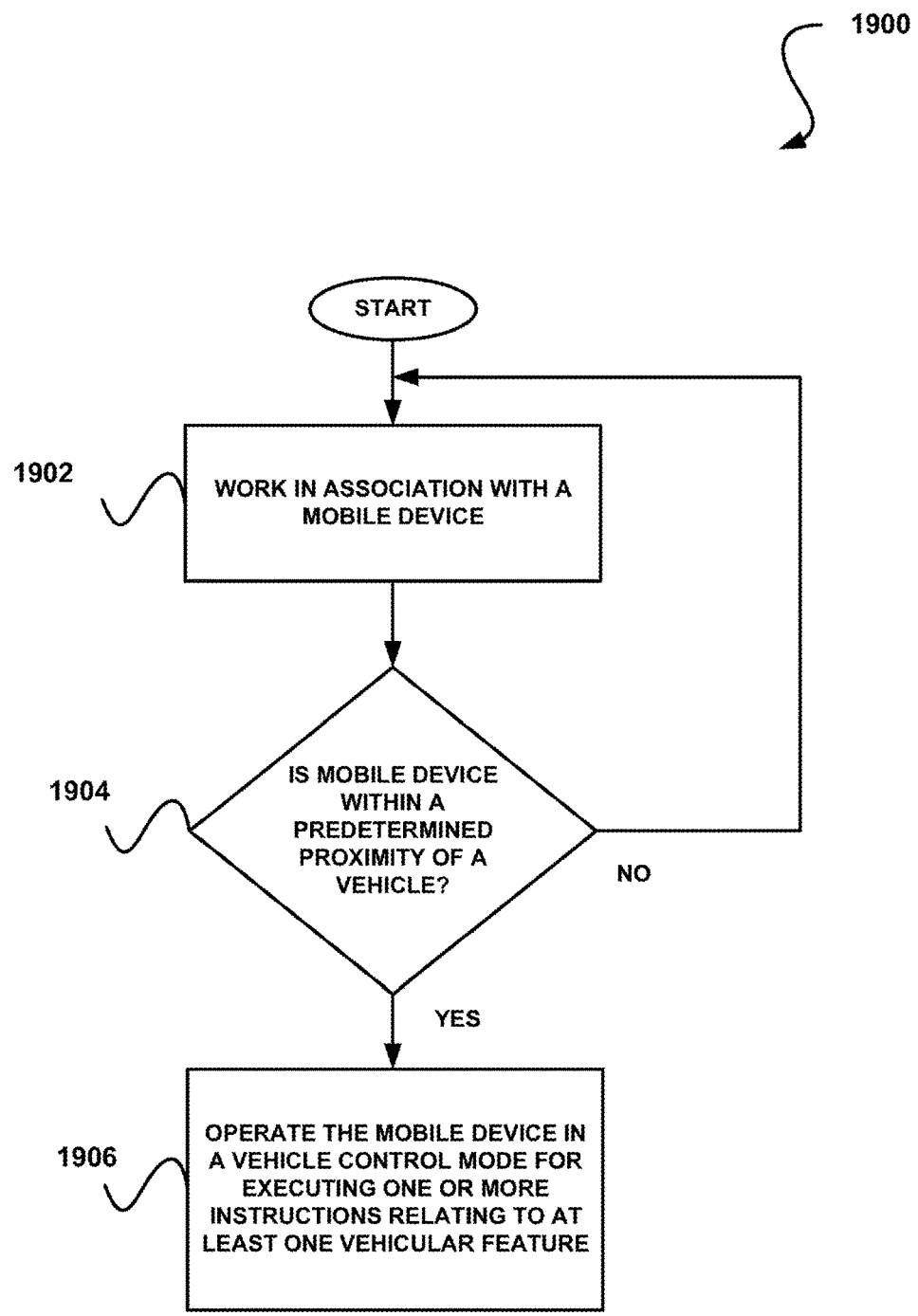
FIG. 19 shows a method for executing one or more instructions with a mobile device in a vehicle control mode, in accordance with another embodiment.

FIG. 19 shows a method 1900 for executing one or more instructions with a mobile device in a vehicle control mode, in accordance with another embodiment. As an option, the method 1900 may be implemented in the context of the architecture and environment of the previous Figures and/or any subsequent Figure(s). Of course, however, the method 1900 may be implemented in the context of any desired environment. It should also be noted that the aforementioned definitions may apply during the present description.

As shown, a computer readable medium works in association with a mobile device. See operation 1902. In one embodiment, the mobile device may include a device with cellular phone capabilities. In another embodiment, the mobile device may include a short-range wireless communication protocol headset, including Wireless USB, Bluetooth, Wi-Fi, or any other wireless protocol which may function at a short-range.

Additionally, a computer readable medium determines whether the mobile device is within a predetermined proximity of a vehicle. See operation 1904. In one embodiment, the mobile device may detect the presence of a particular device (e.g. the vehicular system, etc.) by receiving a transmitted signal (e.g. RFID, NFC, WiFi, ZigBee, Bluetooth, etc.). In another embodiment, the vehicular system may detect the presence of the mobile device.

In some embodiments, the proximity may be set to a specific threshold. For example, the signal strength may be set at a predetermined quality (e.g. HIGH, etc.) before connection is established. In other embodiments, the transmitted signal may only be accessible within a set threshold range (e.g. 3 feet, etc.) around the vehicle.

In one embodiment, the determination of whether the mobile device is within a predetermined proximity of a vehicle may be automatic (e.g. an automatic connection established between the car system and the mobile device, etc.). In other embodiments, the determination may occur manually (e.g. mobile device must be placed in a mount, a mobile device must receive a wired connection, an "accept connection" screen must be accepted, etc.).

In some embodiments, the determination may include an authentication step. For example, in one embodiment, the mobile device may exchange security tokens with the vehicle system as part of determining whether the mobile device is within a predetermined proximity of a vehicle. Of course, any cryptography and/or security features may be implemented in determining whether the mobile device is within a predetermined proximity of a vehicle.

In various embodiment, the determination as to whether the mobile device is within the predetermined proximity of the vehicle may be accomplished by determining whether the mobile device is in communication with the vehicle via a short range wireless communication protocol, by determining whether the mobile device has been manually put in a vehicular control mode, by determining whether the mobile device has been physically coupled to the vehicle, and/or by any other method whereby the mobile device is determined to be within a predetermined proximity of the vehicle.

As shown, if the mobile device is within a predetermined proximity of a vehicle, the mobile device is operated in a vehicle control mode for executing one or more instructions relating to at least one vehicular feature. See operation 1906. In one embodiment, vehicle control mode may include a collection of properties in association with at least one vehicle feature. For example, in various embodiments, the properties may include, but are not limited to, user preferences, input options, output options, power conservation policies, processing capacity, access permissions, and/or any other type of setting that may be attributable to a tablet computer or a phone device.

In one embodiment, the vehicle control mode may include static settings. In other embodiments, the vehicle control mode may include dynamic features (e.g. settings based on devices in a predetermined proximity, etc.). In a further embodiment, the vehicle control mode may include more than one sub-mode (e.g. season mode, time of day mode, etc.). For example, switching between modes may be done automatically (e.g. environmental, spatial, temporal, and/or situational triggers, etc.) or manually (e.g. triggered by user input, etc.). In this way, the properties can be tailored to specific use environments and situations, maximizing the functionality and interaction of the tablet computer or phone device and the vehicle. Further, in another embodiment, a vehicular feature may include any feature associated with a vehicle. For example, in various embodiments, the vehicular feature may include an audio feature, a video feature, a navigation feature, an augmented reality feature, a social networking feature, a vehicle control feature (e.g. heated seats, air conditioning, etc.), and/or any other feature which may be associated with a vehicle.

In one embodiment, the vehicle control mode may be activated automatically. For example, in one embodiment, when the mobile device is within a predetermined proximity of the vehicle, an application on the device may be activated to control at least some aspect of the vehicular system (e.g. music selection, volume, directions, lighting, heated seats, emergency services etc.).

In other embodiments, the vehicle control mode may be activated manually. For example, in one embodiment, the mobile device may be placed on a mount within the vehicle, and thereby, activate an application on the device to control at least some aspect of the vehicular system (e.g. music selection, volume, directions, lighting, heated seats, emergency services etc.).

Of course, the mobile device may be connected in any manner (e.g. wired or wirelessly, etc.) to the vehicle assembly. Additionally, any number of devices may be connected to the vehicular system and control at least one vehicular feature.

In another embodiment, operating the mobile device in a vehicle control mode for controlling at least one vehicular feature may be based upon user input (e.g. hardware switch, GUI input, etc.). In another embodiment, the determination may be based on peripherals geographically near the device. For example, in one embodiment, a car display arrangement (e.g. vehicle system, etc.) may include a wireless microphone, a wireless database (e.g. to store contacts, directions, pushed notifications, etc.), and/or any other type of peripheral which may be used within a vehicle. Upon being brought near any of these peripherals, the mobile device may recognize the peripherals, and based off of the recognition, automatically operate the table computer or phone device in a vehicle control mode.

In some embodiments, operating the mobile device in a vehicle control mode may serve as a trigger for one or more instructions. For example, in one embodiment, an instruction may relate to a vehicle audio system, which may include a vehicle mode trigger, the user sitting down (e.g. based off of accelerometer sensor, etc.), and interaction with a Bluetooth audio system. Based off of these triggers, an instruction may run including activating Pandora, selecting a specific channel, and setting the volume level. Of course, any instruction may be configured to run in vehicle control mode.

In a separate embodiment, an instruction may relate to receiving a communication (e.g. email, chat, etc.) while in the vehicle. One or more triggers may include a vehicle mode trigger, and receiving an email or a text or a chat. Using the audio system on the vehicle assembly, the device may request whether the user wishes the device to read (e.g. text-to-speech capabilities, etc.) to the user. Upon input from the user (e.g. voice command "yes," etc.), the device may proceed to read the communication. After reading, the device may request whether the user wishes to respond in some manner (e.g. call back, send a communication back, etc.) to the received communication. Of course, in other embodiments, any instruction may be configured to relate in some manner to the vehicle mode.

Figure 20:
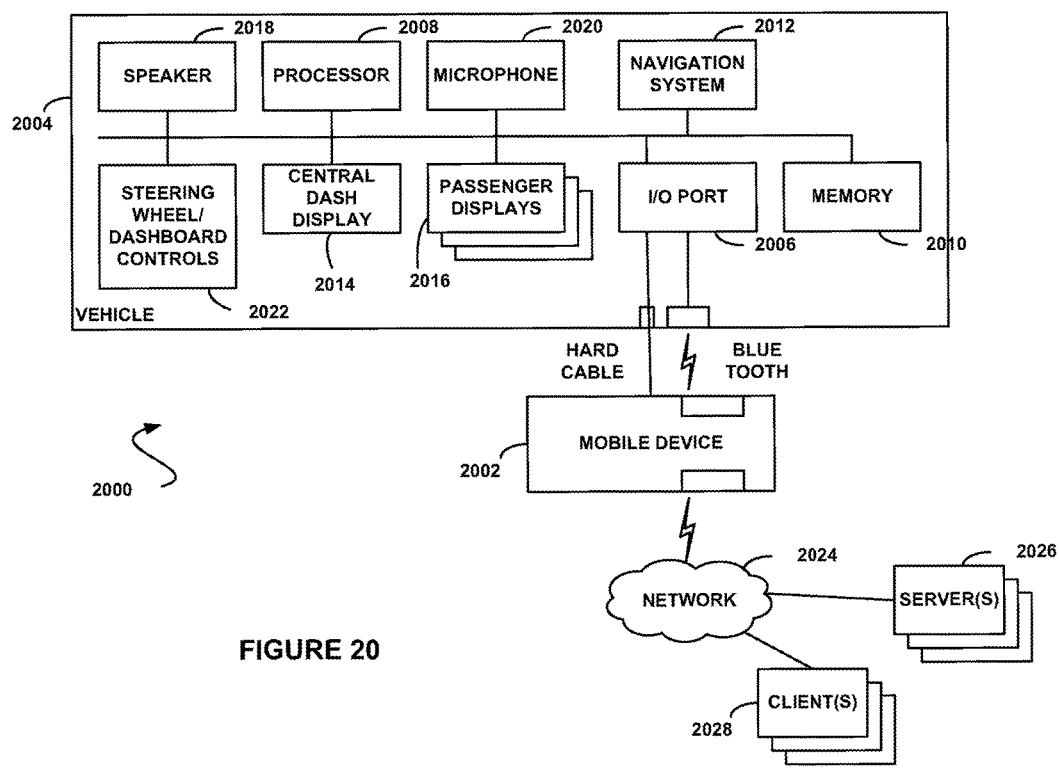
FIG. 20 shows a communication system, in accordance with another embodiment.

FIG. 20 shows a communication system 2000, in accordance with one possible embodiment. As an option, the system 2000 may be implemented in the context of the architecture and environment of the previous Figures or any subsequent Figure(s). Of course, however, the system 2000 may be carried out in any desired environment. It should also be noted that the aforementioned definitions may apply during the present description.

As shown, a mobile device 2002 is capable of interfacing with a vehicle 2004 including various components of the vehicle 2004. The phone device or tablet computer 2002 may include any mobile device capable of interfacing with a vehicle 2004 including a lap-top computer, hand-held computer, mobile phone, personal digital assistant (PDA), a music player (e.g. a digital music player, etc.), a GPS device, etc.

In various embodiments, the mobile device 2002 may communicate with a vehicular assembly system (e.g. a communication and entertainment system, etc.) corresponding to the vehicle 2004 via a wireless connection (e.g. Bluetooth, etc.), or via a cable connection (e.g. a USB cable, a serial cable, etc.). As an option, the mobile device 2002 may interface with the communication and entertainment system vehicle utilizing an I/O port 20106 of the vehicle 2004. In various embodiments, the I/O port 2006 may include a serial port, a USB port, FireWire/i.LINK ports, etc. In one embodiment, the I/O port 2006 may include a wireless communication port.

Using this interface, the mobile device 2002 may interface with various components and functionality of the vehicle, such as an onboard computer system including a processor 2008, memory 2010 (e.g. DRAM, flash memory, etc.), an onboard navigation system 2012, displays (e.g. a central display 2014, and one or more passenger displays 2016, etc.), audio communication devices (e.g. speakers 2018, a microphone 2020, etc.), and various other components and functionality of the vehicle included in the vehicular assembly system. The interface may also allow a user of the vehicle 2004 to access and/or control the phone device or tablet computer 2002 utilizing controls associated with the vehicle 2004, such as steering wheel, and dashboard radio controls 2022. Additionally, the user may access and/or control the mobile device utilizing the microphone 2020 through voice commands.

Using these components and controls, a user may access and utilize one or more wireless networks 2024 associated with the mobile device 2002. Coupled to the networks 2024 may be servers 2026 which are capable of communicating over the networks 2024. Also coupled to the networks 2024 and the servers 2026 is a plurality of clients 2028.

Such servers 2026 and/or clients 2028 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 2024, at least one gateway is optionally coupled therebetween.

It should be noted that the computer system of the vehicle 2004 may include various software and applications for facilitating communication between the vehicle 2004 and the mobile device 2002. For example, in various embodiments, the vehicle computer system may include an operating system (e.g. Windows Mobile, Linux, etc.), embedded speech recognition software, telephone call steering systems, automated telephone directory services, character recognition software, and imaging software.

In one embodiment, the user's mobile device may be used to control in some manner an aspect of the vehicle (e.g. in response to an ad/content, etc.). In a further embodiment, the mobile device may identify additional peripherals and/or devices associated with the vehicle, and based off of the identification, use such peripherals and/or devices to interact more fully with the user. For example, in one embodiment, an instruction may be executed by the mobile device which controls in some manner a feature and/or device (e.g. display, audio setting, etc.) associated with the vehicle. In another embodiment, an instruction may be executed by a different device (e.g. associated with a friend, associated with a contact, associated by a nearby device, etc.) which controls in some manner an aspect of the vehicle. In such an embodiment, the ability to control the vehicle may be dependent on the allocation of sufficient permissions. In this manner, instruction from more than one device may be used to interact with other users and the car assembly.

In one embodiment, a vehicle may be a trigger for an instruction. For example, in one embodiment, the vehicle mode may trigger ads and/or content relating to possible destinations and/or relevant content en route, pursuant to a predefined instruction. In another embodiment, a relevant instruction (e.g. based off of usage history, preferences, etc.) may be presented to the user. In one embodiment, the mobile device may determine that the user is in a vehicle, that it is near lunch time, and that the user's next appointment is in one hour. Based off of these triggers, the mobile device may execute an instruction including giving a recommend (e.g. through the vehicle's audio, etc.) a lunch destination to the user. If the user agrees (e.g. voice command of "yes," etc.), the mobile device may update the navigation system with the new lunch destination.

In another embodiment, a user may be in a new city. Traveling through the city, the mobile device may receive one or more triggers including recognizing that the user has not been to the city before and is currently in a vehicle. Based off of such triggers, an instruction may be run requesting to the user whether a tour audio stream is desired. If the user gives an affirmative voice command, the mobile device may play tour audio streams to the vehicle (e.g. "On your left is the oldest Bank Building in the area. Built in 1864, it survived the fire of 1880 and the earthquake of 1910," etc.). Of course, anything may be presented to the user based on the instruction.

Figure 21:
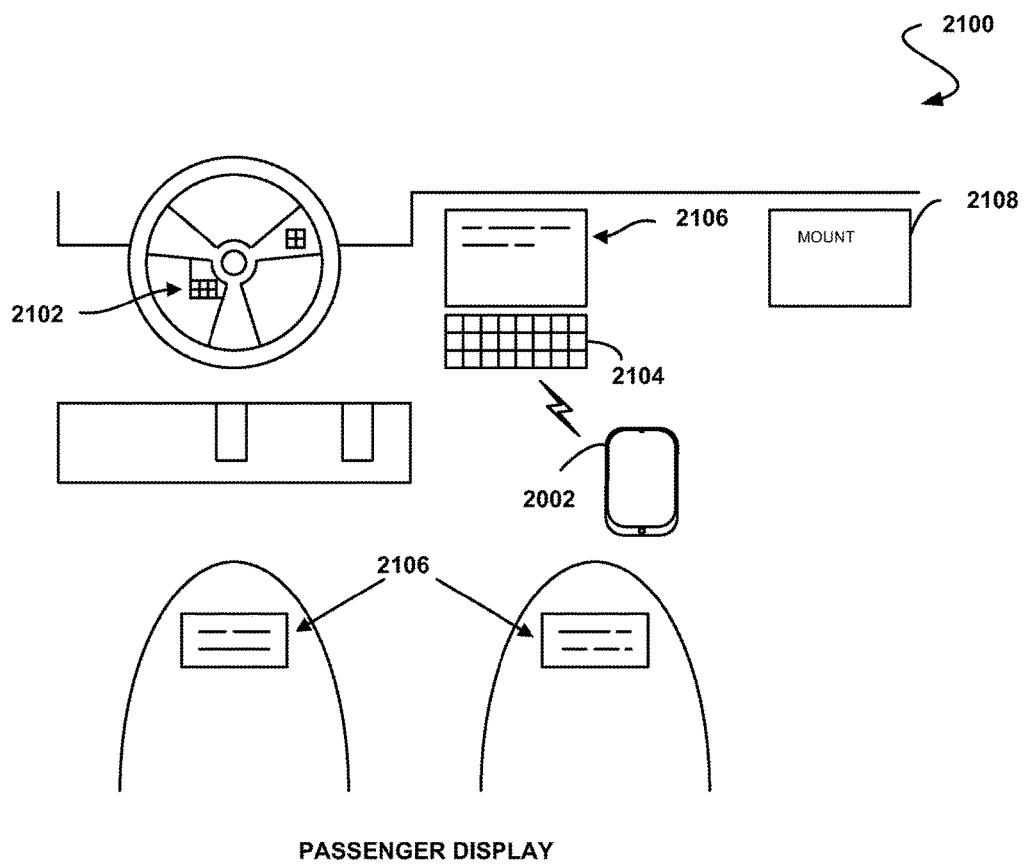
FIG. 21 shows a configuration for an automobile capable of interfacing with the mobile device of FIG. 20, in accordance with another embodiment.

FIG. 21 shows a configuration 2100 for an automobile capable of interfacing with the mobile device of FIG. 20, in accordance with one possible embodiment. As an option, the configuration 2100 may be implemented in the context of the architecture and environment of the previous Figures or any subsequent Figure(s). Of course, however, the configuration 2100 may be carried out in any desired environment. It should also be noted that the aforementioned definitions may apply during the present description.

As shown, the mobile device 2002 may be coupled to the automobile utilizing a wired connection (e.g. a USB connection, etc.), or a wireless connection (e.g. Bluetooth, etc.). In one embodiment, the mobile device 2002 may be placed on a mount 2108. The mount may provide a wired or wireless connection to the automobile system.

Using this connection, a user (e.g. a driver or passenger, etc.) may operate the mobile device 2002, via the automobile, using voice commands, steering wheel controls 2102, radio controls 2104, and/or dashboard controls. Furthermore, the mobile device may communicate with vehicle displays (e.g. main displays, passenger displays 2106, etc.) such that content associated with the mobile device (e.g. stored content, streaming content, etc.) may be displayed. For example, the mobile device may communicate stored video to at least one of the passenger displays 2106. Additionally, the mobile device may communicate streaming (e.g. new ad/content, etc.) or stored audio (e.g. saved past ad/content, etc.) such that the audio may be transmitted utilizing an audio system of the automobile.

By interfacing the mobile device 2002 with the automobile, voice-activated, hands-free calling may also be implanted. For example, a "Push to Talk" button on the steering wheel may allow the user to access contacts stored in a contact list of the mobile device 2002 by voice command. Furthermore, the user may be able to switch use from the mobile device 2002 to the vehicle control system transparently. For example, a user may push a "Telephone" button on the steering wheel to automatically transfer a current telephone call to the automobile communication system of the automobile without having to hang up and call again.

As an option, the text messages received by the mobile device 2002 may be converted to audio utilizing a vehicle on-board processor and associated voice-to-text software. The communication system of automobile may then output the converted text in an audio stream via speakers. In one embodiment, the communication system associated with the automobile may include a main display 2106 for displaying activities associated with the mobile device 2002, along with other functionality (e.g. navigational functionality, etc.).

For example, the communication system may display any feature that is capable of being displayed using the mobile device 2002. In various embodiments, such features may include an ad and/or content notification, caller ID, call waiting, conference calling, a caller log, a list of contacts, a signal strength icon, and a phone battery charge icon, a music list, a content list, etc. Additionally, voice-activated music may also be implemented. For example, the on-board communication and entertainment system may allow a user to browse through music collections by genre, album, artist, and song title using simple voice commands.

In one embodiment, the passenger displays 2106 may all display the same material (e.g. video, music, ad, content, etc.). In another embodiment, the passenger displays may be independently operated (e.g. each displaying a different video stream, personalized ads and/or content, etc.) and/or operated independently by the mobile device 2002. In a further embodiment, the passenger displays 2106 may include permanent displays. For example, the passenger displays may be installed into the automobile architecture (e.g. installed into the dashboard, the backs of seats, etc.). In another embodiment, the passenger displays 2106 may include transportable displays. For example, the passenger displays may include a tablet computer or mobile device and each may be placed in an installed mount on the automobile (e.g. on the dashboard, in the backs of seats, in a roof mount, etc.).

In various embodiments, the mobile device 2002 may be set up to operate in a master-slave relationship with the passenger displays on the automobile. In one embodiment, the mobile device may automatically configure the passenger displays based on predetermined settings (e.g. the screen most in the front of the automobile displays navigation details, screens in the back of the automobile display videos and/or relevant ads and/or content, etc.). Of course, the screens may be configured in any manner based on input from the phone device or tablet computer.

In a further embodiment, if multiple mobile devices or tablet computers are present in an automobile, the mobile devices or tablet computers may apply preconfigured settings wherein only one mobile device may control the automobile system features, and the other mobile devices or tablet computers may remain as slave devices to the one master mobile device. For example, in one embodiment, a parent passenger may wish to control automobile features (e.g. navigation, music, etc.) as well as control what is displayed (e.g. ad and/or content, etc.) on each of the child passenger's display (e.g. on the passenger displays, on another phone device or tablet computer, etc.). The parent passenger's mobile device may be used to control at least some vehicular feature, as well as control other devices and/or displays within a preconfigured proximity range.

In a separate embodiment, if multiple mobile devices or tablet computers are present in an automobile, one or more instructions may be executed. For example, in one embodiment, an instruction on a device associated with a parent may relate to child restrictions. A trigger may include a vehicle control mode and the identification of one or more known devices (e.g. associated with another passenger, associated with a child, etc.). Based on the triggers, an instruction may be run from the device associated with the parent whereby one or more settings (e.g. music control restrictions, volume restriction, dvd content restrictions, etc.) are implemented on each of the other devices in the vehicle. Of course, any instruction relating to any number of devices may be configured and executed.

Figure 22:
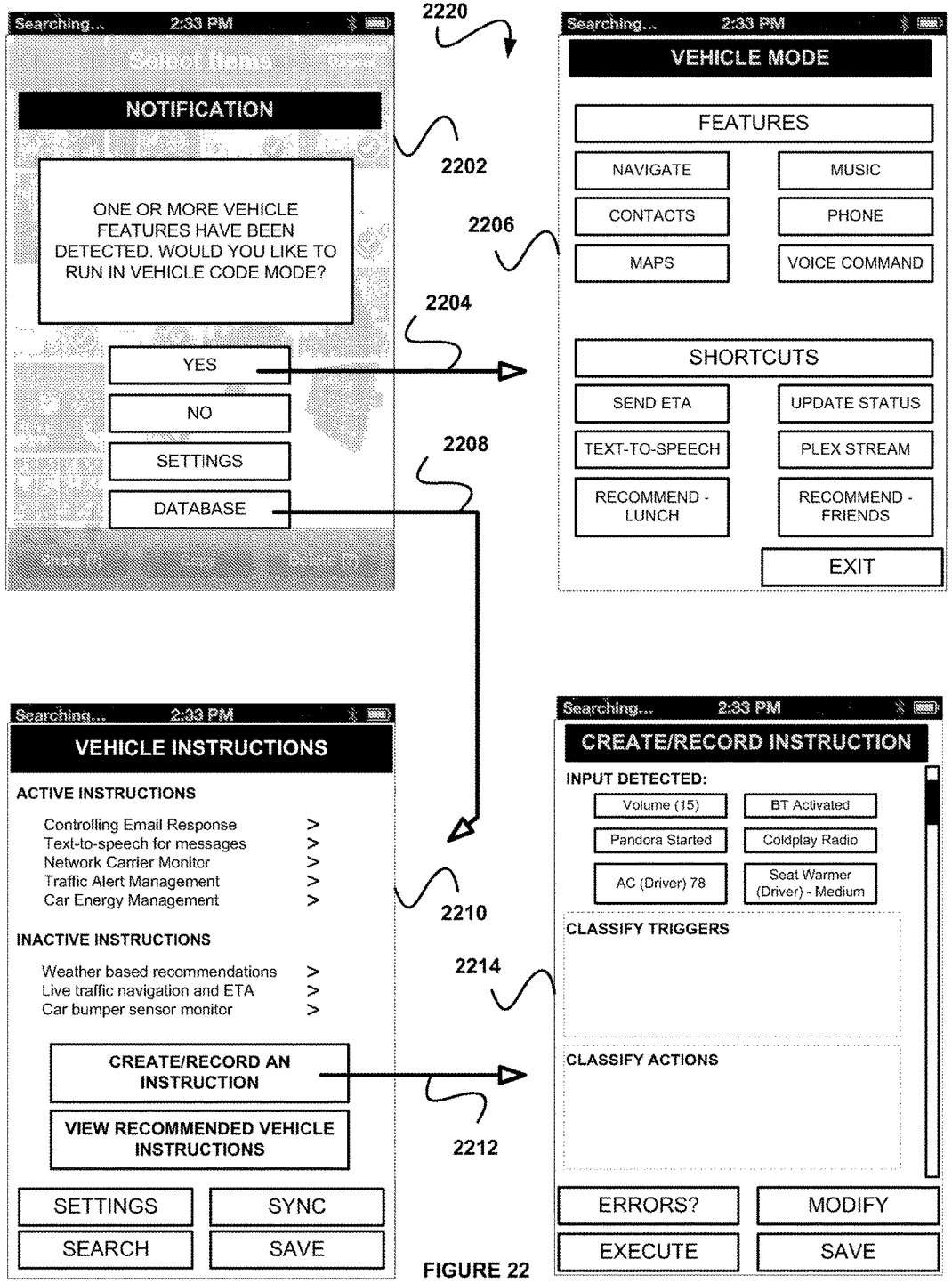
FIG. 22 shows a mobile device interface for interacting with one or more instructions, in accordance with another embodiment.

FIG. 22 shows a mobile device interface 2220 for interacting with one or more instructions, in accordance with one possible embodiment. As an option, the mobile device interface 2200 may be implemented in the context of the architecture and environment of the previous Figures or any subsequent Figure(s). Of course, however, the mobile device interface 2200 may be carried out in any desired environment. It should also be noted that the aforementioned definitions may apply during the present description.

As shown, a notification interface 2202 may be displayed. In one embodiment, the notification interface may relate to a vehicle control mode. For example, the notification may include a text box displaying "One or more vehicle features have been detected. Would you like to run in vehicle control mode?" Of course, in other embodiments, the text box may include any text. In one embodiment, the user may respond by giving a voice command (e.g. "yes," "no," etc.), providing a motion (e.g. motioning up with the device to indicate 'yes,' etc.), selecting an icon and/or button on the device display (e.g. "yes" button, "no" button, etc.), and/or providing any other action to indicate a response. In one embodiment, one or more options may be displayed, including a "yes" button, a "no" button, settings, and/or a database button.

In one embodiment, a "yes" button may be selected 2204, and a vehicle mode interface 2206 may be displayed. In various embodiments, the vehicle mode may include one or more features including the ability to navigate, access music, access contacts, use a phone, access maps, and provide a voice command. Of course, in other embodiments, any feature may be displayed. In one embodiment, most frequently used features may be displayed. In other embodiments, the features may be manually selected by the user, may be inputted based on a recommendation from another contact, and/or managed in some other manner.

In other embodiments, one or more instruction shortcuts may be displayed, including send ETA (e.g. to contacts, to predefined group, etc.), update status (e.g. via Facebook, via Twitter, etc.), provide text-to-speech (e.g. for incoming communication, etc.), plex stream (e.g. provide audio stream from plex server, etc.), recommend lunch (e.g. provide recommendation for lunch based off of preferences and the presence of other contacts near the user, etc.), recommendations from friends (e.g. provide and/or filter recommendations from friends relating to nearby sites and/or locations, etc.), and/or any other instruction which may be saved as a shortcut.

As shown, in one embodiment, a database option may be selected 2208, and a vehicle instruction database interface 2210 may be displayed. In one embodiment, the vehicle instruction database interface may display active instructions, inactive instructions, the ability to create/record an instruction, the ability to view recommended vehicle instructions, and one or more options.

In one embodiment, the active instructions may include any instruction which is currently configured to actively be executed (e.g. in response to one or more triggers, etc.). As an example, in various embodiments, active instructions may include controlling email response, text-to-speech for messages, network carrier monitor, traffic alert management, and/or car energy management. Additionally, in another embodiment, the inactive instructions may include any instruction which is no longer configured to actively be executed (e.g. instruction which has expired, instruction which is no longer valid, instruction which has one or more errors, etc.). As an example, in various embodiments, inactive instructions may include weather based recommendations, live traffic navigation and ETA, and/or car bumper sensor monitor. Of course, any instruction may be designated as active or inactive.

In various embodiments, the user may select any of the active or inactive instructions to view the instruction and/or to modify in some manner the instruction. In another embodiment, an instruction may be created and/or recorded. For example, in one embodiment, a user may select to record an instruction including setting the volume on the car assembly system, setting a driver side air temperature (e.g. air conditioning, heater, etc.), starting Pandora, and selecting a specific radio station to run. After recording the actions, the user may select one or more triggers to trigger the actions, including running the phone in vehicle control mode, and exceeding a time threshold of the mobile device being in the vehicle for longer than 30 seconds. Of course, any input action may be set as a trigger for the instruction.

In other embodiments, the one or more options may include settings, ability to sync, ability to search, and ability to save. In various embodiments, settings may include one or more adjustments (e.g. notifications, audible alerts, display configuration, interaction with vehicle assembly configuration, etc.), vehicle control global settings (e.g. how the mobile device interacts with the vehicle assembly, etc.), and/or any other setting which may relate to the instruction.

In one embodiment, the sync option may include syncing one or more instructions between the user's device and another database, including for example, a database in the cloud (e.g. cloud database, etc.), on a server (e.g. on local network, on external network, etc.), on another device (e.g. secondary device, device associated with a trusted contact, etc.), and/or any other device which may also store one or more instructions. In another embodiment, the search option may include the ability to search among previously used instructions (e.g. inactive instructions, etc.), active instructions, recommended instructions, as well as search potential instructions on an instruction database. In a further embodiment, the save option may include the ability to save the instruction database to more than one location (e.g. on the device, on a separate storage card associated with the device, etc.). Of course, in another embodiment, any option associated with the instruction may be displayed.

As shown, the ability to caret/record an instruction may be selected 2212 and a create/record instruction interface 2214 may be displayed. In various embodiments, the create/record instruction interface may include one or more input actions. For example, in one embodiment, it may have been detected (e.g. via record an instruction, etc.) that user altered the car system volume, activated Bluetooth, started Bluetooth, selected Coldplay radio station, set the AC (driver side) to 78 degrees, set the seat warmer (driver side) to medium. In one embodiment, the user may classify such input actions as a trigger or as an action. In a further embodiment, the user may record additional input actions to be included as a trigger and/or action.

In other embodiments, the user may select one or more possible inputs without recording an action input. For example, in one embodiment, the user may select a trigger or action from a list of possible triggers and/or actions. In another embodiment, the possible triggers and/or actions to be selected may be organized by popularity, category (e.g.

business, social media, etc.), application (e.g. vehicle, device integration, etc.), and/or by any other organization feature.

In one embodiment, the ability to check for errors may include verifying device capability (e.g. sufficient resources, applicable apps have been downloaded, vehicle assembly capability, etc.), one or more permissions (e.g. user must have permission to access database X in order to run the instruction, etc.), one or more triggers and/or actions (e.g. verify that the correct order of triggers and/or actions is included, etc.), and/or any other feature which may in some manner check for errors in the instruction. In other embodiments, the ability to modify the instruction may include modifying in some manner the one or more triggers, actions, metadata, and/or settings. In a further embodiment, the user may select to execute the instruction immediately (e.g. run the instruction, etc.), or may select to save the instruction (e.g. active instruction, etc.).

Figure 23:
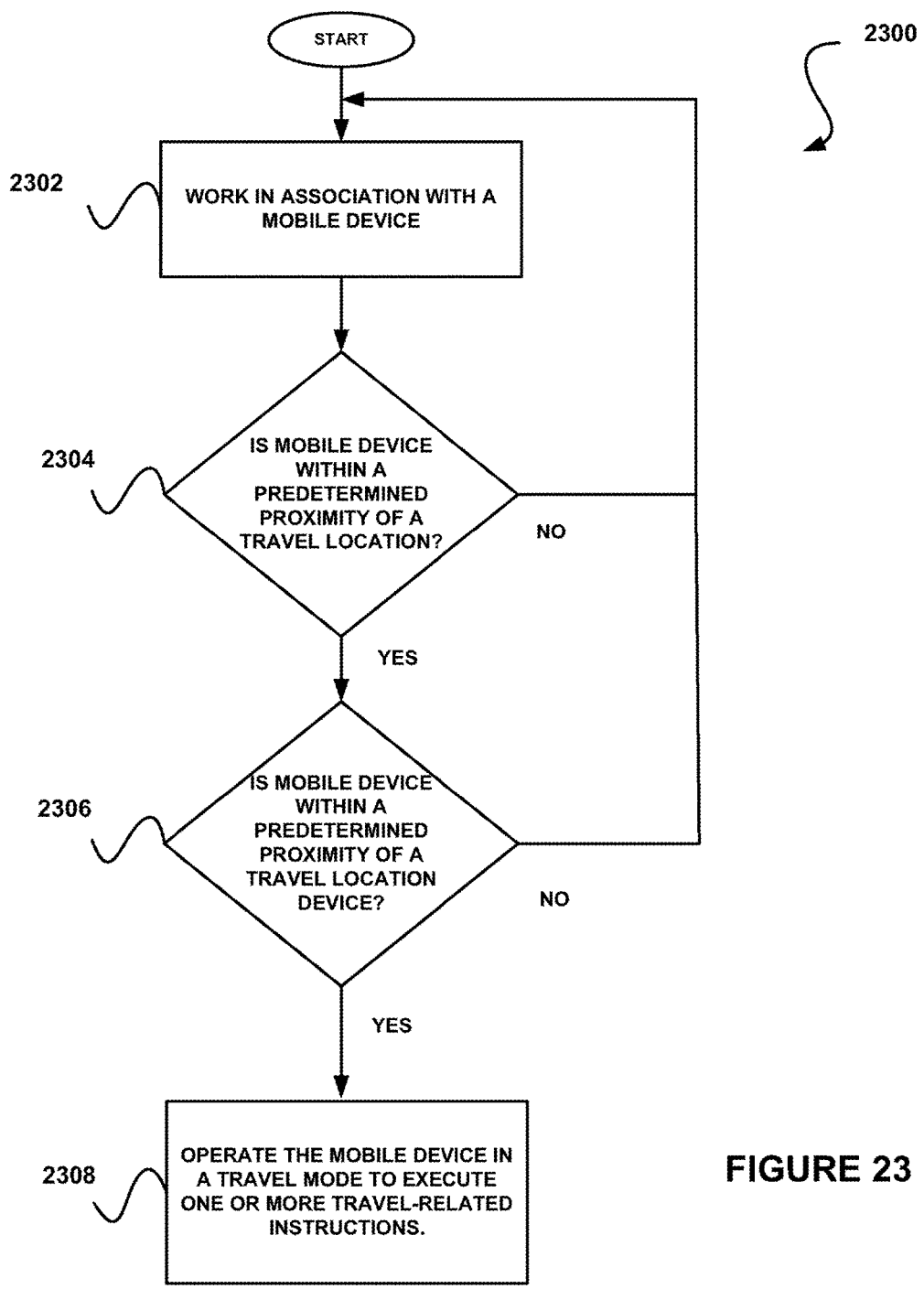
FIG. 23 shows a method for executing one or more instructions with a mobile device in a travel mode, in accordance with another embodiment.

FIG. 23 shows a method 2300 for executing one or more instructions with a mobile device in a travel mode, in accordance with another embodiment. As an option, the method 2300 may be implemented in the context of the architecture and environment of the previous Figures and/or any subsequent Figure(s). Of course, however, the method 2300 may be implemented in the context of any desired environment. It should also be noted that the aforementioned definitions may apply during the present description.

As shown, a computer readable medium works in association with a mobile device. See operation 2302. In one embodiment, the mobile device may include a device with cellular phone capabilities. In another embodiment, the mobile device may include a short-range wireless communication protocol headset, including Wireless USB, Bluetooth, Wi-Fi, or any other wireless protocol which may function at a short-range. In other embodiments, the computer readable medium may include any device capable of communicating via a wireless communication protocol.

Additionally, a computer readable medium determines whether the mobile device is within a predetermined proximity of a travel location. See operation 2304. In one embodiment, the mobile device may be aware of a calendar event involving a travel location and may sense (e.g. via GPS, etc.) when the mobile device is near the travel location. In another embodiment, the mobile device may include context awareness sensors (e.g. location sensors, environment sensors, network sensors, device communication sensors, etc.) to determine that the mobile device is near a travel location.

As an example, in one embodiment, the mobile device may receive a GPS signal indicating the user is near an airport (e.g. or a popular tourist destination site, or a car rental agency, or a hotel, or any travel location, etc.), may sense one or more wireless networks (e.g. via WiFi, etc.) whose identification includes an airport relevant string (e.g. Oakland Airport Wifi, etc.), may identify one or more devices (e.g. baggage scanners, airline check-in, etc.) which may be associated with an airport, and/or detect and/or receive an input indicating an airport context.

In some embodiments, the proximity of a travel location may be set to a specific threshold. For example, the signal strength may be set at a predetermined quality (e.g. HIGH, etc.) before connection is established. In other embodiments, the transmitted signal may only be accessible within a set threshold range (e.g. 3 feet, etc.) around the travel location.

As shown, if it determined that a mobile device is within a predetermined proximity of a travel location, a computer readable medium determines whether the mobile device is within a predetermined proximity of a travel location device. See operation 2306. In one embodiment, the mobile device may detect the presence of a particular device (e.g. located at the travel location, etc.) by receiving a transmitted signal (e.g. RFID, NFC, WiFi, ZigBee, Bluetooth, etc.). In another embodiment, the travel location device may detect the presence of the mobile device. In other embodiments, the computer readable medium may include any device capable of communicating via a wireless communication protocol.

In one embodiment, the determination of whether the mobile device is within a predetermined proximity of a travel location device may be automatic (e.g. an automatic connection established between a device at the travel location and the mobile device, etc.). In other embodiments, the determination may occur manually (e.g. mobile device must be connected to a temporary airport system, a mobile device must receive a wired connection, an "accept connection" screen must be accepted, etc.).

In various embodiment, the determination as to whether the mobile device is within the predetermined proximity of the travel location device may be accomplished by determining whether the mobile device is in communication with the travel location device via a short range wireless communication protocol, by determining whether the mobile device has been manually put in a travel mode, by determining whether the mobile device has been physically coupled to a device at the travel location, and/or by any other method whereby the mobile device is determined to be within a predetermined proximity of the travel location.

Of course, the mobile device may be connected in any manner (e.g. wired or wirelessly, etc.) to the travel location device. Additionally, any number of devices may be connected to the travel location device.

In some embodiments, the determination may include an authentication step. For example, in one embodiment, the mobile device may exchange security tokens with the travel location device as part of determining whether the mobile device is within a predetermined proximity of a travel location. Of course, any cryptography and/or security features may be implemented in determining whether the mobile device is within a predetermined proximity of a travel location.

As shown, if the mobile device is within a predetermined proximity of a travel location device, the mobile device is operated in a travel mode for executing one or more travel-related instructions. See operation 2308. In one embodiment, travel mode may include a collection of properties in association with at least one travel feature. For example, in various embodiments, the properties may include, but are not limited to, user preferences, input options, output options, power conservation policies, processing capacity, access permissions, and/or any other type of setting that may be attributable to a tablet computer or a phone device.

In one embodiment, the travel mode may include static settings. In other embodiments, the travel mode may include dynamic features (e.g. settings based on devices in a predetermined proximity, etc.). In a further embodiment, the travel mode may include more than one sub-mode (e.g. season mode, time of day mode, etc.). For example, switching between modes may be done automatically (e.g. environmental, spatial, temporal, and/or situational triggers, etc.) or manually (e.g. triggered by user input, etc.). In this way, the properties can be tailored to specific use environments and situations, maximizing the functionality and interaction of the tablet computer or phone device and the travel location. Further, in another embodiment, a travel location feature may include any feature associated with a travel location. For example, in various embodiments, the travel location feature may include an audio feature, a video feature, a navigation feature, an augmented reality feature, a social networking feature, a checking-in feature, a points of interest feature, a baggage recovery and/or tracking feature, a travel status update feature, and/or any other feature which may be associated with a travel location.

In one embodiment, the travel mode may be activated automatically. For example, in one embodiment, when the mobile device is within a predetermined proximity of the travel location, an application on the device may be activated to control at least some aspect of the mobile device system (e.g. audio, volume, directions, lighting, emergency services, ticket display, parking spot id, etc.).

In other embodiments, the travel mode may be activated manually. For example, in one embodiment, the mobile device may be placed on a mount at a check-in kiosk, and thereby, activate an application on the device to execute a travel-related instruction (e.g. check-in the passenger, verify the passenger identity, pass through security related requirements, etc.).

In another embodiment, operating the mobile device in a travel mode for may be based upon user input (e.g. hardware switch, GUI input, etc.). In another embodiment, the determination may be based on peripherals geographically near the device. For example, in one embodiment, a travel location display arrangement (e.g. at a kiosk, at a terminal, etc.) may include a wireless database (e.g. flight status information, directions, emergency contact information, etc.), one or more devices to assist travelers (e.g. devices to give recommendations, devices to pass a coupon and/or discount, etc.), and/or any other type of peripheral which may be used at the travel-related location. In one embodiment, upon being brought near any of these peripherals, the mobile device may recognize the peripherals, and based off of the recognition, automatically operate the table computer or phone device in a travel mode.

In some embodiments, operating the mobile device in a travel mode may serve as a trigger for one or more instructions. For example, in one embodiment, an instruction may relate to a travel location check-in system, which may include a travel mode trigger, and the mobile device approaching a check-in kiosk. Based off of these triggers, an instruction may run including activating a travel app, displaying ticket purchase information (e.g. confirmation code, etc.), and/or rejecting all unimportant phone calls while the user is at the kiosk. Of course, any instruction may be configured to run in travel mode.

In a separate embodiment, an instruction may relate to passing through a security screening check point at an airport. The instruction may include one or more triggers including operating in travel mode, sensing one or more travel location devices (e.g. wireless database system, etc.), and coming within a set proximity (e.g. 10 feet, etc.) of a security screening device. In response, the instruction may run one or more actions including displaying identification information (e.g. photo, individual id, current address, etc.), validating a security device (e.g. security token, etc.), prompting the user to accept the security token, and after receiving acceptance, validating identification information from the mobile device. In one embodiment, the mobile device may be used to receive and/or transfer a finger associated with the user of the mobile device. In one embodiment, the request for information (e.g. at a security screening, etc.) may be received from a travel location device. In another embodiment, the mobile device may initiate and/or send information regardless of a request from a travel location device.

Figure 24:
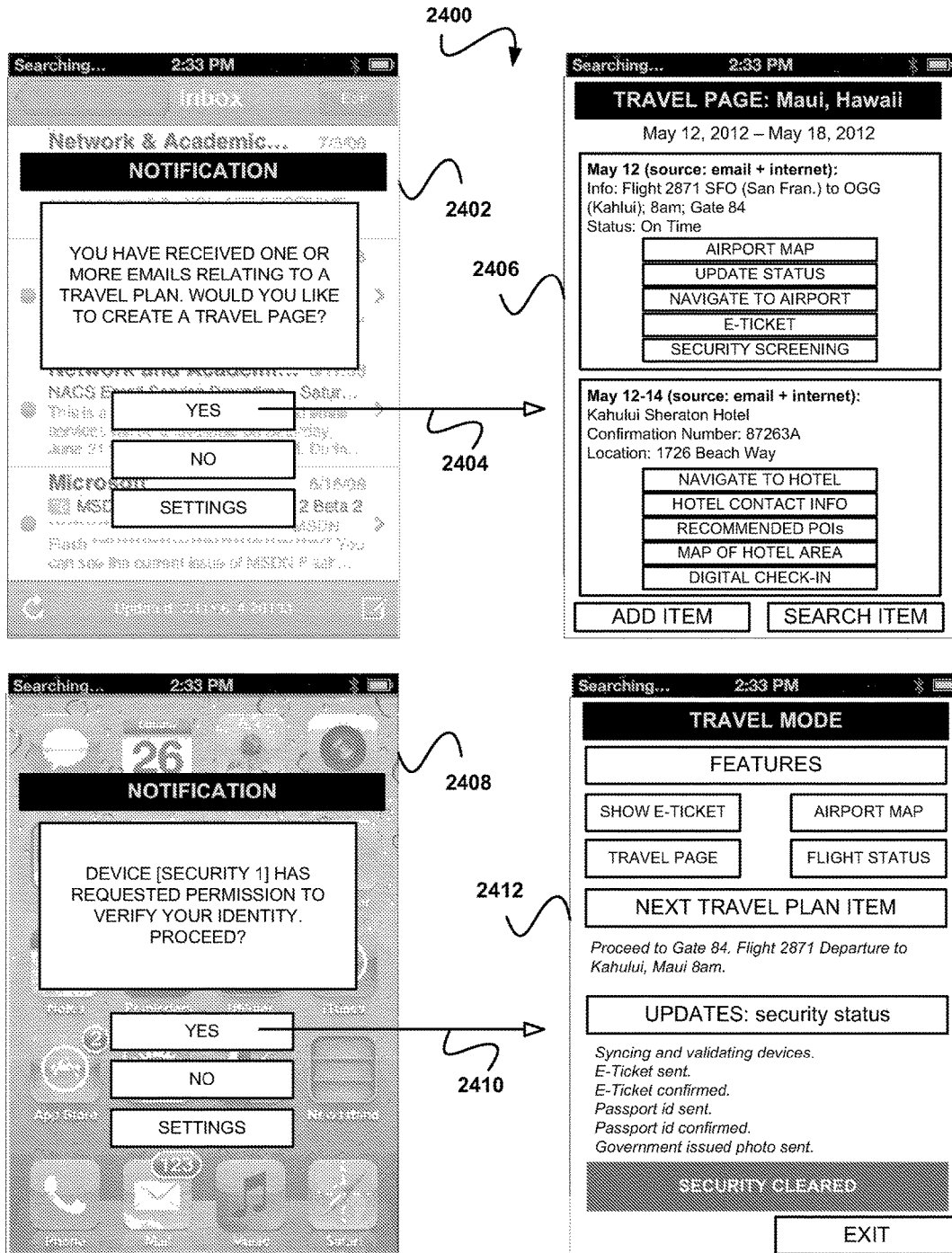
FIG. 24 shows a mobile device interface for interacting with one or more instructions, in accordance with another embodiment.

FIG. 24 shows a mobile device interface 2400 for interacting with one or more instructions, in accordance with one possible embodiment. As an option, the mobile device interface 2400 may be implemented in the context of the architecture and environment of the previous Figures or any subsequent Figure(s). Of course, however, the mobile device interface 2400 may be carried out in any desired environment. It should also be noted that the aforementioned definitions may apply during the present description.

As shown, a notification interface 2402 may be displayed. In one embodiment, the notification interface may relate to a context-aware program. For example, in one embodiment, the notification may display "You have received an email relating to a travel plan. Would you like to create a travel page?" Of course, any notification may be displayed. In various embodiments, an app associated with managing one or more instructions may be used to be context aware (e.g. of input communications such as email or text, of new apps on the device, of device capabilities, etc.). In other embodiments, a device OS platform system, an online (e.g. website, etc.) system, may be used to gather context aware information relating to the user, the mobile device, any app, and/or any other item associated with the user of the mobile device.

In various embodiments, one or more options may be presented to the user, including the ability to indicate "yes," the ability to indicate "no," and/or settings. In one embodiment, settings may relate to the instruction app, the device OS platform system (e.g. which may manage the instructions, etc.), and/or any other system and/or app which may relate to the instruction. In various embodiments, the settings may include global settings (e.g. notifications for all alerts, manner of display, audible alerts, etc.), travel mode (or any mode) specific settings, an instruction specific settings, and/or any other setting associated with the notification and/or instruction.

As shown, in one embodiment, a "yes" option may be selected 2404, and a travel page interface 2406 may be displayed. In one embodiment, the travel page may aggregate information from one or more sources which may relate to the same travel plans. In various embodiments, information may have been received via a text message, a chat message, a telephone voice recording (e.g. voice mail, etc.), browsing history (e.g. user entered in information on a travel related site, etc.), and/or any other source.

For example, in one embodiment, the user may have received an email relating to a flight reservation, and another email relating to a hotel reservation. Based on the receipt of the email, a notification may be displayed requesting if the user would like to create a travel page. If it is desired to create a travel page, a travel page associated with the reservations (e.g. flight reservation, hotel reservation, etc.) may be created. In various embodiments, the travel page may aggregate information (e.g. taken from one or more emails, taken from online sources, etc.), provide one or more information-specific options (e.g. maps, status, ticket information, navigation assistance, etc.), and/or provide any other relevant option and/or ability. In one embodiment, the aggregation may occur based off of one or more similar criteria (e.g. dates, content, destination, activity, etc.).

In one embodiment, the flight reservation and hotel reservation may relate to a similar date and location. For example, in various embodiments, the travel page may display a pane associated with the flight reservation and another pane associated with the hotel reservation. Of course, in other embodiments, the information may be displayed in any manner.

In one embodiment, the pane associated with the flight reservation may include information-specific options, including an airport map, ability to update status (e.g. arrival time of flight, departure gate, etc.), ability to navigate to airport (e.g. in a car, etc.), e-ticket (e.g. confirmation code, digital ticket, etc.), and/or security screening (e.g. information to assist in passing through security, etc.). In another embodiment, the pane associated with the hotel reservation may include information-specific options, including ability to navigate to hotel, hotel contact information, recommended POIs (points of interest, etc.), map of hotel area, and/or ability to digital check-in. Of course, any relevant option associated with the reservation (and/or activity, etc.) may be presented to the user.

In another embodiment, the user of the mobile device may control the manner that the information-specific options are displayed. For example, in one embodiment, the instruction app (or OS platform system, etc.) may automatically determine the most relevant options to be displayed associated with the travel information. In other embodiments, the user may manually select the options (e.g. from a list, etc.) to be displayed associated with the travel information.

In other embodiments, additional information may be collected and displayed on the travel page. For example, in one embodiment, information may be gathered from a reservation email, and additional information relating to the reservation may be gathered from another source (e.g. website, app, etc.). As an example, in one embodiment, an email may be received associated with a flight reservation. Such an email may contain the flight number, the confirmation reservation number, the departure city, the arrival city, and/or other information. Additional information related to the flight reservation may be gathered from the internet, including the departure gate and the status associated with the flight (e.g. on time, delayed, etc.). Further, additional information may relate to the one or more information-specific options. For example, an airport map, ability to navigate to the airport, ability to update status (e.g. on time, delayed, etc.), and/or security screening (e.g. provide information to facilitate security, security-specific app options, identity verification process, etc.) may be gathered, at least in part, from information on the internet and/or from another source (e.g. airport database, secondary device, etc.).

In another embodiment, additional information may be gathered based off of information in an email relating to a hotel reservation. In various embodiments, the hotel reservation email may indicate the dates, location, confirmation number, and/or other reservation relevant information. Additional information may be provided in the form of additional text and/or information-specific options, including ability to navigate to the hotel, recommended points of interest (e.g. from Yelp reviews, etc.), map of the hotel area, and/or ability to digitally check-in. Of course, in other embodiments, any additional information may be displayed and may be gathered from any source (e.g. internet, app, secondary device, etc.).

In a further embodiment, the travel page may include one or more options, including the ability to add an item, search for an item, and/or take any other option associated with the travel page. In one embodiment, an item may include a reservation, an activity (e.g. theater, concert, etc.), a restaurant, a meeting, and/or any other item which may relate in some manner to the travel page. In another embodiment, the ability to search for one or more items may permit the user to find one or more pertinent items (e.g. if the travel page had many items, searching for a particular item may be useful, etc.). In one embodiment, the displayed panes may change according to what would be most pertinent. For example, in one embodiment, the panes may change depending on the time associated with each pane. For example, after a pane's pertinence has expired (e.g. departing flight has been boarded and taken off, etc.), then the next relevant pane (e.g. the next activity and/or event, etc.) may be displayed.

As shown, a notification interface 2408 may be displayed. In one embodiment, the notification interface may relate to another device. For example, in one embodiment, the notification may display "Device [security 1] has requested permission to verify your identity. Proceed?" Of course, any notification may be displayed. In one embodiment, the notification may display information at the request of another device. In another embodiment, the notification may display information at the request of the user's mobile device (e.g. instruction app, any app, OS platform system, etc.).

As an example, in one embodiment, the user may be near a security screening checkpoint. In response to coming within a threshold proximity of a security device (e.g. associated with a security personnel, etc.), a prompt may be displayed on the user's mobile device requesting if it was desired to permit the security personnel's device to verify the user's identity. In various embodiments, one or more security protocols may be implemented to ensure the integrity of the identity validation. In some embodiments, a wired connection, a NFC protocol, and/or any other system may be used to preserve the integrity of the identity validation.

In various embodiments, one or more options may be presented to the user, including the ability to indicate "yes," the ability to indicate "no," and/or settings. In one embodiment, settings may relate to the instruction app, the device OS platform system (e.g. which may manage the instructions, etc.), and/or any other system and/or app which may relate to the instruction. In various embodiments, the settings may include global settings (e.g. notifications for all alerts, manner of display, audible alerts, etc.), travel mode (or any mode) specific settings, an instruction specific settings, and/or any other setting associated with the notification and/or instruction.

As shown, a "yes" option may be selected 2410, and a travel mode interface 2412 may be displayed. In one embodiment, a travel mode interface may include security relevant features (e.g. e-ticket check-in, identity validation, etc.). In other embodiments, a separate security interface may be provided.

In various embodiments, a travel mode interface may include one or more features, a next travel plan item, and/or relevant updates. In one embodiment, one or more features may include show e-ticket, display airport map, display travel page, display flight status, and/or any other feature which may be relevant to the travel mode. Of course, in various embodiments, any feature option may be displayed. In one embodiment, the features options may be automatically displayed according to a relevancy (e.g. based off of most frequently used features, popularity from other users, etc.). In other embodiments, the features options may be manually selected by the user (e.g. by a list of all possible features, etc.).

In another embodiment, the next travel plan item may be displayed, which may include the next scheduled activity, reservation, and/or any item which may be relevant to the travel mode. In one embodiment, the next travel plan item may be taken from a travel page associated with a travel. Of course, in other embodiments, the next travel item may be taken from any source (e.g. online itinerary database, secondary device, etc.).

In one embodiment, relevant updates may relate to a notification, a next travel plan item, an input from another device, and/or any other information which may include an update. As an example, in one embodiment, the update may relate to a notification associated with a request for a security device to verify the user's identity. In response, the update may indicate the status of verifying the user's identity, including syncing and validating the devices, sending an e-ticket, confirming the e-ticket, sending a passport id, confirming the passport id, sending a government issued photo, and/or displaying any other update associated with the security identity validation. In one embodiment, an update result may be displayed below the updates, including, for example, "security cleared," and/or any other update result which may relate in some manner to the one or more updates. In one embodiment, an option to exit the travel mode may be displayed, whereupon if the option is selected, the travel mode may end. Of course, even after the travel mode has been exited, one or more triggers may later activate the travel mode.

Figure 25:
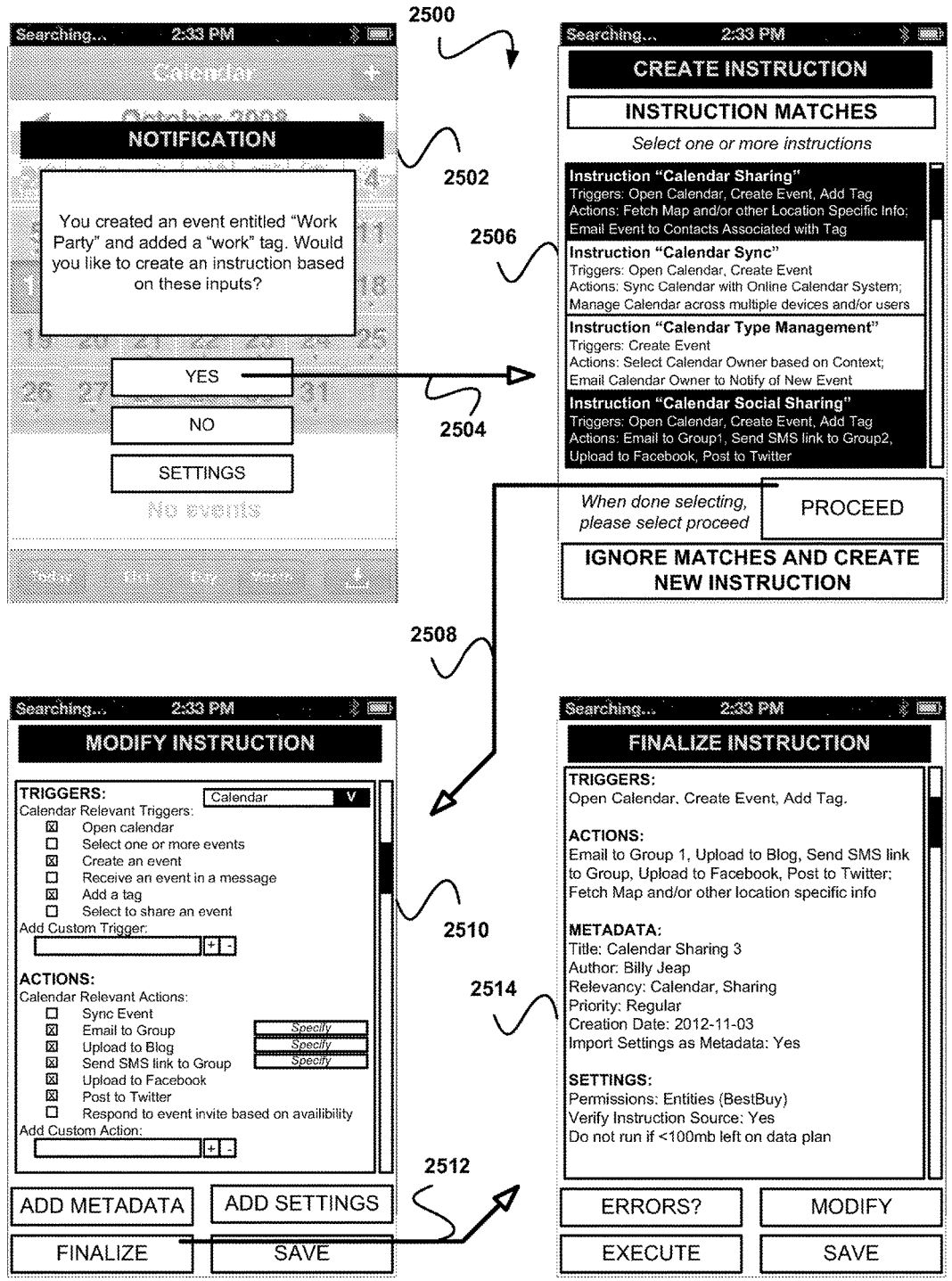
FIG. 25 shows a mobile device interface for interacting with one or more instructions, in accordance with another embodiment.

FIG. 25 shows a mobile device interface 2500 for interacting with one or more instructions, in accordance with one possible embodiment. As an option, the mobile device interface 2500 may be implemented in the context of the architecture and environment of the previous Figures or any subsequent Figure(s). Of course, however, the mobile device interface 2500 may be carried out in any desired environment. It should also be noted that the aforementioned definitions may apply during the present description.

As shown, a notification interface 2502 may be displayed. In one embodiment, the notification interface may relate to an event (e.g. the mobile device and/or an app may be context-aware, etc.). For example, in one embodiment, the notification may display "You created an event entitled 'Work Party' and added a "work" tag. Would you like to create an instruction based on these inputs?" Of course, any notification may be displayed. In various embodiments, an app associated with managing one or more instructions may be used to be context aware (e.g. of app events and/or updates, of input communications such as email or text, of new apps on the device, etc.). In other embodiments, a device OS platform system, an online (e.g. website, etc.) system, may be used to gather context aware information relating to the user, the mobile device, any app, and/or any other item associated with the user of the mobile device.

In various embodiments, one or more options may be presented to the user, including the ability to indicate "yes," the ability to indicate "no," and/or settings. In one embodiment, settings may relate to the instruction app, the device OS platform system (e.g. which may manage the instructions, etc.), and/or any other system and/or app which may relate to the instruction. In various embodiments, the settings may include global settings (e.g. notifications for all alerts, manner of display, audible alerts, etc.), travel mode (or any mode) specific settings, an instruction specific settings, and/or any other setting associated with the notification and/or instruction.

In some embodiments, the instruction app (or OS platform system, another app, etc.) may monitor the input actions to create a possible instruction. For example, creating a calendar event, sending a photo, updating a social networking page, posting a blog post, checking for restaurants with good reviews, receiving an email, traveling to a same location, and/or giving and/or receiving any input action may be used to display a prompt for creating a new instruction. In some embodiments, a threshold requirement (e.g. two times, etc.) on the input actions may be required before a notification prompt is displayed.

As shown, a "yes" option may be selected 2504, and a create instruction interface 2506 may be displayed. In various embodiments, a create instruction interface may display one or more instruction matches. For example, in one embodiment, the instruction matches may relate in some manner to the identified input actions (e.g. to one or more actions given by the user, etc.). In one embodiment, the user may set a threshold relevancy value (e.g. minimum of two same actions, etc.) that must be met in order for a match to be displayed. Based on creating an event and adding a work tag, a possible match may include "Instruction 'Calendar Sharing'; Triggers: Open Calendar, Create Event, Add Tag; Actions: Fetch Map and/or other Location Specific Info; Email Event to Contacts Associated with Tag," "Instruction 'Calendar Sync'; Triggers: Open Calendar, Create Event; Actions: Sync Calendar with Online Calendar System; Manage Calendar across multiple devices and/or users," "Instruction 'Calendar Type Management'; Triggers: Create Event; Actions: Select Calendar Owner based on Context; Email Calendar Owner to Notify of New Event," "Instruction 'Calendar Social Sharing'; Triggers: Open Calendar, Create Event, Add Tag; Actions: Email to Group1, Send SMS link to Group2, Upload to Facebook, Post to Twitter," and/or any other relevant match.

In one embodiment, if a threshold of actions matches an instruction, the instruction may be automatically selected. In another embodiment, if more than one instruction results after the threshold is exceeded, all such results may be presented to the user for selection. Additionally, in one embodiment, more than one instruction match may be selected. For example, the user may be interested in possible actions and/or triggers from more than one instruction match (e.g. sharing features of a match, productivity features of another match, etc.). As such, selecting more than one instruction match may enable the user to add, remove, and/or modify the combined instruction in any manner.

In another embodiment, the user may disregard the instruction matches and select to create a new instruction. Additionally, in one embodiment, a create instruction interface may display by default a new instruction interface rather than one or more instruction matches. Of course, the default view of the create instruction interface may be set and/or configured by the user (e.g. via options, via app settings, via Native Utility Platform, etc.).

After selecting the one or more instruction matches, the "proceed" prompt may be selected 2508, and a modify instruction interface 2510 may be displayed. In various embodiments, the modify instruction interface page may include possible triggers and actions, the ability to add, remove, and/or customize the triggers and/or actions, the ability to specify details (e.g. specify contacts in a group, specify blog details, specify application, etc.) relating to the triggers and/or actions, identify the relevancy (e.g. photo, calendar, contact management, productivity, video, social media, sharing, etc.) of the triggers and/or actions, and/or any other feature which may modify the instruction in some manner.

In one embodiment, actions and/or triggers relating to the selected one or more instructions may be displayed and/or modified. For example, in one embodiment, the relevancy may be automatically set (e.g. based off of the relevancy tag of the one or more instruction matches, etc.), and/or may be set by the user (e.g. via drop down menu, etc.). In another embodiment, upon selection of the relevancy, the triggers and/or actions may change to display a set of relevant triggers and/or actions. After the relevant triggers and/or actions are displayed, items relevant to the selected one or more instruction matches may be pre-selected. Additionally, if an item included with the one or more instruction matches is not included with the relevant triggers and/or actions, it may be added to the list of triggers and/or actions. In a further embodiment, a custom trigger and/or action may be added and/or deleted, including inserting a trigger and/or action not associated with the relevant triggers/actions (e.g. an item associated with productivity, etc.), creating a new trigger and/or action not associated with any previously created trigger and/or action, and/or adding any item not already listed with the relevant triggers and/or actions.

In some embodiments, a calendar relevancy may display calendar relevant triggers, including the ability to open calendar, select one or more events, create an event, receive an event in a message, add a tag, select to share an event, and/or select any other function which may relate to a calendar. Additionally, in another embodiment, a calendar relevancy may display calendar relevant actions, including the ability to sync event, email to group, upload to blog, send SMS link to group, upload to Facebook, post to Twitter, respond to event invite based on availability, and/or select any other action which may relate to a calendar.

In various embodiments, the modify instruction interface may display one or more options, including the option to add metadata, to add settings, to finalize, and/or to save. Of course, any option which may relate to the modify instruction interface and/or to navigating the create instruction interface may be displayed. In one embodiment, saving the instruction may include storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

As shown, a finalize option may be selected 2512 and a finalize instruction interface may be displayed 2514. In one embodiment, the finalize instruction interface may display all triggers, actions, metadata, settings, and/or any further information which may relate in some manner to the created instruction. In one embodiment, the user may select an errors option to verify if there are any errors associated with the instruction (e.g. inconsistent rules, inadequate permissions, etc.) and/or any errors associated with executing the instruction (e.g. with respect to other instructions, with respect to system resources, with respect to other applications, etc.).

In another embodiment, a modify option may be selected to modify the selected triggers, actions, metadata, and/or settings. In one embodiment, an execute option may be selected to immediately execute (e.g. run, etc.) the created instruction. Further, in another embodiment, the instruction may be saved, including storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

Figure 26:
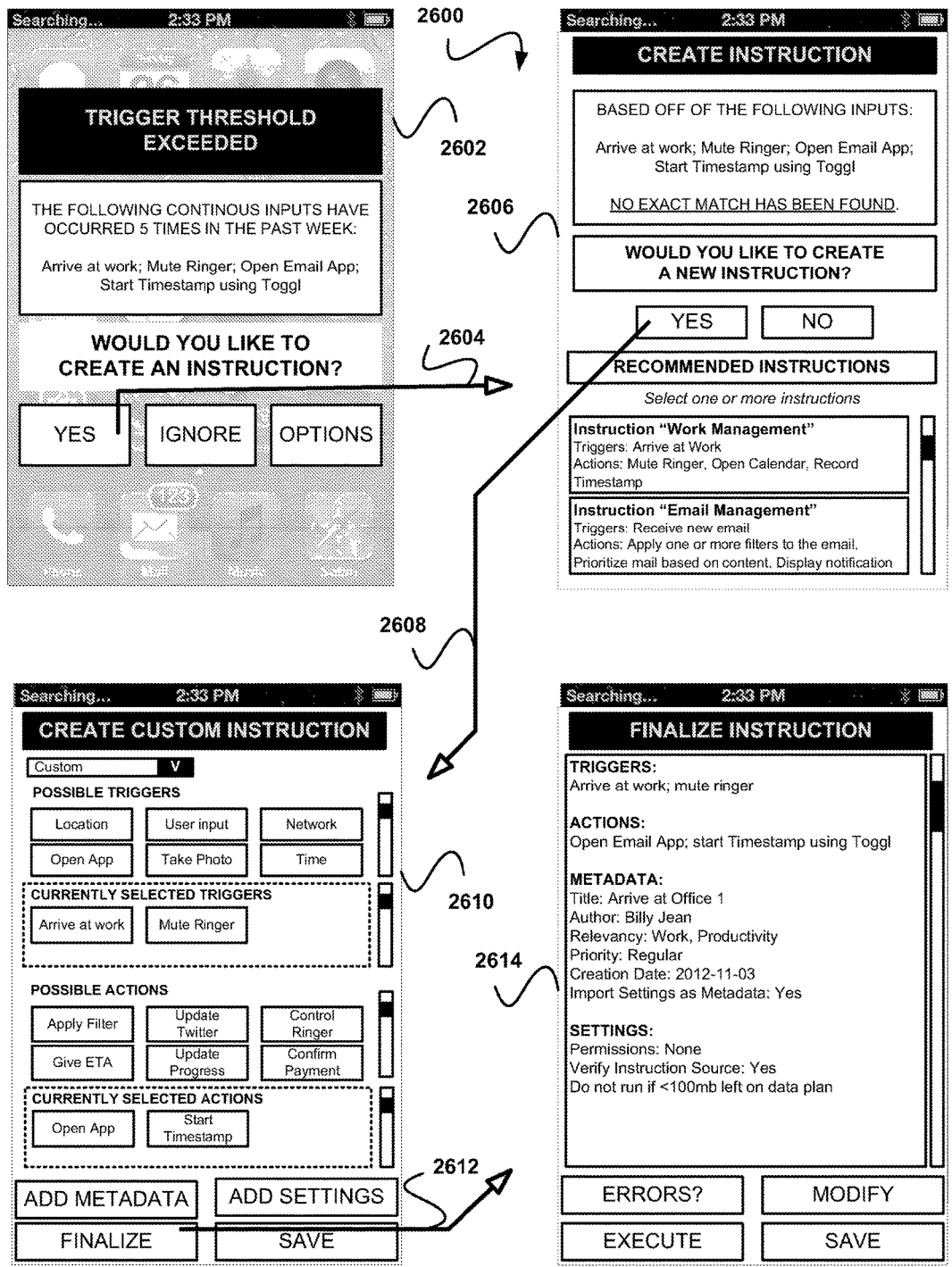
FIG. 26 shows a mobile device interface for interacting with one or more instructions, in accordance with another embodiment.

FIG. 26 shows a mobile device interface 2600 for interacting with one or more instructions, in accordance with one possible embodiment. As an option, the mobile device interface 2600 may be implemented in the context of the architecture and environment of the previous Figures or any subsequent Figure(s). Of course, however, the mobile device interface 2600 may be carried out in any desired environment. It should also be noted that the aforementioned definitions may apply during the present description.

In one embodiment, a notification interface 2602 may be displayed. In one embodiment, the notification interface may relate to exceeding a trigger threshold. For example, in various embodiments, the trigger threshold may relate to receiving a set of continuous action inputs repeatedly (e.g. five times, etc.) in a given time period (e.g. week, month, etc.). In one embodiment, the action inputs and trigger threshold may be monitored by the instruction app. However, in other embodiments, an instruction database (e.g. associated with an online system, associated with the mobile device, etc.), another app, an OS/Platform native utility system, and/or any other software system may monitor the action inputs and trigger threshold.

As an example, in one embodiment, a trigger threshold notification may display "The following continuous inputs have occurred 5 times in the past week: arrive at work, mute ringer, open email app, start timestamp using Toggl." A prompt may also be displayed "Would you like to create an instruction."

In various embodiments, the trigger threshold may be based off a behavioral context. For example, in some embodiments, a behavioral context may include monitoring keystrokes, motions, destinations, and/or any other input which may provide a context to the behavior of the user. As an example, in one embodiment, a user may have repeatedly in the past performed a set of input actions (e.g. but not sufficient to trigger a threshold, etc.). Based off of the past input actions, the instruction app (or whatever system is monitoring the input actions) may prompt the user if the user would like the device to finish a combination of keystrokes, motions, and/or any other input the user would normally give. In this manner, the device may learn from the user and recommend instructions based off of past usage and/or actions. Additionally, in learning from the user, the device may assist in increasing the efficiency (e.g. decreasing the actions taken by the user, etc.) of the user. Of course, the behavioral context may monitor any action and/or may be restricted as desired by the user.

In some embodiments, one or more options associated with the notification interface may include a "yes" button, an "ignore" button, and an "options" button. In some embodiments, selecting ignore will cause the notification to exit. In other embodiments, selecting ignore may also cause any future related notifications to not be displayed. In one embodiments, selecting options may include adjusting one or more settings (e.g. adjust threshold, notification display, audible alerts, etc.) relating to a trigger threshold. In some embodiments, the options may relate globally to an instruction app. In other embodiments, the options may relate specifically to the displayed notification.

As shown, a "yes" button may be selected 2604, and a create instruction interface 2606 may be displayed. In one embodiment, the detected action inputs may be displayed. In some embodiments, one or more matches (e.g. based on the action inputs, etc.) may be displayed. In one embodiment, an exact match (e.g. using all of the action inputs, etc.) may not be found. In another embodiment, one or more recommended instructions may be displayed which may relate in some manner to at least one of the input actions. For example, in one embodiment, an exact match to the action inputs (e.g. arrive at work, mute ringer, open email app, start timestamp using Toggl, etc.) may not be found, but a recommended instruction may be found, including "Instruction 'Work Management'; Triggers: Arrive at Work; Actions: Mute Ringer, Open Calendar, Record Timestamp," "Instruction 'Email Management'; Triggers: Receive new email; Actions: Apply one or more filters to the email, Prioritize mail based on content, Display notification," and/or display any other instruction which may relate in some manner to the input actions.

As shown, a "yes" option may be selected 2608, and a create custom instruction interface 2610 may be displayed. In various embodiments, the create custom instruction interface may include a relevancy drop-down box (e.g. photo, calendar, business, social networking, etc.), one or more possible triggers, currently selected triggers, one or more possible actions, currently selected actions, and/or options associated with the custom instruction interface including add metadata, add settings, finalize, and/or save. Of course, any feature and/or item may be displayed on the create custom instruction interface.

In one embodiment, the possible triggers may include location, user input, network, open app, take photo, time, and/or any other trigger. In another embodiment, the possible actions may include apply filter, update twitter, control ringer, give ETA, update progress, confirm payment and/or any other action. In one embodiment, possible triggers and/or actions may be dragged and dropped to the currently selected triggers pane and/or currently selected actions pane, respectively. In other embodiments, the possible triggers and/or actions may be displayed as a list of selectable options (e.g. a user may star and/or select in some manner desired triggers and/or actions, etc.), as a dropdown menu of possibilities, and/or in any other manner.

In one embodiment, an add metadata option may provide an interface which includes the ability to insert an instruction title, an author, a location/geotag, a tag (e.g. data content, application content, etc.), a relevancy (e.g. photo, sharing, etc.), applicable apps (e.g. apps which may relate and/or may be included in the instruction, etc.), priority (e.g. high, regular, low, priority with respect to other instructions being executed, etc.), creation date, the ability to import instruction settings as metadata (e.g. settings are also imported as metadata values associated with the instruction, etc.), and/or any other value which may relate to metadata.

Additionally, an add settings option may provide an interface which includes global settings, such as permissions (e.g. associated with device, contacts, entities, locations, etc.), ability to verify the instruction source (e.g. in the instance where an instruction is sent from another contact and/or device to the user's mobile device, etc.), restrictions where the instruction will not run if there is less than 100 mb left on the data plan, will not run on the carrier network if the data exceeds 500 mb, will not run if the battery is less than a set amount, and/or any other feature which may relate globally to the instruction and/or the application managing instructions. Of course, in another embodiment, any global setting may be modified on an individual instruction by instruction basis.

In various embodiments, the add settings interface may also include instruction specific settings, including permissible run time (e.g. morning, night, 6 am-6 pm daily, Monday-Friday, etc.), permissible run locations (e.g. based off of device location, etc.), permissible run friends (e.g. instruction may be run when a device and/or contact is near, instruction may be prevented to be run when a device and/or contact is near, etc.), automatic settings (e.g. configure user's mobile device based on triggers, actions, and/or settings, etc.), settings associated with controlling the user's mobile device (e.g. set volume, set screen brightness, set power mode, etc.), and/or any other settings which may relate in some manner to the instruction. In another embodiment, a user may download and/or select a set of predefined settings (e.g. included in the instruction file, etc.), and/or may input all settings relating to the instruction.

As shown, a finalize option may be selected 2612 and a finalize instruction interface may be displayed 2614. In one embodiment, the finalize instruction interface may display all triggers, actions, metadata, settings, and/or any further information which may relate in some manner to the created instruction. In one embodiment, the user may select an errors option to verify if there are any errors associated with the instruction (e.g. inconsistent rules, inadequate permissions, etc.) and/or any errors associated with executing the instruction (e.g. with respect to other instructions, with respect to system resources, with respect to other applications, etc.).

In another embodiment, a modify option may be selected to modify the selected triggers, actions, metadata, and/or settings. In one embodiment, an execute option may be selected to immediately execute (e.g. run, etc.) the created instruction. Further, in another embodiment, the instruction may be saved, including storing the instruction in a local cache on the mobile device, on an online server and/or database, on a local database, and/or on any other device and/or storage hardware. In one embodiment, at the time of saving the instruction, a backup copy of the instruction may be saved in another location. Additionally, in another embodiment, saving the instruction may include sending and/or posting the instruction to an instruction database site to be shared with other users.

As an option, the aforementioned mobile device may be capable of operating in a location-specific mode, in the context of any of the embodiments disclosed hereinabove. Specifically, in one embodiment, a location associated with the mobile device may be determined. Further determined may be a presence of at least one other person at the location. Still yet, a graphical user interface may be automatically displayed. Such graphical user interface may be specifically associated with the determined location and the determined presence of the at least one other person. In another embodiment, the system, method, or computer program product may be capable of determining a location associated with the mobile device and automatically determining that the location is proximate to a previously identified item of interest. To this end, a graphical user interface associated with the determined location and the previously identified item of interest may be displayed. More information regarding such location-specific features that may or may not be incorporated into any of the embodiments disclosed herein, may be found in U.S. patent application Ser. No. 13/652,458, filed Oct. 15, 2012, titled "MOBILE DEVICE SYSTEM, METHOD, AND COMPUTER PROGRAM PRODUCT," which is incorporated herein by reference in its entirety.

In various other optional embodiments, the features, capabilities, and/or technology, etc. of the television, mobile devices, and/or mobile device applications, etc. disclosed in the following patents/applications may or may not be incorporated into any of the embodiments disclosed herein: U.S. Pat. No. 8,078,397, U.S. Pat. No. 7,669,123, U.S. Pat. No. 7,725,492, U.S. Pat. No. 7,788,260, U.S. Pat. No. 7,797,256, U.S. Pat. No. 7,809,805, U.S. Pat. No. 7,827,208, U.S. Pat.

No. 7,827,265, U.S. Pat. No. 7,890,501, U.S. Pat. No. 7,933,810, U.S. Pat. No. 7,945,653, U.S. Pat. No. 7,970,657, U.S. Pat. No. 8,010,458, U.S. Pat. No. 8,027,943, U.S. Pat. No. 8,037,093, U.S. Pat. No. 8,081,817, U.S. Pat. No. 8,099,433, US20080033739A1, US20080046976A1, US20090144392A1, US20090198487A1, US20100049852A1, US20100132049A1, US20100164957A1, US20100169327A1, US20100198581A1, US20100229223A1, US20100257023A1, US20110044354A1, U.S. Non-Provisional application Ser. No. 13/652,458, filed Oct. 15, 2012; U.S. Provisional Application No. 61/547,638, filed Oct. 14, 2011; U.S. Provisional Application No. 61/567,118 dated Dec. 5, 2011; U.S. Provisional Application No. 61/577,657 dated Dec. 19, 2011; U.S. Provisional Application No. 61/599,920 dated Feb. 16, 2012; and/or U.S. Provisional Application No. 61/612,960 dated Mar. 19, 2012. Each of the foregoing patents/applications is hereby incorporated by reference in its entirety for all purposes.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

It will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

In one embodiment, each method described above and combinations thereof may be embodied in computer executable code that, when executing on one or more computing devices, performs the acts and/or provides the capabilities thereof. In another embodiment, the methods may be embodied in systems that perform the acts and/or provides the capabilities thereof, and may be distributed across devices in a number of ways, or all of the functionality may be integrated into a dedicated, standalone device or other hardware. In another embodiment, means for performing the steps associated with the processes described above may include any of the hardware and/or software described above. All such permutations and combinations are intended to fall within the scope of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A device, comprising:
a touchscreen;
a non-transitory memory storing instructions; and
one or more processors in communication with the non-transitory memory and the touchscreen, wherein the one or more processors execute the instructions to:
display, utilizing the touchscreen, a plurality of application icons including a photo application icon;
receive, utilizing the touchscreen, an indication of a touch input on the photo application icon;
in response to the receipt of the indication of the touch input on the photo application icon, access a photo application utilizing the one or more processors;
after the photo application is accessed, display, utilizing the touchscreen, a grid of a plurality of photos and an operation icon, via the photo application;
receive, utilizing the touchscreen, an indication of one or more first touch inputs for individually selecting a first set of one or more of the plurality of photos in the grid;
in response to the receipt of the indication of the one or more first touch inputs for individually selecting the first set of one or more of the plurality of photos in the grid, cause individual selection of the first set of one or more of the plurality of photos in the grid, utilizing the one or more processors;
in response to the receipt of the indication of the one or more first touch inputs for individually selecting the first set of one or more of the plurality of photos in the grid, change at least one visual aspect of the first set of one or more of the plurality of photos in the grid, for visually indicating the selection of the first set of one or more of the plurality of photos in the grid;
in response to the receipt of the indication of the one or more first touch inputs for individually selecting the first set of one or more of the plurality of photos in the grid, add a check mark icon to each of the first set of one or more of the plurality of photos in the grid, for visually indicating the selection of the first set of one or more of the plurality of photos in the grid;
receive, utilizing the touchscreen, an indication of a second touch input for trace path-based selection of a first photo of a second set of multiple of the plurality of photos in the grid;

in response to the receipt of the indication of the second touch input for trace path-based selection of the first photo of the second set of multiple of the plurality of photos in the grid, cause selection of the first photo of the second set of multiple of the plurality of photos in the grid, utilizing the one or more processors;

in response to the receipt of the indication of the second touch input for trace path-based selection of the first photo of the second set of multiple of the plurality of photos in the grid, change at least one visual aspect of the first photo of the second set of multiple of the plurality of photos in the grid, for visually indicating the selection of the first photo of the second set of multiple of the plurality of photos in the grid;

in response to the receipt of the indication of the second touch input for trace path-based selection of the first photo of the second set of multiple of the plurality of photos in the grid, add a check mark icon to the first photo of the second set of multiple of the plurality of photos in the grid, for visually indicating the selection of the first photo of the second set of multiple of the plurality of photos in the grid;

receive, utilizing the touchscreen, an indication of a continuation of the second touch input for trace path-based selection of a second photo of the second set of multiple of the plurality of photos in the grid;

in response to the receipt of the indication of the continuation of the second touch input for trace path-based selection of the second photo of the second set of multiple of the plurality of photos in the grid, cause selection of the second photo of the second set of multiple of the plurality of photos in the grid, utilizing the one or more processors;

in response to the receipt of the indication of the continuation of the second touch input for trace path-based selection of the second photo of the second set of multiple of the plurality of photos in the grid, change at least one visual aspect of the second photo of the second set of multiple of the plurality of photos in the grid, for visually indicating the selection of the second photo of the second set of multiple of the plurality of photos in the grid;

in response to the receipt of the indication of the continuation of the second touch input for trace path-based selection of the second photo of the second set of multiple of the plurality of photos in the grid, add a check mark icon to the second photo of the second set of multiple of the plurality of photos in the grid, for visually indicating the selection of the second photo of the second set of multiple of the plurality of photos in the grid;

after the selection of at least one of the first set of one or more of the plurality of photos, or the second set of multiple of the plurality of photos; receive, utilizing the touchscreen, an indication of a third touch input on the operation icon; and after the indication of the third touch input on the operation icon, operate on at least one of the first set of one or more of the plurality of photos, or the second set of multiple of the plurality of photos.

2. The device of claim 1, wherein the device is configured such that the second touch input corresponds to a single continuous input trace path motion.

3. The device of claim 1, wherein the device is configured such that the second touch input corresponds to a single continuous input trace path motion that spans multiple pages.

4. The device of claim 1, wherein the device is configured such that the second touch input corresponds to a single continuous input trace path motion that spans multiple scrollable pages.

5. The device of claim 1, wherein the device is configured such that the second touch input corresponds to a single continuous input trace path motion that spans multiple scrollable pages and causes the pages to scroll.

6. The device of claim 1, wherein the device is configured such that the first photo of the second set of multiple of the plurality of photos in the grid is originally positioned on a first page of photos, and the second photo of the second set of multiple of the plurality of photos in the grid is originally positioned on a second page of photos.

7. The device of claim 1, wherein the one or more processors execute the instructions to:

after the receipt of the indication of the continuation of the second touch input for trace path-based selection of the second photo of the second set of multiple of the plurality of photos in the grid, receive, utilizing the touchscreen, an indication of a fourth touch input on the first photo of the second set of multiple of the plurality of photos in the grid;

in response to the receipt of the indication of the fourth touch input on the first photo of the second set of multiple of the plurality of photos in the grid, cause de-selection of the first photo of the second set of multiple of the plurality of photos in the grid, utilizing the one or more processors;

in response to the receipt of the indication of the fourth touch input on the first photo of the second set of multiple of the plurality of photos in the grid, change the at least one visual aspect of the first photo of the second set of multiple of the plurality of photos in the grid, for visually indicating the de-selection of the first photo of the second set of multiple of the plurality of photos in the grid; and in response to the receipt of the indication of the fourth touch input on the first photo of the second set of multiple of the plurality of photos in the grid, removing the check mark icon on the first photo of the second set of multiple of the plurality of photos in the grid, for visually indicating the de-selection of the first photo of the second set of multiple of the plurality of photos in the grid.

8. The device of claim 7, wherein the device is configured such that the fourth touch input is not part of a continuous input.

9. The device of claim 1, wherein the device is configured such that the operation icon includes a sharing icon, and the operating includes sharing at least one of the first set of one or more of the plurality of photos, or the second set of multiple of the plurality of photos.

10. The device of claim 1, wherein the device is configured such that the operation icon includes a sharing icon, and the operating includes invoking another application other than the photo application for sharing at least one of the first set of one or more of the plurality of photos, or the second set of multiple of the plurality of photos.

11. The device of claim 1, wherein the device is configured such that the operation icon includes an album icon, and the operating includes creation of or editing an album using at least one of the first set of one or more of the plurality of photos, or the second set of multiple of the plurality of photos.

12. The device of claim 1, wherein the device is configured such that the operation icon includes a delete icon, and the operating includes deletion of at least one of the first set of one or more of the plurality of photos, or the second set of multiple of the plurality of photos.

13. The device of claim 1, wherein the device is configured such that the second touch input includes a snake-shaped continuous gesture user input.

14. The device of claim 1, wherein the one or more processors execute the instructions to:
  receive, utilizing the touchscreen, an indication of a fourth touch input for trace path-based selection of a first photo of a third set of multiple of the plurality of photos in the grid;
  in response to the receipt of the indication of the fourth touch input for trace path-based selection of the first photo of the third set of multiple of the plurality of photos in the grid, cause selection of the first photo of the third set of multiple of the plurality of photos in the grid, utilizing the one or more processors;
  in response to the receipt of the indication of the fourth touch input for trace path-based selection of the first photo of the third set of multiple of the plurality of photos in the grid, change at least one visual aspect of the first photo of the third set of multiple of the plurality of photos in the grid, for visually indicating the selection of the first photo of the third set of multiple of the plurality of photos in the grid;
  in response to the receipt of the indication of the fourth touch input for trace path-based selection of the first photo of the third set of multiple of the plurality of photos in the grid, add a check mark icon to the first photo of the third set of multiple of the plurality of photos in the grid, for visually indicating the selection of the first photo of the third set of multiple of the plurality of photos in the grid;
  receive, utilizing the touchscreen and after a break in continuity, an indication of a continuation of the fourth touch input for trace path-based selection of a second photo of the third set of multiple of the plurality of photos in the grid;
  in response to the receipt of the indication of the continuation of the fourth touch input for trace path-based selection of the second photo of the third set of multiple of the plurality of photos in the grid, cause selection of the second photo of the third set of multiple of the plurality of photos in the grid, utilizing the one or more processors;
  in response to the receipt of the indication of the continuation of the fourth touch input for trace path-based selection of the second photo of the third set of multiple of the plurality of photos in the grid, change at least one visual aspect of the second photo of the third set of multiple of the plurality of photos in the grid, for visually indicating the selection of the second photo of the third set of multiple of the plurality of photos in the grid; and
  in response to the receipt of the indication of the continuation of the fourth touch input for trace path-based selection of the second photo of the third set of multiple of the plurality of photos in the grid, add a check mark icon to the second photo of the third set of multiple of the plurality of photos in the grid, for visually indicating the selection of the second photo of the third set of multiple of the plurality of photos in the grid;
  wherein the device is configured such that the third set of multiple of the plurality of photos in the grid are operated upon, after the indication of the third touch input on the operation icon.

15. The device of claim 1, wherein the device is configured such that at least one of:
  said plurality of photos are displayed via the photo application in response to the photo application being accessed;
  said plurality of photos are displayed via the photo application after the photo application being accessed and further after at least one additional interface has been displayed;
  said trace path-based selection is a selection involving a trace path;
  said trace path-based selection is a selection caused by user input in the form of a trace path;
  said trace path-based selection is a selection that takes the form of a trace path;
  said at least one visual aspect of the first set of one or more of the plurality of photos in the grid includes a transparency of the first set of one or more of the plurality of photos in the grid;
  said at least one visual aspect of the first set of one or more of the plurality of photos in the grid includes a visibility of the first set of one or more of the plurality of photos in the grid;
  said change of the at least one visual aspect of the first set of one or more of the plurality of photos in the grid visually indicates the selection of the first set of one or more of the plurality of photos in the grid;
  said at least one visual aspect of the second set of multiple of the plurality of photos in the grid includes a transparency of the second set of multiple of the plurality of photos in the grid;
  said at least one visual aspect of the second set of multiple of the plurality of photos in the grid includes a visibility of the second set of multiple of the plurality of photos in the grid;
  said change of the at least one visual aspect of the second set of multiple of the plurality of photos in the grid visually indicates the selection of the second set of multiple of the plurality of photos in the grid;
  said first set of one or more of the plurality of photos and the second set of multiple of the plurality of photos in the grid are operated upon, after the indication of the third touch input on the operation icon and further after at least one intermediate operation;
  said first set of one or more of the plurality of photos and the second set of multiple of the plurality of photos in the grid are operated upon, in response to the indication of the third touch input on the operation icon;
  only the first set of one or more of the plurality of photos is operated upon, if the first touch input is received and the second touch input is not received;
  only the second set of multiple of the plurality of photos is operated upon, if the second touch input is received and the first touch input is not received;
  both the first set of one or more of the plurality of photos and the second set of multiple of the plurality of photos are operated upon, if the both first touch input and the second touch input are received; or
  said device is configured such that the photo application is accessible via a lock screen; and wherein the device is configured for determining a location associated with the device; determining a presence of at least one other person at the location; and automatically displaying a graphical user interface associated with the determined location and the determined presence of the at least one other person, wherein the device is further configured for determining that the location is proximate to a previously identified item of interest; and displaying another graphical user interface associated with the determined location and the previously identified item of interest.

16. The device of claim 1, wherein the device is configured such that the second touch input for trace path-based selection overcomes a problem of requiring reliance solely on multiple individual selection user inputs and at least one page-scrolling finger slide gesture user input for individual selection of multiple photos that span multiple pages, by permitting a user to select the multiple photos that span the multiple pages, via a single snake-shaped continuous gesture user input.

17. A computer program product comprising computer executable instructions stored on a non-transitory computer readable medium that, when executed by one or more processors, instruct the one or more processors to:

display, utilizing a touchscreen, a plurality of application icons including a photo application icon;

receive, utilizing the touchscreen, an indication of a touch input on the photo application icon;

in response to the receipt of the indication of the touch input on the photo application icon, access a photo application utilizing the one or more processors;

after the photo application is accessed, display, utilizing the touchscreen, a grid of a plurality of photos and an operation icon, via the photo application;

receive, utilizing the touchscreen, an indication of one or more first touch inputs for individually selecting a first set of one or more of the plurality of photos in the grid;

in response to the receipt of the indication of the one or more first touch inputs for individually selecting the first set of one or more of the plurality of photos in the grid, cause individual selection of the first set of one or more of the plurality of photos in the grid, utilizing the one or more processors;

in response to the receipt of the indication of the one or more first touch inputs for individually selecting the first set of one or more of the plurality of photos in the grid, change at least one visual aspect of the first set of one or more of the plurality of photos in the grid, for visually indicating the selection of the first set of one or more of the plurality of photos in the grid;

in response to the receipt of the indication of the one or more first touch inputs for individually selecting the first set of one or more of the plurality of photos in the grid, add a check mark icon to each of the first set of one or more of the plurality of photos in the grid, for visually indicating the selection of the first set of one or more of the plurality of photos in the grid;

receive, utilizing the touchscreen, an indication of a second touch input for trace path-based selection of a first photo of a second set of multiple of the plurality of photos in the grid;

in response to the receipt of the indication of the second touch input for trace path-based selection of the first photo of the second set of multiple of the plurality of photos in the grid, cause selection of the first photo of the second set of multiple of the plurality of photos in the grid, utilizing the one or more processors;

in response to the receipt of the indication of the second touch input for trace path-based selection of the first photo of the second set of multiple of the plurality of photos in the grid, change at least one visual aspect of the first photo of the second set of multiple of the plurality of photos in the grid, for visually indicating the selection of the first photo of the second set of multiple of the plurality of photos in the grid;

in response to the receipt of the indication of the second touch input for trace path-based selection of the first photo of the second set of multiple of the plurality of photos in the grid, add a check mark icon to the first photo of the second set of multiple of the plurality of photos in the grid, for visually indicating the selection of the first photo of the second set of multiple of the plurality of photos in the grid;

receive, utilizing the touchscreen, an indication of a continuation of the second touch input for trace path-based selection of a second photo of the second set of multiple of the plurality of photos in the grid;

in response to the receipt of the indication of the continuation of the second touch input for trace path-based selection of the second photo of the second set of multiple of the plurality of photos in the grid, cause selection of the second photo of the second set of multiple of the plurality of photos in the grid, utilizing the one or more processors;

in response to the receipt of the indication of the continuation of the second touch input for trace path-based selection of the second photo of the second set of multiple of the plurality of photos in the grid, change at least one visual aspect of the second photo of the second set of multiple of the plurality of photos in the grid, for visually indicating the selection of the second photo of the second set of multiple of the plurality of photos in the grid;

in response to the receipt of the indication of the continuation of the second touch input for trace path-based selection of the second photo of the second set of multiple of the plurality of photos in the grid, add a check mark icon to the second photo of the second set of multiple of the plurality of photos in the grid, for visually indicating the selection of the second photo of the second set of multiple of the plurality of photos in the grid;

after the selection of at least one of the first set of one or more of the plurality of photos, or the second set of multiple of the plurality of photos; receive, utilizing the touchscreen, an indication of a third touch input on the operation icon; and after the indication of the third touch input on the operation icon, operate on at least one of the first set of one or more of the plurality of photos, or the second set of multiple of the plurality of photos.

18. The computer program product of claim 17, wherein the computer executable instructions, when executed by the one or more processors, instruct the one or more processors to:

after the receipt of the indication of the continuation of the second touch input for trace path-based selection of the second photo of the second set of multiple of the plurality of photos in the grid, receive, utilizing the touchscreen, an indication of a fourth touch input on the first photo of the second set of multiple of the plurality of photos in the grid;

in response to the receipt of the indication of the fourth touch input on the first photo of the second set of multiple of the plurality of photos in the grid, cause de-selection of the first photo of the second set of multiple of the plurality of photos in the grid, utilizing the one or more processors;

in response to the receipt of the indication of the fourth touch input on the first photo of the second set of multiple of the plurality of photos in the grid, change the at least one visual aspect of the first photo of the second set of multiple of the plurality of photos in the grid, for visually indicating the de-selection of the first photo of the second set of multiple of the plurality of photos in the grid; and in response to the receipt of the indication of the fourth touch input on the first photo of the second set of multiple of the plurality of photos in the grid, removing the check mark icon on the first photo of the second set of multiple of the plurality of photos in the grid, for visually indicating the de-selection of the first photo of the second set of multiple of the plurality of photos in the grid.

19. The computer program product of claim 17, wherein the second touch input is capable of including a single snake-shaped continuous gesture user input for selection of multiple photos that span multiple pages.

20. A computer-implemented method comprising:

displaying, utilizing a touchscreen, a plurality of application icons including a photo application icon;

receiving, utilizing the touchscreen, an indication of a touch input on the photo application icon;

in response to the receipt of the indication of the touch input on the photo application icon, accessing a photo application utilizing one or more processors;

after the photo application is accessed, displaying, utilizing the touchscreen, a grid of a plurality of photos and an operation icon, via the photo application;

receiving, utilizing the touchscreen, an indication of one or more first touch inputs for individual selecting a first set of one or more of the plurality of photos in the grid;

in response to the receipt of the indication of the one or more first touch inputs for individually selecting the first set of one or more of the plurality of photos in the grid, causing individual selection of the first set of one or more of the plurality of photos in the grid, utilizing the one or more processors;

in response to the receipt of the indication of the one or more first touch inputs for individually selecting the first set of one or more of the plurality of photos in the grid, changing at least one visual aspect of the first set of one or more of the plurality of photos in the grid, for visually indicating the selection of the first set of one or more of the plurality of photos in the grid;

in response to the receipt of the indication of the one or more first touch inputs for individually selecting the first set of one or more of the plurality of photos in the grid, adding a check mark icon to each of the first set of one or more of the plurality of photos in the grid, for visually indicating the selection of the first set of one or more of the plurality of photos in the grid;

receiving, utilizing the touchscreen, an indication of a second touch input for trace path-based selection of a first photo of a second set of multiple of the plurality of photos in the grid;

in response to the receipt of the indication of the second touch input for trace path-based selection of the first photo of the second set of multiple of the plurality of photos in the grid, causing selection of the first photo of the second set of multiple of the plurality of photos in the grid, utilizing the one or more processors;

in response to the receipt of the indication of the second touch input for trace path-based selection of the first photo of the second set of multiple of the plurality of photos in the grid, changing at least one visual aspect of the first photo of the second set of multiple of the plurality of photos in the grid, for visually indicating the selection of the first photo of the second set of multiple of the plurality of photos in the grid;

in response to the receipt of the indication of the second touch input for trace path-based selection of the first photo of the second set of multiple of the plurality of photos in the grid, adding a check mark icon to the first photo of the second set of multiple of the plurality of photos in the grid, for visually indicating the selection of the first photo of the second set of multiple of the plurality of photos in the grid;

receiving, utilizing the touchscreen, an indication of a continuation of the second touch input for trace path-based selection of a second photo of the second set of multiple of the plurality of photos in the grid;

in response to the receipt of the indication of the continuation of the second touch input for trace path-based selection of the second photo of the second set of multiple of the plurality of photos in the grid, causing selection of the second photo of the second set of multiple of the plurality of photos in the grid, utilizing the one or more processors;

in response to the receipt of the indication of the continuation of the second touch input for trace path-based selection of the second photo of the second set of multiple of the plurality of photos in the grid, changing at least one visual aspect of the second photo of the second set of multiple of the plurality of photos in the grid, for visually indicating the selection of the second photo of the second set of multiple of the plurality of photos in the grid;

in response to the receipt of the indication of the continuation of the second touch input for trace path-based selection of the second photo of the second set of multiple of the plurality of photos in the grid, adding a check mark icon to the second photo of the second set of multiple of the plurality of photos in the grid, for visually indicating the selection of the second photo of the second set of multiple of the plurality of photos in the grid;

after the selection of at least one of the first set of one or more of the plurality of photos, or the second set of multiple of the plurality of photos; receiving, utilizing the touchscreen, an indication of a third touch input on the operation icon; and after the indication of the third touch input on the operation icon, operating on at least one of the first set of one or more of the plurality of photos, or the second set of multiple of the plurality of photos.

* * * * *